(12) United States Patent
Hanaoka

(10) Patent No.: US 7,586,561 B2
(45) Date of Patent: Sep. 8, 2009

(54) LIQUID CRYSTAL DISPLAY AND METHOD OF MANUFACTURING THE SAME

(75) Inventor: Kazutaka Hanaoka, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 89 days.

(21) Appl. No.: 11/471,831

(22) Filed: Jun. 21, 2006

(65) Prior Publication Data

US 2006/0244881 A1 Nov. 2, 2006

Related U.S. Application Data

(62) Division of application No. 10/109,020, filed on Mar. 28, 2002, now Pat. No. 7,113,241.

(30) Foreign Application Priority Data

Aug. 31, 2001 (JP) ............................. 2001-264117

(51) Int. Cl.
G02F 1/1333 (2006.01)
C09K 19/02 (2006.01)
(52) U.S. Cl. ........................................ 349/93; 349/183
(58) Field of Classification Search ............. 349/88–94, 349/187, 183
See application file for complete search history.

(56) References Cited

U.S. PATENT DOCUMENTS

| 5,473,450 A | 12/1995 | Yamada et al. ................. 349/89 |
| 5,525,273 A | 6/1996 | Konuma et al. ............. 264/1.38 |
| 5,528,401 A | 6/1996 | Narutaki et al. |
| 5,539,547 A * | 7/1996 | Ishii et al. ..................... 349/86 |
| 5,818,557 A | 10/1998 | Konumua et al. |
| 6,008,875 A | 12/1999 | Ikeno et al. |
| 6,118,509 A | 9/2000 | Miyake |
| 6,259,505 B1 | 7/2001 | Makino |
| 6,636,284 B2 * | 10/2003 | Sato ........................... 349/110 |
| 6,778,229 B2 * | 8/2004 | Inoue et al. .................... 349/39 |
| 6,809,788 B2 | 10/2004 | Yamada et al. |
| 6,903,787 B2 * | 6/2005 | Kishida et al. ................ 349/92 |
| 7,113,241 B2 * | 9/2006 | Hanaoka ..................... 349/139 |
| 2002/0033926 A1 | 3/2002 | Nakahara et al. |
| 2002/0159018 A1 | 10/2002 | Kataoka et al. |
| 2003/0048401 A1 | 3/2003 | Hanaoka et al. |
| 2005/0068468 A1 | 3/2005 | Yamazaki et al. ............. 349/43 |

FOREIGN PATENT DOCUMENTS

JP 4-186219 7/1992

(Continued)

*Primary Examiner*—Dung T. Nguyen
(74) *Attorney, Agent, or Firm*—Greer, Burns & Crain, Ltd.

(57) ABSTRACT

The invention has an object to provide a liquid crystal display in which a wide angle of view is obtained and a response time at a halftone can be shortened by regulating an alignment orientation of a liquid crystal by the use of a polymer fixation system in which a liquid crystal layer containing a polymerizable component is sealed between substrates, and the polymerizable component is polymerized while a voltage is applied to the liquid crystal layer to fix a liquid crystal alignment. A liquid crystal layer containing a polymer for regulating a pretilt angle of a liquid crystal molecule and a tilt direction at a time of driving is sealed between two substrates arranged opposite to each other. A plurality of stripe-like electrode patterns in which a pattern width is formed to be wider than a width of a space, are arranged so that the liquid crystal molecule is aligned in a longitudinal direction of the pattern when the polymer is formed by solidifying a polymerizable component mixed in the liquid crystal layer while a voltage is applied to the liquid crystal layer.

4 Claims, 60 Drawing Sheets

FOREIGN PATENT DOCUMENTS

| | | |
|---|---|---|
| JP | 6-102490 | 4/1994 |
| JP | 06-301015 | 10/1994 |
| JP | 7-043730 | 2/1995 |
| JP | 7-159778 | 6/1995 |
| JP | 8-15707 | 1/1996 |
| JP | 8-262446 | 10/1996 |
| JP | 8-328007 | 12/1996 |
| JP | H10-123543 | 5/1998 |
| JP | 11-002825 | 1/1999 |
| JP | 11-21554 | 1/1999 |
| JP | 11-109388 | 4/1999 |
| JP | 11-119248 | 4/1999 |
| JP | 11-287978 | 10/1999 |
| JP | 2000-047253 | 2/2000 |
| JP | 2000-137227 | 5/2000 |
| JP | 2000-193976 | 7/2000 |
| JP | 2000-199886 | 7/2000 |
| JP | 2000-221506 | 8/2000 |
| JP | 2000-250045 | 9/2000 |
| JP | 2000-250067 | 9/2000 |
| JP | 2000-298282 | 10/2000 |
| JP | 2000-347174 | 12/2000 |
| JP | 2000-347175 | 12/2000 |
| KR | 1999-0077582 | 10/1999 |

* cited by examiner

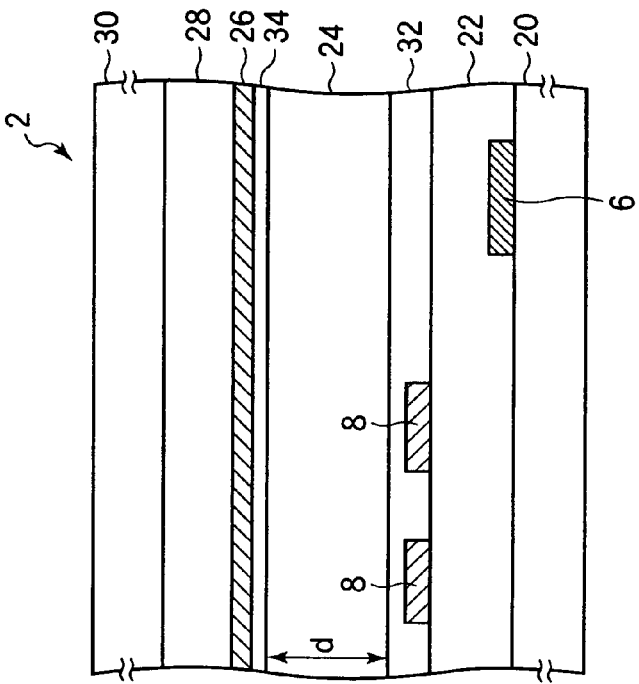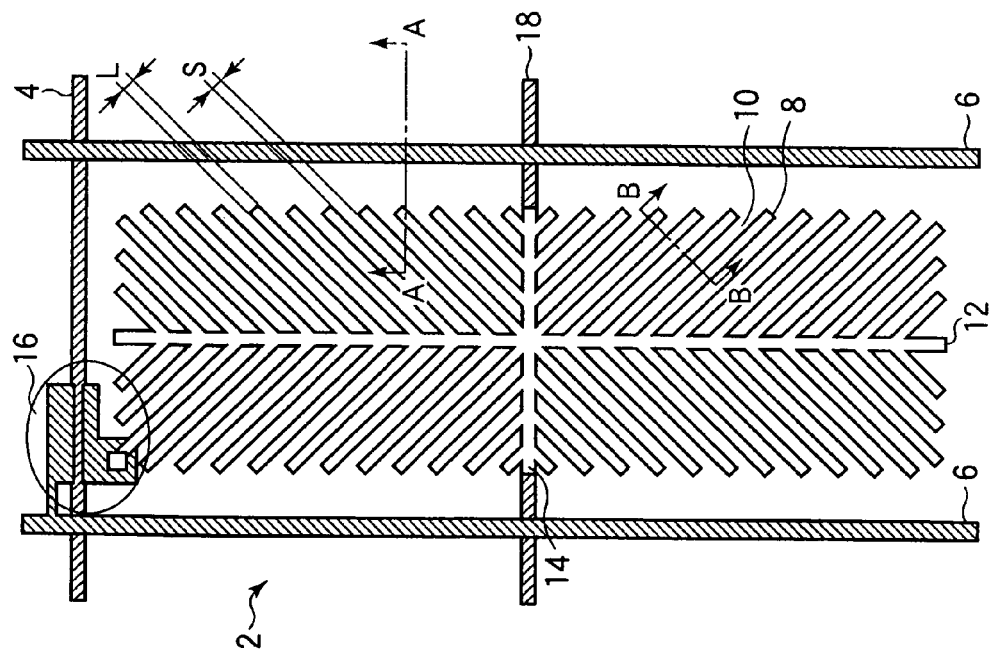

FIG.8
| VOLTAGE APPLICATION SYSTEM TO PIXEL | ALIGNMENT STATE IN PIXEL | | ROUGHNESS OF DISPLAY OF WHOLE PANEL |
|---|---|---|---|
| | PIXEL EDGE | DARK LINE (CENTER OF PIXEL) | |
| COMPARATIVE EXAMPLE 1-2 | △ | ○ | × |
| COMPARATIVE EXAMPLE 1-1 | × | × | × |
| EXAMPLE 1-1 | ○ | ○ | ○ |
| EXAMPLE 1-2 | △ | ○ | ○ |
FIG.9A
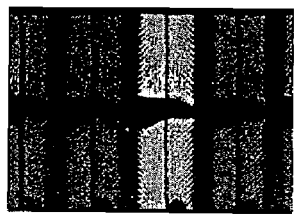
Vg=33V
FIG.9D
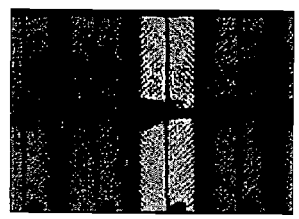
13V
FIG.9B
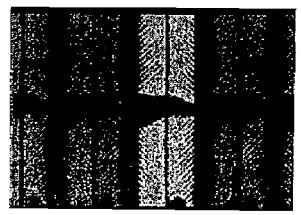
26V
FIG.9E
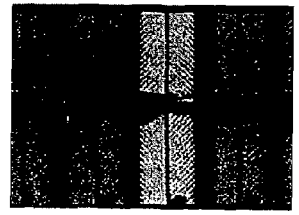
10V
FIG.9C
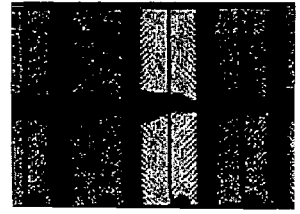
20V
FIG.9F
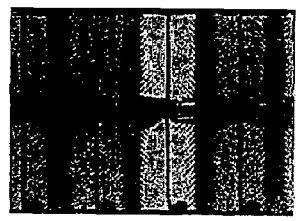
6V

FIG.10

| Vg (V) | ALIGNMENT STATE | UNEVENNESS OF DISPLAY (TFT UNEVENNESS) |
|---|---|---|
| 33 | ○ | × |
| 26 | ○ | △ |
| 20 | ○ | ○ |
| 13 | ○ | ○ |
| 10 | △ | ○ |
| 6 | × | ○ |

| S(μm)\L(μm) | 1 | 1.5 | 2 | 2.5 | 3 | 3.5 | 4 | 4.5 | 5 |
|---|---|---|---|---|---|---|---|---|---|
| 1 | 13.91 | | 6.61 | 5.28 | 4.50 | | 3.39 | | 2.80 |
| 1.5 | | | | | | | | 4.44 | |
| 2 | | | | | 6.40 | | 6.67 | | 5.66 |
| 2.5 | 46.50 | | | 13.65 | | | 8.78 | | 7.58 |
| 3 | | | | | 14.17 | | | | |
| 3.5 | | | | | | 14.69 | 13.83 | | 12.10 |
| 4 | | | 28.50 | | | | | | |
| 4.5 | | | | 19.40 | 17.04 | | 11.07 | | |
| 5 | 85.68 | | | | | | | | 8.86 |

| | | L (μm) | | | |
|---|---|---|---|---|---|
| | | 2 | 3 | 4 | 5 |
| S(μm) | 2 | 6.688828 | 9.506524 | 4.72731 | 9.938708 |
| | 3 | 20.15385 | 14.09063 | 10.04128 | 11.3698 |
| | 4 | 20.90566 | 17.20991 | 13.54354 | 13.53278 |
| | 5 | 46.58041 | 23.9618 | 18.35827 | 18.86147 |

| | | L(μm) | | | |
|---|---|---|---|---|---|
| | | 2 | 3 | 4 | 5 |
| S(μm) | 2 | 25.3227 | 11.93159 | 10.12843 | 13.82979 |
| | 3 | 24.22111 | 16.38251 | 15.79852 | 16.96941 |
| | 4 | 25.30479 | 19.88503 | 22.22489 | 12.50574 |
| | 5 | 31.83391 | 28.00312 | 19.79204 | 10.29764 |

|       | L(μm) |          |          |          |
|-------|-------|----------|----------|----------|
|       | 2     | 3        | 4        | 5        |
| S(μm) 2 |     | 13.241   | 12.58207 | 11.32582 |
| 3     |       | 15.14858 | 13.5312  | 11.66238 |
| 4     |       | 18.29747 | 19.71311 | 12.80216 |
| 5     |       | 22.08617 | 20.68077 | 11.78198 |

FIG.17

| L | S | RATE OF CHANGE OF TRANSMISSIVITY(%) | |
|---|---|---|---|
| | | MINUTE SLIT | MINUTE CONDUCTIVE BANK (h=0.4μm) |
| 3 | 3 | 14.17 | 0.46 |
| 4 | 2 | 6.67 | 0.57 |

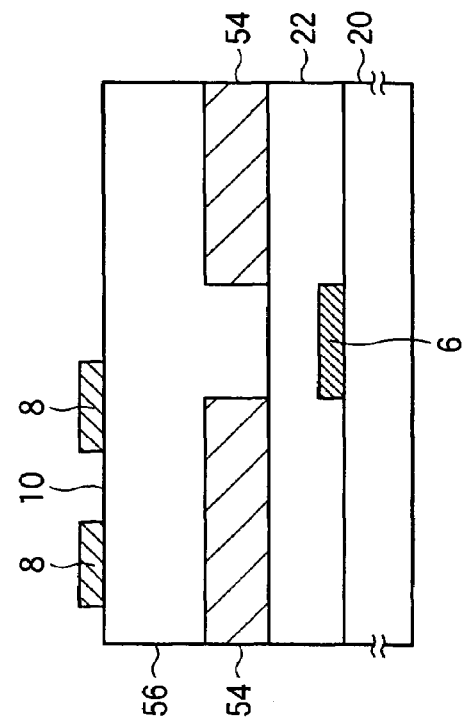
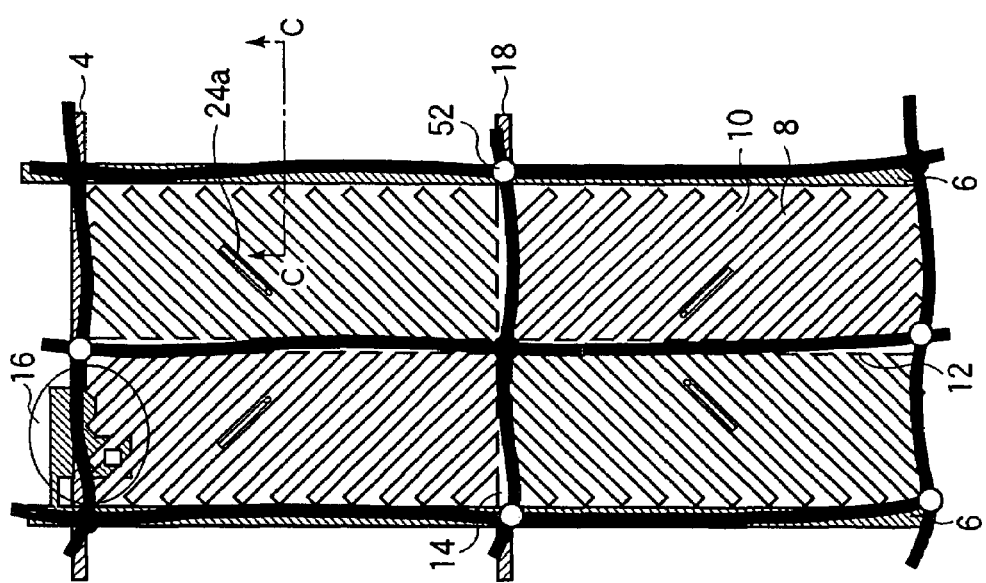

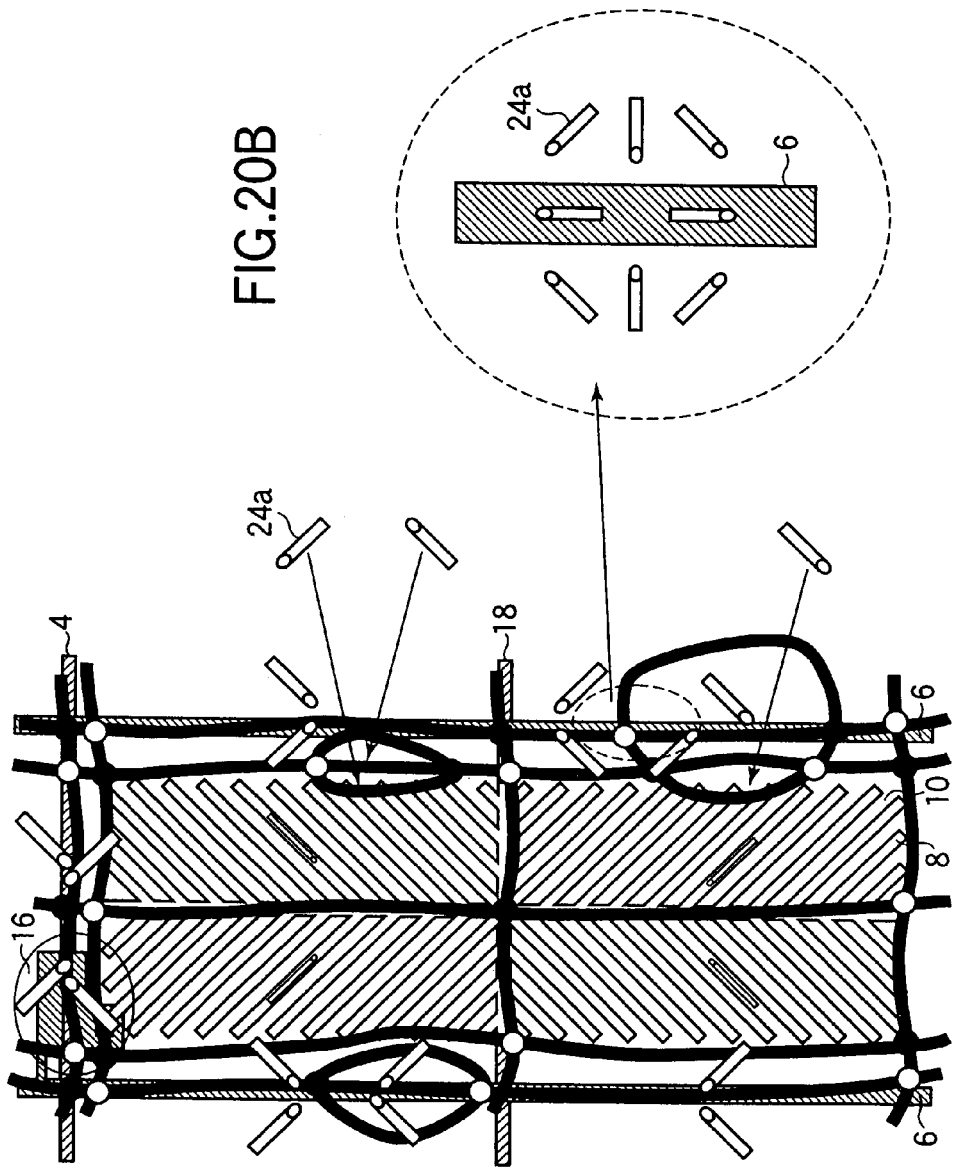

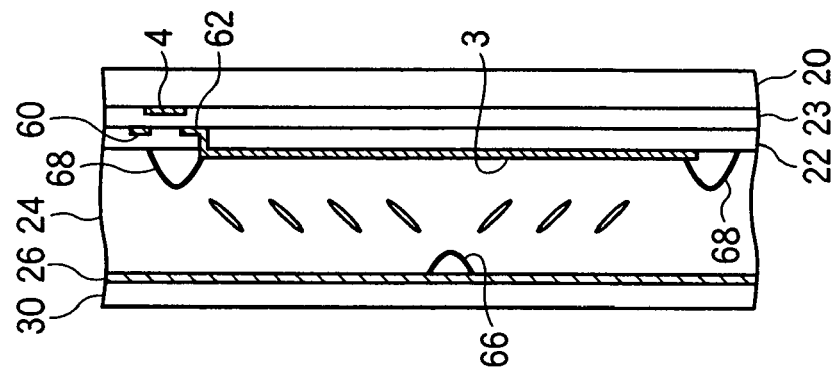
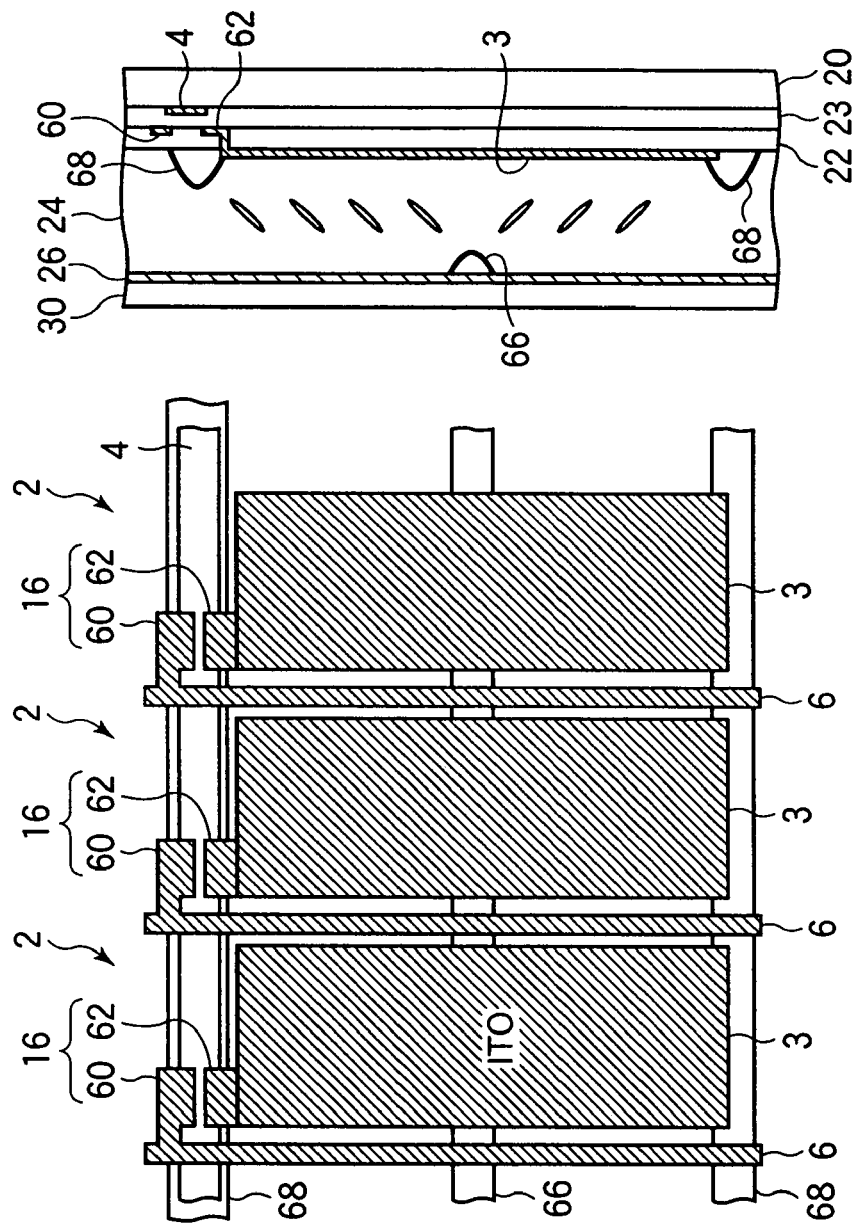

| PATTERN | W | SW | WG | H | SH | HG |
|---|---|---|---|---|---|---|
| D1 | 8 | 4 | 2 | 30 | 5 | 0 |
| D2 | 8 | 4 | 2 | 30 | 10 | 0 |
| D3 | 8 | 4 | 2 | 30 | 15 | 0 |
| D4 | 8 | 4 | 2 | 30 | 20 | 0 |

UNIT μm

| PATTERN | W | SW | WG | H | SH | HG |
|---------|---|----|----|---|----|----|
| F1 | 5 | 2 | 2 | 10 | 3 | 2 |
| F2 | 5 | 2 | 2 | 20 | 3 | 2 |
| F3 | 8 | 3 | 2 | 20 | 5 | 2 |
| F4 | 8 | 3 | 2 | 30 | 5 | 2 |

UNIT μm

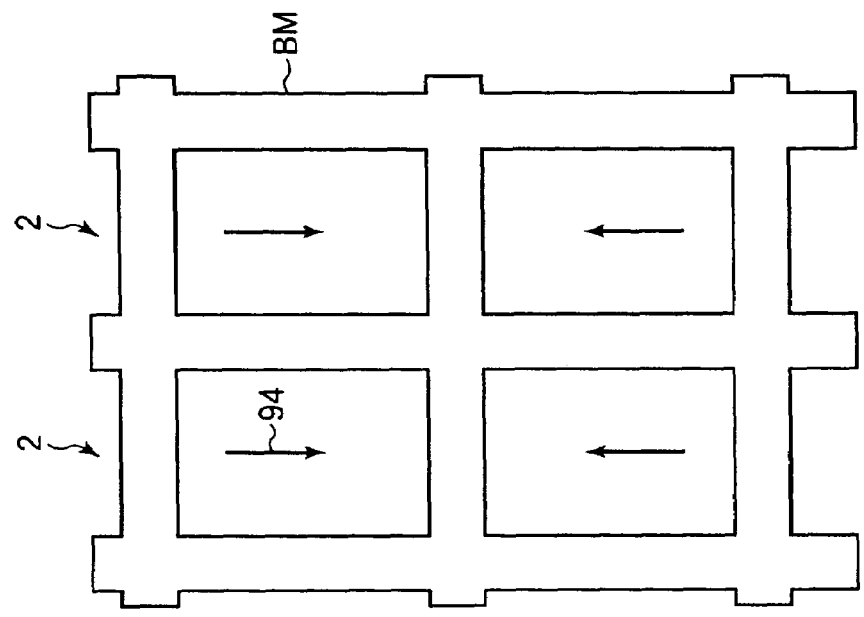
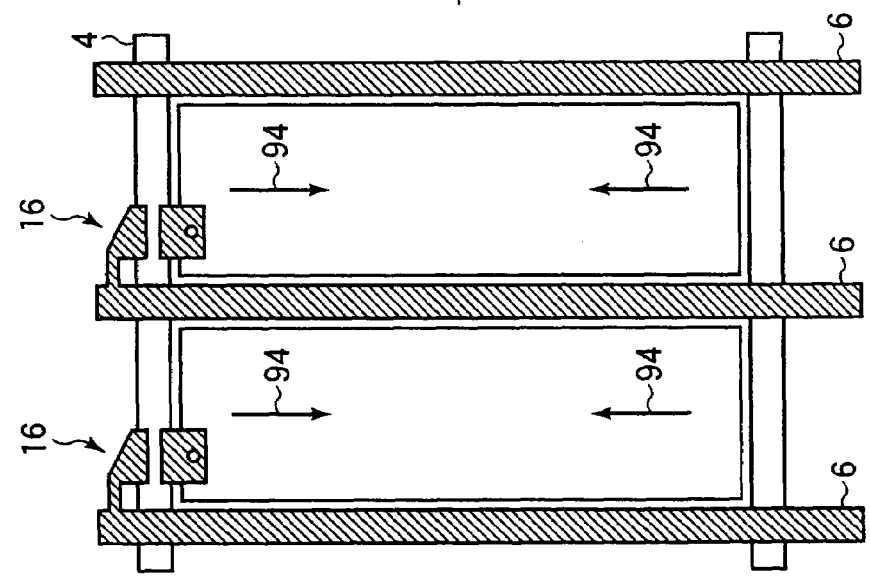
FIG.72A
FIG.72B

LIQUID CRYSTAL DISPLAY AND METHOD OF MANUFACTURING THE SAME

This is a Divisional of application Ser. No. 10/109,020, filed Mar. 28, 2002 now U.S. Pat. No. 7,113,241.

BACKGROUND OF THE INVENTION

1. Field of the Invention

The present invention relates to a liquid crystal display in which a liquid crystal layer containing a polymerizable component (monomer or oligomer), which is polymerized by light or heat, is sealed between substrates, and the polymerizable component is polymerized while a voltage is applied to the liquid crystal layer to fix a tilting direction of a liquid crystal molecules, and a method of manufacturing the same.

Besides, the present invention relates to a liquid crystal display of a VA (Vertically Aligned) mode in which a liquid crystal having a negative dielectric anisotropy is vertically aligned, and a method of manufacturing the same.

2. Description of the Related Art

A multi-domain vertical alignment mode liquid crystal display (hereinafter abbreviated to an MVA-LCD) is known in which a liquid crystal having a negative dielectric anisotropy is vertically aligned and a bank (linear protrusion) or a cut portion (slit) of an electrode is provided on the substrate as an alignment regulating structural member. Since the alignment regulating structural member is provided, even if a rubbing processing is not performed to an alignment film, liquid crystal alignment orientations at the time of voltage application can be controlled to be plural orientations. This MVA-LCD is superior to a conventional TN (Twisted Nematic) LCD in a visual angle property.

However, the conventional MVA-LCD has a defect that white luminance is low and a display is dark. The main cause of this is that since an upper portion of a protrusion or an upper portion of a slit becomes a boundary of alignment division to generate a dark line, the transmissivity at the time of a white display becomes low and the display becomes dark. In order to improve this defect, it is sufficient if an arrangement interval of the protrusions or slits is made sufficiently wide. However, since the number of the protrusions or slits as the alignment regulating structural members becomes small, there arises a problem that it takes a time to fix the alignment of LC molecule even if a predetermined voltage is applied to the liquid crystal, and a response speed becomes low.

In order to solve this problem and to obtain an MVA-LCD which has high luminance and enables a high speed response, a polymer fixation (macromolecule fixation) system is effective. In the polymer fixation system, a liquid crystal composite in which a polymerizable component of a monomer, an oligomer, or the like (hereinafter abbreviated to a monomer) is mixed in a liquid crystal, is sealed between substrates. In the state where liquid crystal molecules are tilted by applying a voltage between the substrates, monomers are polymerized into polymers. By this, a liquid crystal layer in which the molecules are tilted (inclined) at a predetermined tilt direction by voltage application is obtained, and tilting direction of the liquid crystal molecule can be fixed. A material which is polymerized by heat or light (ultraviolet ray) is selected as the monomer.

However, the polymer fixation system has some problems relating to unevenness of display when an image is displayed on a completed LCD. First, there is a problem that unevenness of display occurs on an image display of the completed LCD due to the alignment abnormality of liquid crystal locally generated in driving the liquid crystal at the time of monomer polymerization. Besides, there is also a problem that there occurs unevenness of display due to the abnormality of characteristics of thin film transistors (TFTs) caused by driving of liquid crystal and polymerization processing at the time of monomer polymerization.

FIG. 21A shows a liquid crystal driving method at the time of forming a polymer (polymerization) in a conventional MVA-LCD to which an alignment fixation processing by the polymer fixation system is performed. FIG. 21B shows the cause of the unevenness of display of the MVA-LCD in which the polymer formed by the liquid crystal driving method shown in FIG. 21A exists in a liquid crystal layer. Then-channel type TFTs are used in this MVA-LCD.

In general, in order to prevent a ghosting phenomenon, an alternating voltage is applied to a liquid crystal layer of an LCD. Then, also in a polymerization step at a stage of LCD manufacture, an alternating voltage is applied to the liquid crystal layer to tilt the liquid crystal molecules, and monomers are polymerized. For example, as shown in a graph of FIG. 21A, a gate voltage $Vg=33$ V is kept applied to all gate bus lines of a panel display region, and a TFT, which is provided in each pixel, is kept in an on state, and then, a drain voltage in which an alternating data voltage $Vd(ac)=\pm 7$ V is superimposed on a direct-current data voltage $Vd(dc)=13$ V is applied to all drain (data) bus lines. By this, $Vd(dc)+Vd(ac)$ is written to a pixel electrode formed in each pixel region. On the other hand, a common electrode arranged opposite to the pixel electrode across the liquid crystal layer is kept at a common voltage $Vc=13$ V. By this, the alternating voltage of the data voltage $Vd(ac)=\pm 7$ V is applied to the liquid crystal layer.

FIG. 21B shows the unevenness of display of the MVA-LCD fabricated by this liquid crystal driving method. FIG. 21B shows a display state of three pixels arranged in order of G (Green), B (Blue) and R (Red) from the left. A dark portion X1 and a bright portion X2 shown in a vertical ellipse in the drawing are seen. It is understood that as stated above, if polymer fixation is performed by the driving method shown in the graph of FIG. 21A, the alignment of the liquid crystal in the pixel, especially the alignment state in the vicinity of a pixel edge fluctuates and the dark portion X1 is formed as shown in FIG. 21B. Besides, there arises a problem that when the whole display region of the panel in the state like this is observed, the display is seen to be rough.

Besides, in the above liquid crystal driving method, the gate voltage Vg is made sufficiently larger than the voltage Vd (dc)+Vd(ac) of the drain bus line to turn on the TFT, and then, the voltage $Vd(dc)+Vd(ac)$ for tilting the liquid crystal molecules is applied to the drain bus line. However, if polymerization is made in this driving state, a large fluctuation occurs in threshold values of the respective TFTs provided in the respective pixels, and there arises a defect that a desired display can not be produced or the unevenness of display occurs since some TFT is not turned on in a portion on the display region of the completed LCD.

Besides, there is a case where an alignment regulating structural member is provided to keep the liquid crystal in a desired alignment orientation at the time of monomer polymerization. As the alignment regulating structural member, there is, for example, a structure used in a subsequent embodiment and shown in FIG. 4A. In this structure, linear cruciform connection electrodes 12 and 14 dividing a rectangular pixel into four rectangles of the same shape are formed. The connection electrode 12 is formed at the substantially center portion of the rectangular pixel and parallel with a long side, and the connection electrode 14 is formed on a storage capacitance bus line 18 crossing the substantially center portion in the pixel.

A plurality of stripe-like electrodes 8 of a minute electrode pattern are formed to be repeatedly extended from the connection electrodes 12 and 14 at an angle of 45°. A pixel electrode is constituted by the connection electrodes 12 and 14 and the plurality of stripe-like electrodes 8. A space 10 in a state in which a portion of an electrode is cut away is formed between the adjacent stripe-like electrodes 8. The stripe-like electrode 8 and the space 10 constitute an alignment regulating structural member. Incidentally, instead of the stripe-like electrode 8 and the space 10 of FIG. 4A, a minute linear protrusion may be naturally formed on a pixel electrode formed on the whole surface in a pixel.

When such a minute line and space pattern is formed, liquid crystal molecules are aligned in parallel with the longitudinal direction of the minute pattern. By doing so, alignment division boundary portions in the pixel can be made as small as possible. However, there arises a problem that T-V characteristics (transmissivity—gradation voltage characteristics) are changed by slight fluctuation of the width of the minute electrode pattern due to fluctuation of an exposure pattern in a photolithography process, and this is seen as the unevenness of display.

Besides, as described above, since a rubbing processing is not performed to the alignment film in the MVA-LCD, means for regulating the alignment orientation with respect to liquid crystal molecules in the outside region of the pixel electrode is not provided. Thus, as shown in FIG. 20A, there is a case where singular points (indicated by ○ or ● in the drawing) of alignment vectors are generated outside the pixel electrode at random, and the alignment is maintained as it is. Thus, if monomers are polymerized in a state where liquid crystal molecules 24a outside the pixel electrode or in the vicinity of an edge of the pixel electrode are aligned in an orientation other than a desired one, as shown in FIG. 20A, a dark line is formed in a region connecting the adjacent singular points, and there arises a problem that the luminance is lowered, a response time becomes long, or the unevenness of display occurs.

SUMMARY OF THE INVENTION

An object of the present invention is to provide a liquid crystal display in which an alignment orientation of a liquid crystal is regulated by using a polymer fixation method so that a wide angle of view can be obtained and a response time at a halftone can be shortened, and a method of manufacturing the same.

The above object can be achieved by a method of manufacturing a liquid crystal display having n-channel TFTs, which comprises steps of sealing a liquid crystal layer containing a polymerizable component, which is polymerized by light or heat, between substrates, and polymerizing the polymerizable component while a voltage is applied to the liquid crystal layer to regulate a pretilt angle of a liquid crystal molecule and/or a tilt direction at a time of driving, and is characterized in that the voltage is applied to the liquid crystal layer under a voltage application condition 2 subsequently to a voltage application condition 1 mentioned below, and the polymerizable component is polymerized at a stage of the voltage application condition 2;

voltage application condition 1: $V_g > V_d$ (dc) $= V_c$, and
voltage application condition 2: $V_c > V_d$ (dc),
where,
$V_g$: applied voltage to a gate bus line,
$V_c$: applied voltage to a common electrode, and
$V_d$ (dc): applied voltage (direct-current component) to a drain bus line.

BRIEF DESCRIPTION OF THE DRAWINGS

FIGS. 4A and 4B are views for explaining a fourth principle of the liquid crystal display and the method of manufacturing the same according to the first embodiment of the present invention;

FIG. 8 is a view showing results of alignment states in pixels and roughness of display of LCDs obtained in examples 1-1 and 1-2 of the first embodiment of the present invention and comparative examples 1-1 and 1-2;

FIGS. 9A to 9F are views showing the change of liquid crystal alignment states resulting from the level change of a gate voltage Vg;

FIG. 10 is a view showing the relation between the alignment state and the unevenness due to the threshold shift of TFTs with respect to gate voltage Vg;

FIG. 17 is a view for explaining the example 1-7 of the liquid crystal display and the method of manufacturing the same according to the first embodiment of the present invention;

FIGS. 19A and 19B are views for explaining the example 1-9 of the liquid crystal display and the method of manufacturing the same according to the first embodiment of the present invention;

FIGS. 20A and 20B are views showing singular points of alignment vectors;

FIGS. 22A and 22B are views showing an MVA-LCD having a half divided alignment region, wherein FIG. 22A shows a state in which one pixel 2 of the MVA-LCD is viewed in the direction of a normal of a substrate, and FIG. 22B shows a section obtained by cutting the MVA-LCD shown in FIG. 22A along a line parallel with a drain bus line 6;

FIG. 50 is a view showing a tilt direction and a tilt angle θp of a liquid crystal molecule 24a;

FIGS. 72A and 72B are views showing a state in which two adjacent pixels 2 are viewed in the direction of a normal of a substrate surface in the liquid crystal display of the example 8-1 according to the eighth embodiment of the present invention;

DETAILED DESCRIPTION OF THE PREFERRED EMBODIMENTS

First Embodiment

Figure 1B:
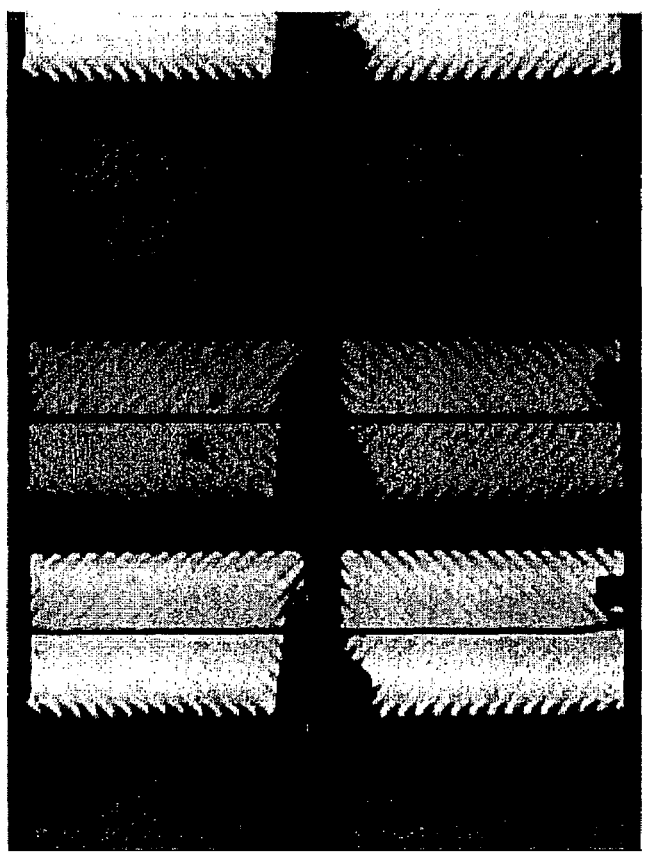
FIGS. 1A and 1B are views for explaining a first principle of a liquid crystal display and a method of manufacturing the same according to a first embodiment of the present invention.
Figure 1A:
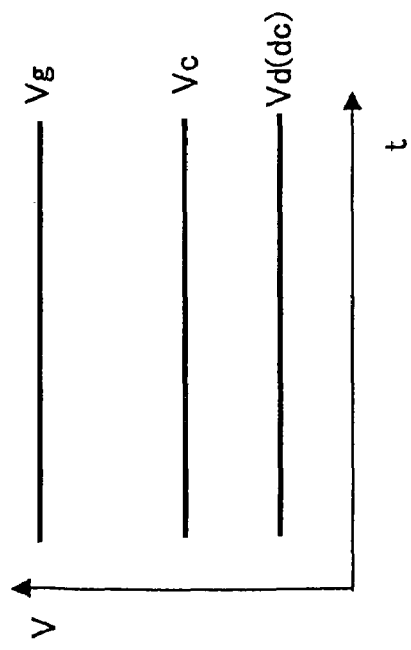

A liquid crystal display according to a first embodiment of the present invention and a method of manufacturing the same will be described with reference to FIGS. 1A to 21B. First, a first principle of the liquid crystal display and the method of manufacturing the same according to this embodiment will be described with reference to FIGS. 1A and 1B. FIG. 1A shows a liquid crystal driving method according to the first principle at the time of polymer polymerization in an MVA-LCD to which an alignment fixation processing by a polymer fixation system is performed. FIG. 1B shows a display state of the MVA-LCD in which a polymer formed by the liquid crystal driving method of the first principle shown in FIG. 1A exists in a liquid crystal layer. The n-channel type TFTs are used in this MVA-LCD.

In a polymerization step of a manufacturing stage of an LCD, the liquid crystal driving method according to the first principle is based on direct-current voltage driving, and an alternating voltage is not applied to the liquid crystal layer. Further, a voltage sufficiently higher than that of a drain (data) bus line is applied to a gate bus line, and a voltage of a common electrode is made higher than the voltage of the drain bus line (pixel electrode). By doing so, as compared with the conventional example shown in FIGS. 21A and 21B, there is no disturbance of a liquid crystal alignment in a pixel and it is possible to obtain a display having no roughness even when the whole panel is viewed.

For example, as shown in a graph of FIG. 1A, a gate voltage Vg=33 V is kept applied to all gate bus lines of a panel display region, a TFT provided for each pixel is kept turned on, and a direct-current data voltage Vd (dc)=13 V is applied to all drain bus lines. By this, Vd (dc) is written to a pixel electrode formed in each pixel region. On the other hand, a common electrode arranged opposite to the pixel electrode across the liquid crystal layer is kept at a common voltage Vc=20 V. By this, a direct-current voltage of −7 V with respect to the common potential is applied to the liquid crystal layer.

A display of the MVA-LCD fabricated by this liquid crystal driving method is shown in FIG. 1B. FIG. 1B shows a display state of three pixels arranged in order of G (Green), B (Blue)

and R (Red) from the left. It is understood that if polymer fixation is performed by the driving method shown in the graph of FIG. 1A, as shown in FIG. 1B, the fluctuation of the liquid crystal alignment in the pixel, especially the fluctuation of the alignment state in the vicinity of a pixel edge disappears, and the dark portion X1 of FIG. 21B disappears. By this, unevenness of display disappears, and even when the whole display region of the panel is observed, roughness of display is not seen.

Figure 2B:
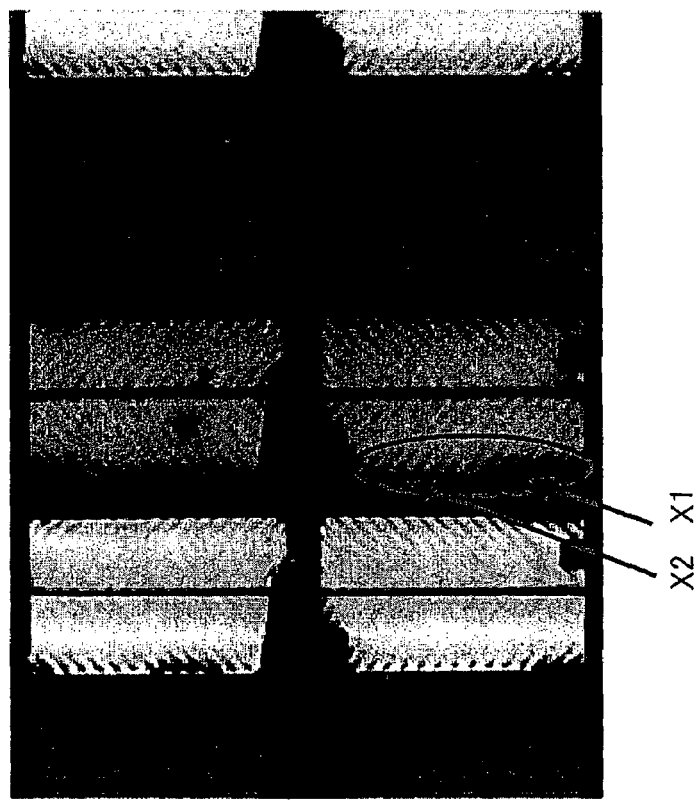
FIGS. 2A and 2B are views for explaining a second principle of the liquid crystal display and the method of manufacturing the same according to the first embodiment of the present invention.
Figure 2A:
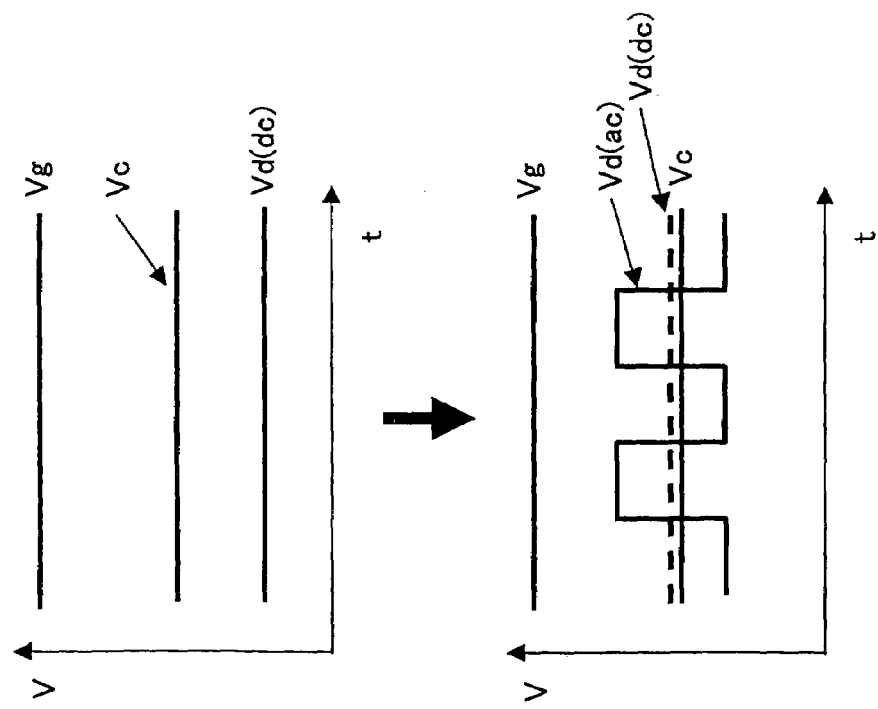

Next, a second principle of the liquid crystal display and the method of manufacturing the same according to this embodiment will be described with reference to FIGS. 2A and 2B. FIG. 2A shows a liquid crystal driving method according to the second principle. FIG. 2B shows a display state of an MVA-LCD in which a polymer formed by the liquid crystal driving method of the second principle shown in FIG. 2A exists in a liquid crystal layer.

In a polymerization step of monomers in the liquid crystal layer sealed between substrates, according to a liquid crystal driving method of the second principle, a voltage sufficiently higher than that of a drain bus line is applied to a gate bus line, and a voltage of a common electrode is made higher than the voltage of the drain bus line (pixel electrode). Thereafter, while the potential of the common electrode is made to approach the voltage of the pixel electrode, an alternating voltage is simultaneously applied to the pixel electrode. The direct-current voltage is first applied to the liquid crystal layer, and thereafter, the alternating voltage is applied. Also in this case, as compared with the conventional example of FIGS. 21A and 21B, there is no disturbance of a liquid crystal alignment in a pixel, and a display without roughness can be obtained even when the whole panel is viewed.

For example, as shown by a graph at the upper side of FIG. 2A, a gate voltage Vg=33 V is kept applied to all gate bus lines of a panel display region, a TFT provided in each pixel is kept turned on, and a direct-current data voltage Vd (dc)=13V is applied to all drain bus lines. By this, Vd (dc) is written to the pixel electrode formed in each pixel region. On the other hand, the common electrode arranged opposite to the pixel electrode across the liquid crystal layer is kept at a common voltage Vc=20 V. By this, a direct-current voltage of −7 V with respect to the common potential is applied to the liquid crystal layer.

Next, as shown by a graph at the lower side of FIG. 2A, the common voltage Vc is made to gradually approach the data voltage Vd (dc)=13 V from 20 V. At the same time, an alternating data voltage Vd (ac) is superimposed on the direct-current data voltage Vd (dc)=13 V while its level is gradually increased to ±7 V. By this, Vd (dc)+Vd (ac) is written to the pixel electrode formed in each pixel region. The direct-current voltage is first applied to the liquid crystal layer, and then, the alternating voltage is applied.

A display of the MVA-LCD fabricated by this liquid crystal driving method is shown in FIG. 2B. FIG. 2B shows a display state of three pixels having a similar construction to FIG. 1B. When the polymer fixation is performed by the driving method shown in the graph of FIG. 2A, as shown in FIG. 2B, although a slight fluctuation occurs in an alignment state in the vicinity of a pixel edge, a dark portion X1 of FIG. 2B is smaller than the dark portion X1 of FIG. 21B, and the fluctuation of luminance is decreased. By this, unevenness of display can be reduced, and roughness of display can be reduced even when the whole display region of the panel is observed.

Next, a third principle of the liquid crystal display and the method of manufacturing the same according to this embodiment will be described with reference to FIGS. 3A and 3B.

Figure 3A:
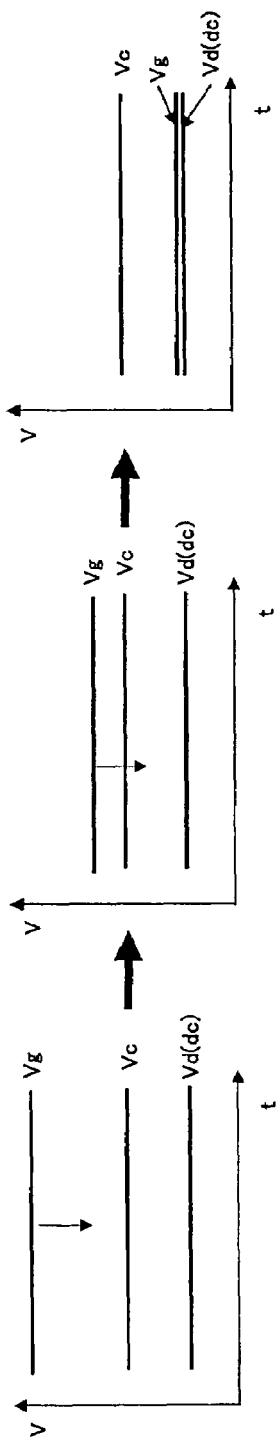
FIGS. 3A and 3B are views for explaining a third principle of the liquid crystal display and the method of manufacturing the same according to the first embodiment of the present invention.
Figure 3B:
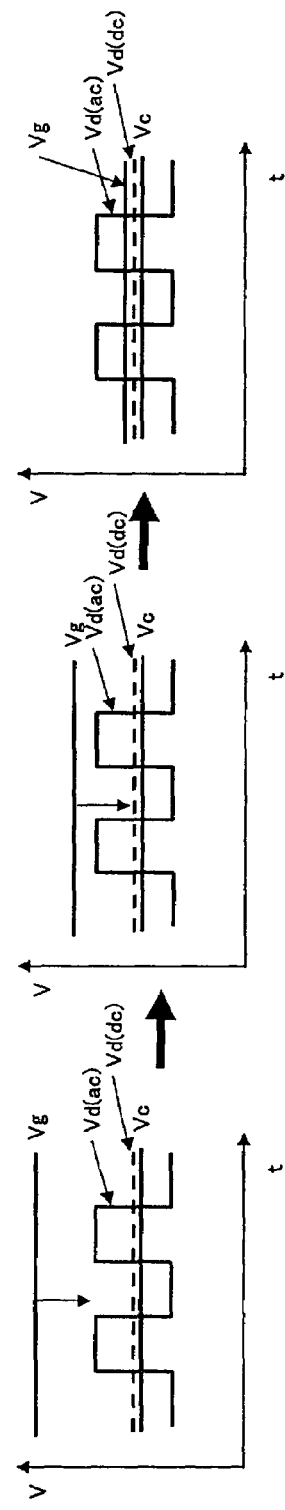

FIG. 3A shows the third principle in which another driving method is added to the liquid crystal driving method according to the first principle, and FIG. 3B shows the third principle in which another driving method is added to the liquid crystal driving method according to the second principle.

Left graphs of FIGS. 3A and 3B respectively show the driving methods of the first and second principles shown in FIGS. 1A and 1B and FIGS. 2A and 2B. Subsequently to the liquid crystal driving by these driving methods, the applied voltage Vg to the gate bus line is gradually lowered as indicated by an arrow in the drawing and is made to approach the applied voltage (data voltage Vd (dc)+Vd (ac)) to the drain bus line (see the center and right graphs in the drawing). By polymerizing monomers in this state, it is possible to suppress the fluctuation of threshold values of TFTs and to obtain a panel in which unevenness of display does not occur.

Figure 5:
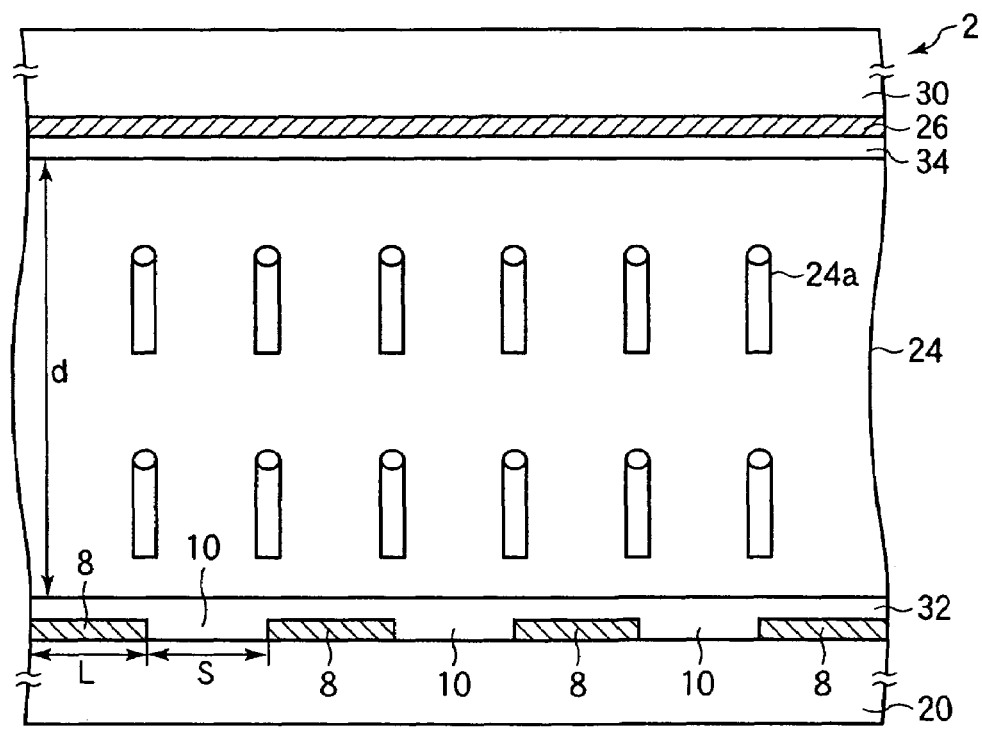
FIG. 5 is a view for explaining the fourth principle of the liquid crystal display and the method of manufacturing the same according to the first embodiment of the present invention.

Next, a fourth principle of the liquid crystal display and the method of manufacturing the same according to this embodiment will be described with reference to FIGS. 4A to 5. FIG. 4A shows one pixel 2 viewed in the direction of a normal of a substrate surface. Since FIG. 4A is already explained in the section of describing the related art, the explanation is omitted. FIG. 4B shows a partial section taken along line A-A of FIG. 4A. FIG. 5 shows a partial section taken along line B-B of FIG. 4A.

In FIGS. 4B and 5, a drain bus line 6 is formed on a glass substrate 20 on the side of an array substrate, and an insulating film 22 is formed thereon. A pixel electrode is formed on the insulating film 22 by connection electrodes 12 and 14 and a plurality of stripe-like electrodes 8. An alignment film 32 in contact with a liquid crystal layer 24 is formed on the pixel electrode. An opposite substrate is arranged opposite to the glass substrate 20 across the liquid crystal layer 24. A color filter layer 28 is formed on a glass substrate 30 on the side of the opposite substrate, and a common electrode 26 is formed thereon. An alignment film 34 is formed on the common electrode 26 and is in contact with the liquid crystal layer 24. The thickness of the liquid crystal layer 24 is regulated to a predetermined cell gap d. As shown in FIG. 5, a liquid crystal molecule 24a is aligned in parallel with an extension direction of the stripe-like electrode 8 by alignment regulation caused by the stripe-like electrode 8 and the space 10.

In the fourth principle, an electrode width L of the stripe-like electrode 8 shown in FIGS. 4A and 5 is made larger than a width S of the space 10. By doing so, the change of transmissivity with respect to a pattern fluctuation occurring at the time of patterning process (exposure, development, etching) of the stripe-like electrode 8 is decreased, and the unevenness of display can be improved.

Figure 6:
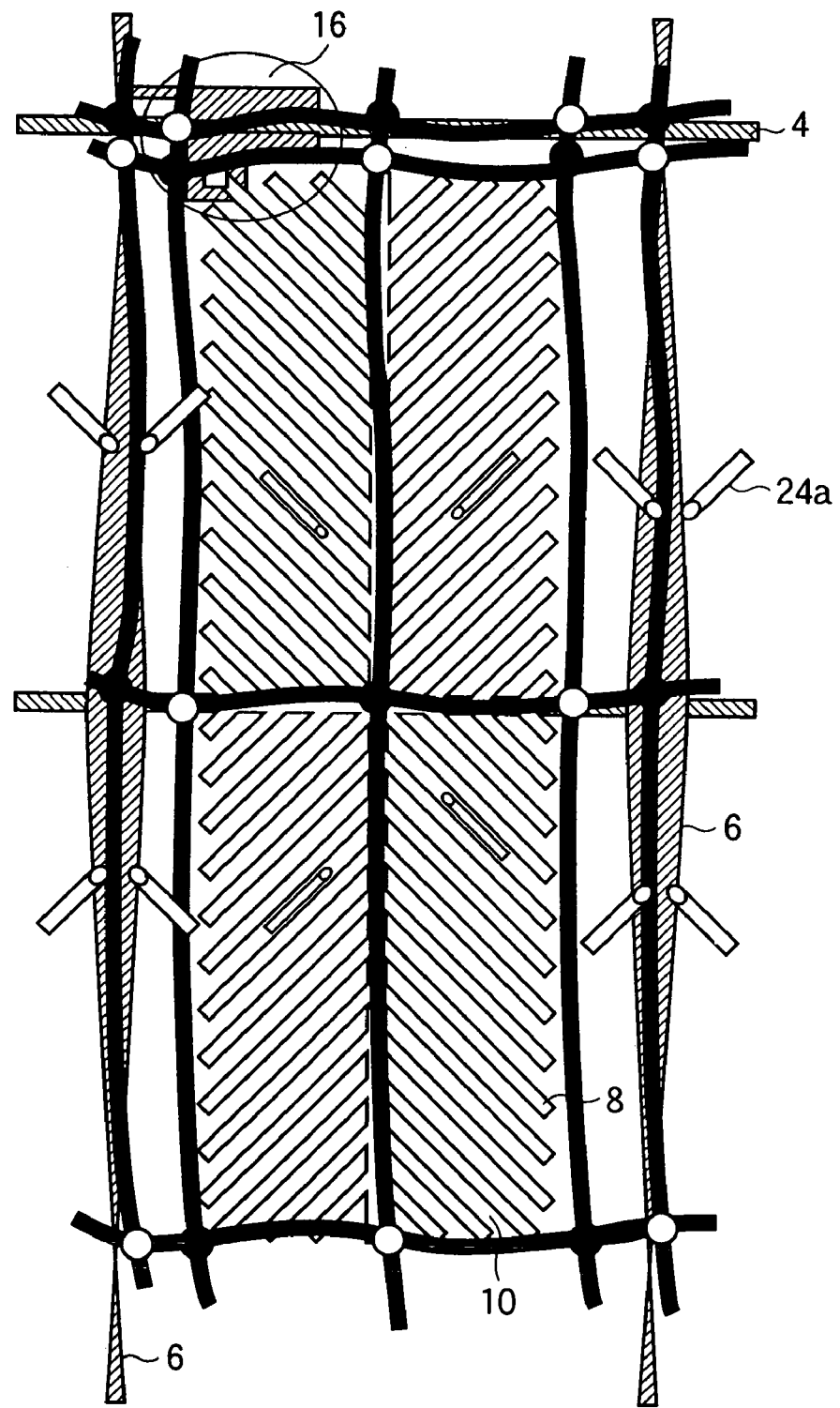
FIG. 6 is a view for explaining a fifth principle of the liquid crystal display and the method of manufacturing the same according to the first embodiment of the present invention.

Next, a fifth principle of the liquid crystal display and the method of manufacturing the same according to this embodiment will be described with reference to FIG. 6. FIG. 6 shows a construction of one pixel viewed in the direction of a normal of a substrate surface. By changing the width of a bus line (in this example, the width of a drain bus line) in the extension direction, a control can be made so that occurrence positions of singular points (indicated by ○ or ● in the drawing) of alignment vectors become definite positions. That is, the bus line is made an alignment regulating structure, and the singular points of the alignment vectors of liquid crystal molecules outside the pixel electrode can be formed at the definite positions. By this, since the alignment of liquid crystal outside the pixel electrode become fixed, monomers are polymerized while occurrence of a dark line as shown in FIG. 20A is suppressed, and the luminance and the unevenness of display can be improved.

The liquid crystal display according to this embodiment using the above first to fifth principles and the method of manufacturing the same will be specifically described using examples and comparative examples.

EXAMPLE 1-1

This example will be described using FIGS. 1A and 1B and FIGS. 4A and 4B again. In this example, an XGA panel (pixel pitch was 297 μm, and the number of pixels was 1024×768) having a size of 15 inches in diagonal was fabricated. The pixel structure of the panel is shown in FIGS. 4A and 4B. An n-channel TFT 16, a drain bus line 6, a gate bus line 4, and a pixel electrode formed of connection electrodes 12 and 14 and a plurality of stripe-like electrodes 8 were formed on an array substrate including a glass substrate 20. A color filter layer 28 and a common electrode 26 were formed on an opposite substrate including a glass substrate 30. A glass substrate having a thickness of 0.7 mm was used as a substrate material. The plurality of stripe-like electrodes 8 were formed to extend in four directions (upper right, lower right, upper left, lower left) from the center portion of the pixel, respectively. The electrode width of the stripe-like electrode 8 was made 3 μm, and the width of the space 10 was made 3 μm. Vertically aligned films (polyimide material) were formed on these substrates by using a printing method, and a heat treatment at 180° C. for 60 minutes was carried out. These substrates were bonded to each other through a spacer of a diameter of 4 μm, and an empty cell (a cell in a state where liquid crystal is not injected) was fabricated. A liquid crystal having a negative dielectric anisotropy added with a trace amount of photopolymerization monomer was injected into the thus obtained cell, and a liquid crystal panel was fabricated. The addition amount of the photopolymerization monomer was made 2.4 wt %.

Next, ultraviolet (UV) light was irradiated to the liquid crystal layer 24 in a state where a voltage was applied, and the photo-polymerizable monomer was polymerized. As shown in FIGS. 3A and 3B as well, the driving voltage was applied to the liquid crystal layer 24 under a voltage application condition 2 subsequently to a voltage application condition 1 mentioned below, and light irradiation to the liquid crystal layer 24 was performed at the stage of the voltage application condition 2;

voltage application condition 1: Vg=33 V, Vc=Vd (dc)=13 V, and voltage application condition 2: Vg=33 V, Vc=20 V, Vd (dc)= 13 V.

The procedure of the voltage application will be described more particularly. First, the gate voltage Vg was made Vg=Vc=Vd (dc)=13 V. Next, the gate voltage Vg was raised up to 33 V. The speed of a voltage rise was made about 1 V/sec. Next, the common voltage Vc was raised up to 20 V. The speed of a voltage rise was made about 1 V/sec. Especially, it is preferable that this voltage rise is a continuous change, and if the voltage is abruptly raised, there is a case where a disturbance of alignment occurs in a pixel. Incidentally, in this example, although the common voltage Vc was raised up to 20 V, since it is sufficient if the common voltage Vc>the data voltage Vd (dc) is satisfied, for example, the data voltage Vd (dc) may be dropped without changing the common voltage Vc.

The amount of light irradiation for polymerization was made about 2000 mJ/cm$^2$ (wavelength λ=365 nm). There was no disturbance in the alignment state in the pixel, and a display having no feeling of roughness was obtained. Incidentally, when the voltage is changed from the driving condition 1 to the driving condition 2, if the common voltage Vc is once made higher than a predetermined value and is dropped, the feeling of roughness is further improved. For example, it is appropriate that the common voltage is raised from Vc=13 V to Vc=23 V, and then is dropped to Vc=20 V.

COMPARATIVE EXAMPLE 1-1

Figure 7B:
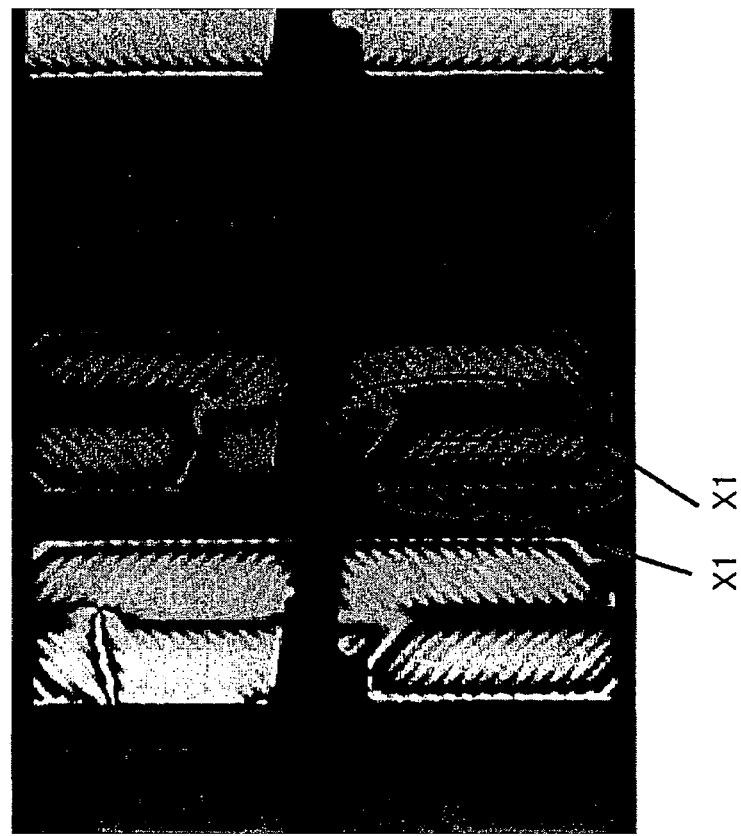
FIGS. 7A and 7B are views for explaining a comparative example 1-1 of the first embodiment of the present invention.
Figure 7A:
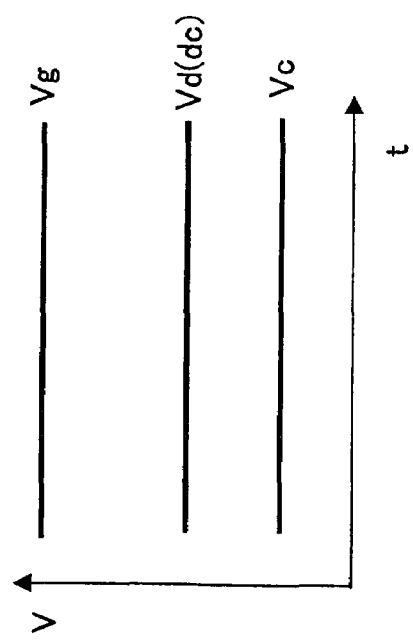

A comparative example will be described with reference to FIGS. 7A and 7B. This comparative example is the same as the example 1-1 except for the following requirements. The driving voltage was applied to the liquid crystal layer 24 under a voltage application condition 2 subsequently to a voltage application condition 1 mentioned below, and light irradiation to the liquid crystal layer 24 was performed at the stage of the voltage application condition 2;

voltage application condition 1: Vg=33 V, Vc=Vd (dc)=13 V, and voltage application condition 2: Vg=33 V, Vc=6 V, Vd (dc)= 13 V.

As compared with the example 1-1, in this comparative example, the magnitude relation of the common voltage Vc and the data voltage Vd (dc) is reversed. In the case of this comparative example, the alignment in the pixel was greatly disturbed, and roughness was seen on the display.

COMPARATIVE EXAMPLE 1-2

Figure 21B:
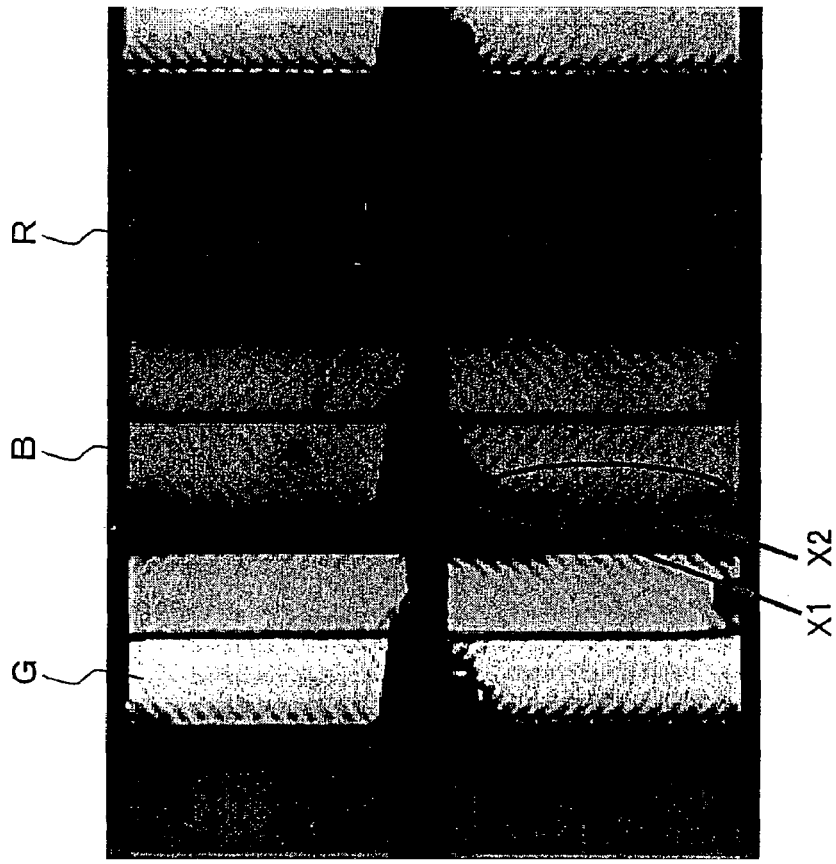
FIGS. 21A and 21B are views showing a liquid crystal driving method at the time of forming a polymer (polymerization) in a conventional MVA-LCD to which an alignment fixation processing by a polymer fixation system is performed.
Figure 21A:
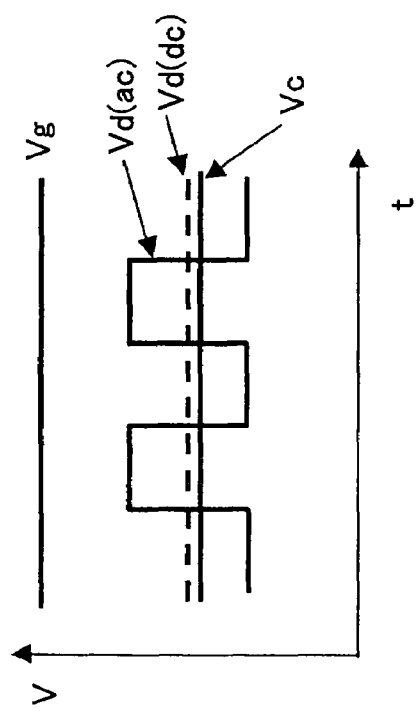
Figure 23:
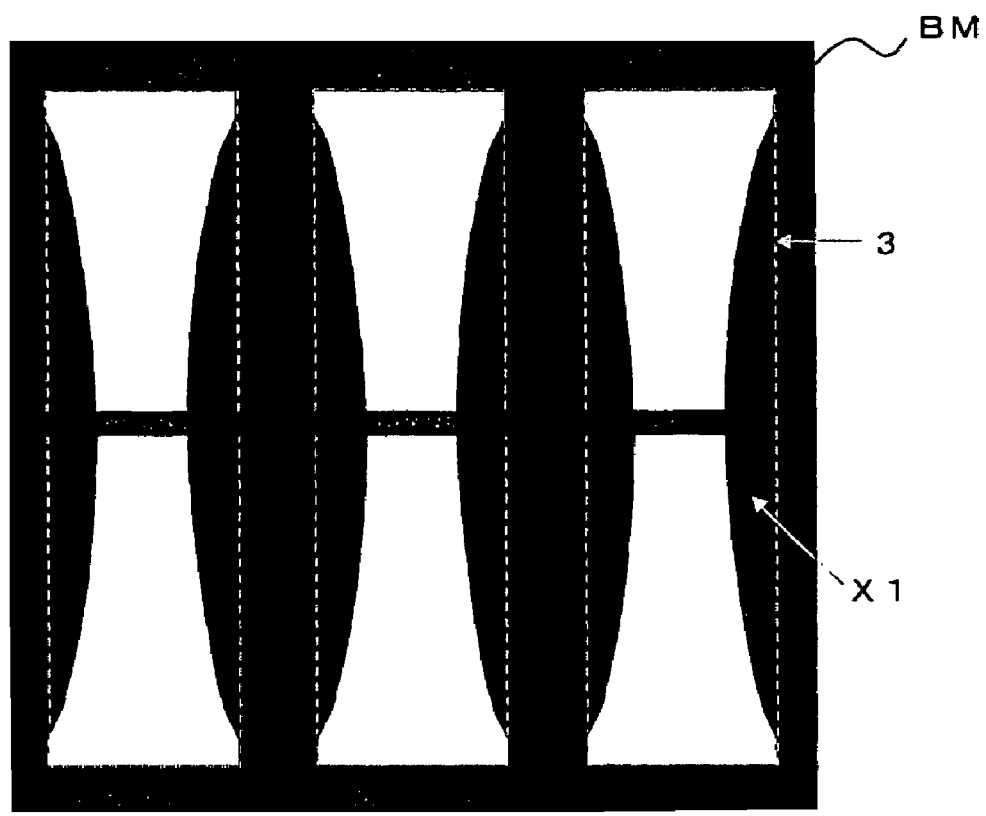
FIG. 23 is a microscopic observation view of a pixel.

This comparative example will be described with reference to FIGS. 21A and 21B. This comparative example is the same as the example 1-1 except for the following requirements. The driving voltage was applied to the liquid crystal layer 24 under a voltage application condition 2 subsequently to a voltage application condition 1 mentioned below, and light irradiation to the liquid crystal layer 24 was performed at the stage of the voltage application condition 2;

voltage application condition 1: Vg=33 V, Vc=Vd (dc)=13 V, and voltage application condition 2: Vg=33 V, Vc=13 V, Vd (dc)= 13 V, Vd (ac)=7 V (rectangular wave of 30 Hz).

The alternating voltage is applied to the pixel electrode, and this driving method is closest to an actual liquid crystal driving system of an LCD. However, in this case, there was a disturbance in the alignment in the vicinity of a pixel edge portion and roughness was seen on the display.

EXAMPLE 1-2

This example will be described with reference to FIGS. 2A and 2B. This example is the same as the example 1-1 except for the following requirements. The driving voltage was applied to the liquid crystal layer 24 under a voltage application condition 2 subsequently to a voltage application condition 1 mentioned below, and the driving voltage was further applied under a voltage application condition 3, and light irradiation to the liquid crystal layer 24 was performed at the stage of the voltage application condition 3;

voltage application condition 1: Vg=33 V, Vc=Vd (dc)=13 V, voltage application condition 2: Vg=33 V, Vc=20 V, Vd (dc)= 13 V, and voltage application condition 3: Vg=33 V, Vc=Vd (dc)=13 V, Vd (ac)=7 V (30 Hz).

After the liquid crystal driving similar to the example 1-1, while the common voltage Vc was made to gradually approach the value of the data voltage Vd (dc), the amplitude of the data voltage Vd (ac) was gradually increased. By this, in this example, although the alignment of a pixel edge was slightly disturbed, a display without the feeling of roughness was obtained.

FIG. 8 shows results of alignment states in pixels and roughness of display of LCDs obtained in the examples 1-1, 1-2 and the comparative examples 1-1 and 1-2. In the drawing, ○ denotes "good", Δ denotes "acceptable", and x denotes "inferior".

EXAMPLE 1-3

Next, this example will be described with reference to FIG. 3A. This example is the same as the example 1-1 except for the following requirements. The driving voltage was applied to the liquid crystal layer 24 under a voltage application condition 2 subsequently to a voltage application condition 1 mentioned below, and was further applied under a voltage application condition 3, and light irradiation for polymerization of a photo-polymerizable monomer was performed to the liquid crystal layer 24 at the stage of the voltage application condition 3;

voltage application condition 1: Vg=33 V, Vc=Vd (dc)=13 V, voltage application condition 2: Vg=33 V, Vc=20 V, Vd (dc)=13 V, and voltage application condition 3: Vg=13 V, Vc=20 V, Vd (dc)=13 V.

That is, after the liquid crystal driving similar to the example 1-1 was performed, the level of the gate voltage Vg was gradually lowered and was made equal to the data voltage Vd (dc).

By doing so, in the case where UV irradiation was performed to the liquid crystal layer 24 by only the driving of the example 1-1, there was a case where unevenness of display caused by the threshold fluctuation of TFTs occurred, however, in the case where the liquid crystal driving as described in this example was made, the unevenness of display caused by the threshold fluctuation of the TFTs was completely eliminated, and the liquid crystal alignment in the pixel was almost excellent.

FIGS. 9A to 9F show the change of liquid crystal alignment states resulting from the level change of the gate voltage Vg. FIGS. 9A to 9F show display states in which the gate voltages Vg are 33 V, 26 V, 20 V, 13 V, 10 V, and 6 V. FIG. 9A shows the same state as FIG. 1B. As shown in FIGS. 9B to 9D, the alignment state is almost stable up to the gate voltage Vg=Vd (dc)=13 V. As shown in FIGS. 9E and 9F, when the gate voltage becomes Vg<Vd (dc), a noticeable dark line appears in the vicinity of the gate bus line. Accordingly, if a polymer is formed in the state of the gate voltage Vg<Vd (dc), although the unevenness of display or the roughness caused by the threshold shift of the TFTs does not occur, the display luminance is lowered.

Next, FIG. 10 shows the relation between the alignment state and the roughness caused by the threshold shift of the TFTs with respect to the gate voltage Vg. As shown in FIG. 10, it can be said that in the liquid crystal panel used in this example, the gate voltage Vg=13 to 20 V is the optimum driving condition. Especially, the gate voltage Vg=13 V has the same value as the data voltage Vd (dc), and the potential distribution on the array substrate on which the TFTs are formed can be made flat. Accordingly, since the influence of an unnecessary horizontal electric field is reduced at the pixel electrode edge, the disturbance of alignment can not be occurred, and it can be said that the voltage is a preferable liquid crystal driving condition at the time of polymerization.

EXAMPLE 1-4

Next, this example will be described with reference to FIG. 3B. This example is the same as the example 1-1 except for the following requirements. The driving voltage was applied to the liquid crystal layer 24 under a voltage application condition 2 and a voltage application condition 3 in this sequence subsequently to a voltage application condition 1 mentioned below, and the driving voltage was further applied thereto under a voltage application condition 4, and light irradiation was performed to a photo-polymerizable monomer of the liquid crystal layer 24 at the stage of the voltage application condition 4;

voltage application condition 1: Vg=33 V, Vc=Vd (dc)=13 V, voltage application condition 2: Vg=33 V, Vc=20 V, Vd (dc)=13 V, voltage application condition 3: Vg=33 V, Vc=Vd (dc)=13 V, Vd (ac)=7 V (30 Hz), and voltage application condition 4: Vg=13 V, Vc=Vd (dc)=13 V, Vd (ac)=7 V (30 Hz).

That is, after the liquid crystal driving similar to the example 1-2 was performed, the level of the gate voltage Vg was gradually lowered and was made equal to the data voltage Vd (dc).

By doing so, in the case where UV irradiation was performed to the liquid crystal layer 24 by only the driving of the example 1-1, there was a case where unevenness of display caused by the threshold fluctuation of TFTs occurred, however, in the case where the liquid crystal driving as described in this example was performed, the unevenness of display caused by the threshold fluctuation of the TFTs was completely eliminated, and the liquid crystal alignment in the pixel was almost excellent.

EXAMPLE 1-5

This example will be described with reference to FIGS. 11A to 14B in addition to FIGS. 4A to 5. This example is the same as the example 1-3 except for the following requirements.

In this example, the pattern width L of the stripe-like electrode 8 shown in FIGS. 4A, 4B and 5 is made larger than the space width S of the space 10. Specifically, the widths are conventionally L=3 μm and S=3 μm, however, in this example, the widths are made L=4 μm and S=2 μm. FIGS. 11A to 14B show the rate of change of transmissivity at a halftone display in the case where the width L of the stripe-like electrode 8 is formed to be shifted from a design value by about 0.2 μm.

Figures 11A, 11B:
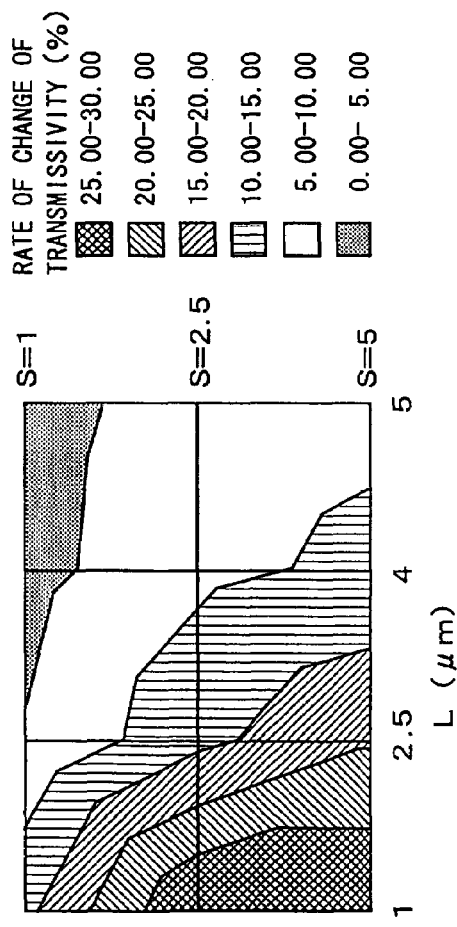
FIGS. 11A and 11B are views showing results of a simulation showing the rate of change of transmissivity at a halftone display in a case where a width L of a stripe-like electrode 8 is formed to be shifted from a design value by about 0.2 μm in example 1-5 according to the first embodiment of the present invention.
Figures 12A, 12B:
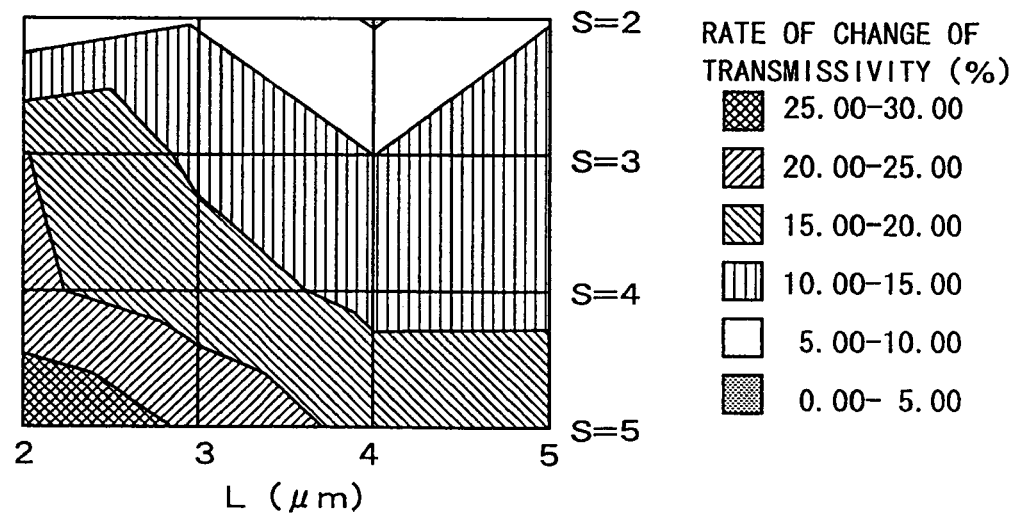
FIGS. 12A and 12B are views showing actually measured values of the rate of change of transmissivity at a halftone display in a case where the width L of the stripe-like electrode 8 is formed to be shifted from the design value by about 0.2 μm in the example 1-5 according to the first embodiment of the present invention.
Figures 13A, 13B:
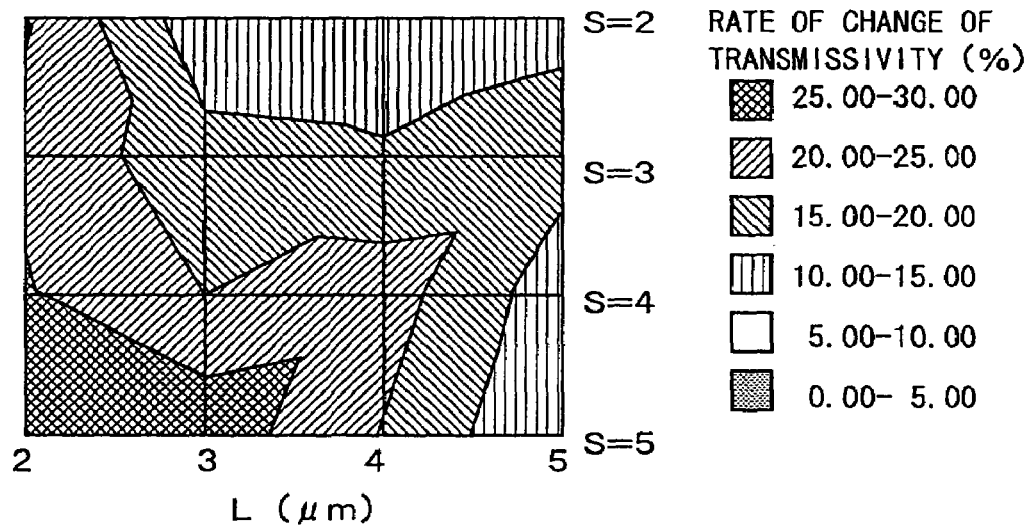
FIGS. 13A and 13B are views showing actually measured values of the rate of change of transmissivity at a halftone display in a case where the width L of the stripe-like electrode 8 is formed to be shifted from the design value by about 0.2 μm in the example 1-5 according to the first embodiment of the present invention.
Figures 14A, 14B:
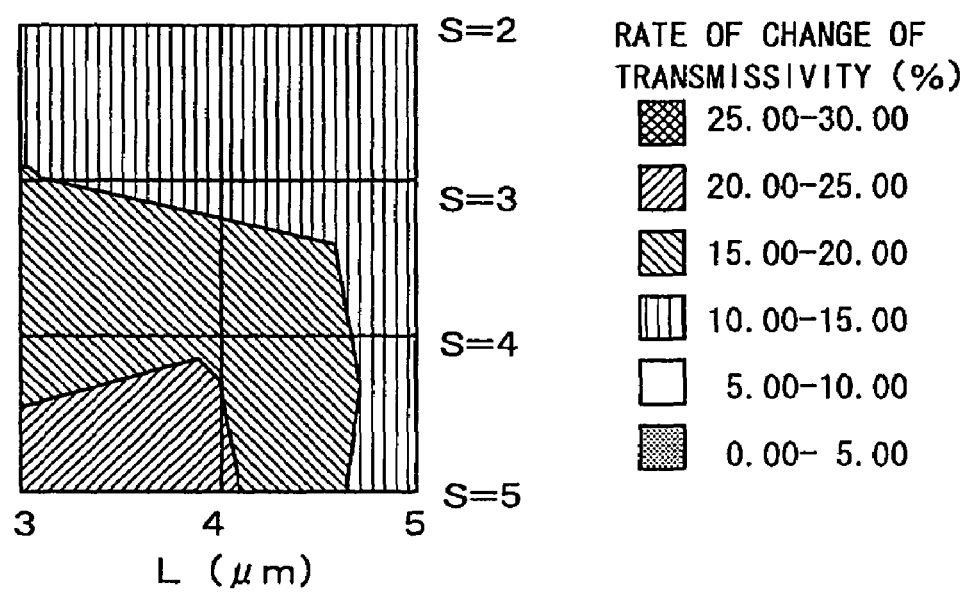
FIGS. 14A and 14B are views showing actually measured values of the rate of change of transmissivity at a halftone display in a case where the width L of the stripe-like electrode 8 is formed to be shifted from the design value by about 0.2 μm in the example 1-5 according to the first embodiment of the present invention.

FIGS. 11A and 11B show results of a simulation, and FIGS. 12A to 14B show actually measured values obtained from actual liquid crystal cells. FIGS. 12A and 12B show the values of liquid crystal panels having a cell gap d=4 μm, FIGS. 13A and 13B show the values of liquid crystal panels having a cell gap d=3.5 μm, and FIGS. 14A and 14B show the values of liquid crystal panels having a cell gap d=4.5 μm. FIGS. 11A to 14A show the rate of change of transmissivity in the case where the pattern width L (design value) of the stripe-like electrode 8 is taken in the horizontal direction, the space width S (design value) is taken in the vertical direction, and the driving voltage of 3 V is applied to the liquid crystal layer 24. In FIG. 11A, the pattern width L=1 µm to 5 µm is divided at intervals of 0.5 µm, and the space width S=1 µm to 5 µm is divided at intervals of 0.5 µm. In FIGS. 12A to 14B, the pattern width L=2 µm to 5 µm is divided at intervals of 1 µm, and the space width S=1 µm to 5 µm is divided at intervals of 1 µm.

A description will be given while the rate of change of transmissivity at L=3 and S=3 of FIG. 11A is cited as an example. For example, it is assumed that transmissivity is A % in the case where a driving voltage of 3 V is applied to a liquid crystal layer of a liquid crystal panel of, for example, L=3 µm (design value) and S=3 µm (design value). On the other hand, it is assumed that transmissivity is B % in the case where a driving voltage of 3 V is applied to a liquid crystal layer of a liquid crystal panel in which the stripe-like electrode 8 has the width L=2.8 µm shifted from the design value by 0.2 µm, and consequently the space 10 has the width S=3.2 µm increased by 0.2 µm. Besides, transmissivity is made C % in the case where a driving voltage of 3 V is applied to a liquid crystal layer of a liquid crystal panel having L=3.2 µm and S=2.8 µm.

The rate of change of transmissivity at L=3 and S=3 of FIG. 11A is expressed by $((|A-B|/A+|A-C|/A)/2) \times 100$ (%), and in this example, it is 14.17. The same applies to the other drawings of FIGS. 11A to 14A. FIGS. 11B to 14B show graphs in which the horizontal axis indicates the width L of the stripe-like electrode 8, and the vertical axis indicates the space width S of the space 10, and the values of the respective drawings A are plotted. As is apparent from FIGS. 11B to 14B, it is understood that in any cases, by making the pattern width L of the stripe-like electrode 8 larger than the space width S of the space 10, the rate of change of transmissivity becomes small. Besides, when results of the other conditions described here are considered together, it is understood that if the pattern width L is made large and the space width S is made small, the rate of change is improved.

Incidentally, FIGS. 11A to 14B show the data of the rate of change of transmissivity in the case where polymer fixed liquid crystal is not used.

From the experimental results, it is understood that even in the liquid crystal panels using the same minute pattern electrodes, the tendency of the rate of change of transmissivity with respect to the pattern change is slightly different between the LCD using the polymer fixed liquid crystal and the LCD not using the polymer fixed liquid crystal.

Figure 84:
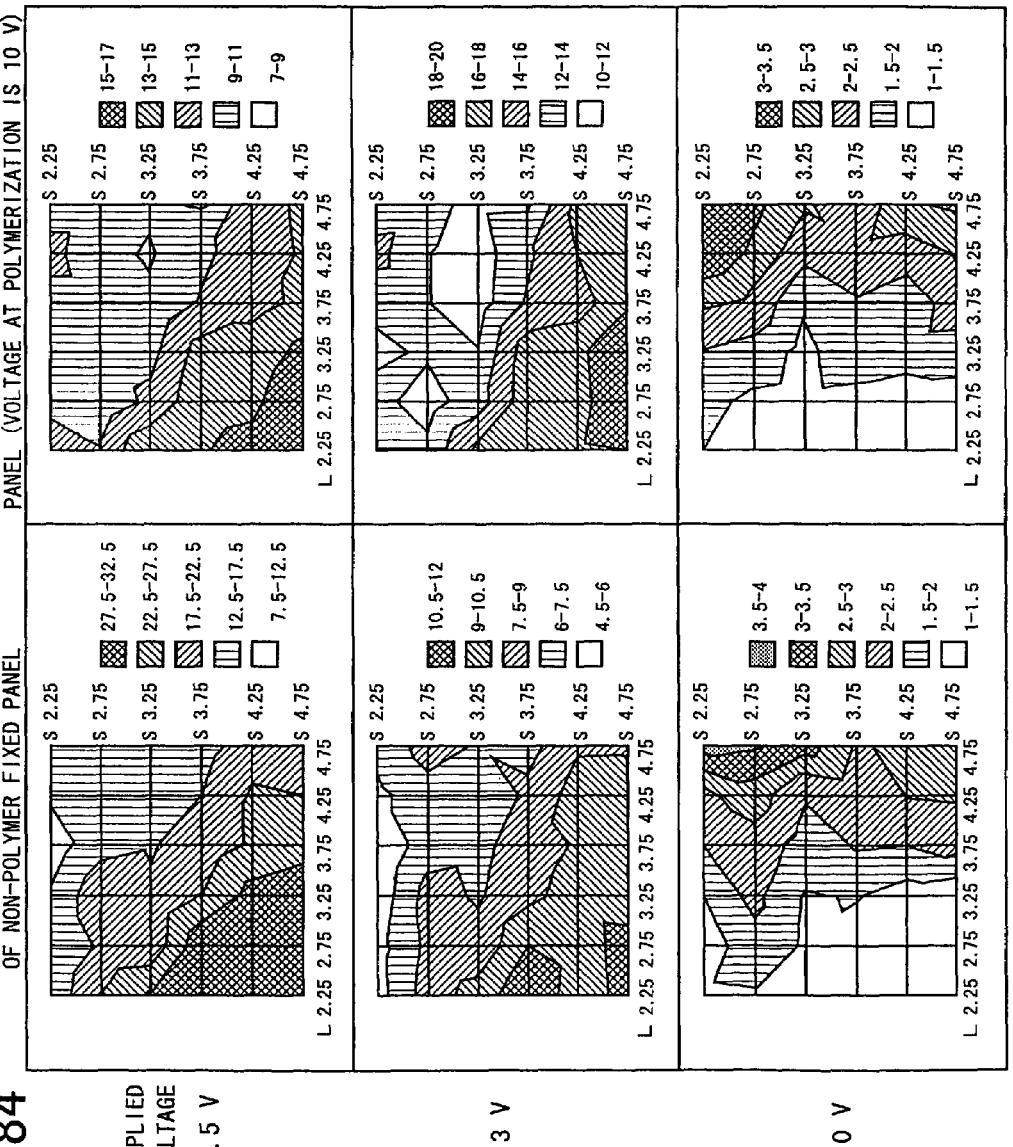
FIG. 84 is a view showing the rate of change of transmissivity of a non-polymer-fixed panel and the rate of change of transmissivity of a polymer-fixed panel by comparison.

FIG. 84 shows the rate of change of transmissivity of the non-polymer-fixed panel and the rate of change of transmissivity of the polymer-fixed panel by comparison. FIG. 84 shows the rate of change of transmissivity of the non-polymer-fixed panel, and its left column shows respective graphs in the case where the applied voltage is 2.5 V, 3 V, and 10 V in order from the above. Besides, correspondingly to the left column, the right column shows graphs concerning the rate of change of transmissivity of the polymer-fixed panel (polymerization voltage=10 V), in the case where the applied voltage is 2.5 V, 3 V, and 10 V in order from the above.

As is apparent from FIG. 84, the values of the space width S at which the rate of change becomes minimum at a halftone display are different from each other. In the case where the polymer fixed liquid crystal is not used, as the space width S becomes small, the rate of change becomes small, however, in the case where the polymer fixed liquid crystal is used, the rate of change in the vicinity of the space width S=3.25 µm is minimum, and it is preferable that the space width S is S=2.5 µm or more.

It is conceivable that the cause is that the alignment state obtained by voltage application (here, application of 10 V) at the time of polymerization of monomer material exerts an influence upon the alignment state after the polymerization. The last line of FIG. 84 shows graphs of the rate of change of transmissivity at the time of application of 10 V. Contrary to the tendency at the halftone, when the pattern width L is large and the space width S is small, the rate of change is large. It is conceivable that since monomers are polymerized in this state, the influence of the alignment state at the time of polymerization appears on the display at the halftone or the like after the polymerization.

Figure 85:
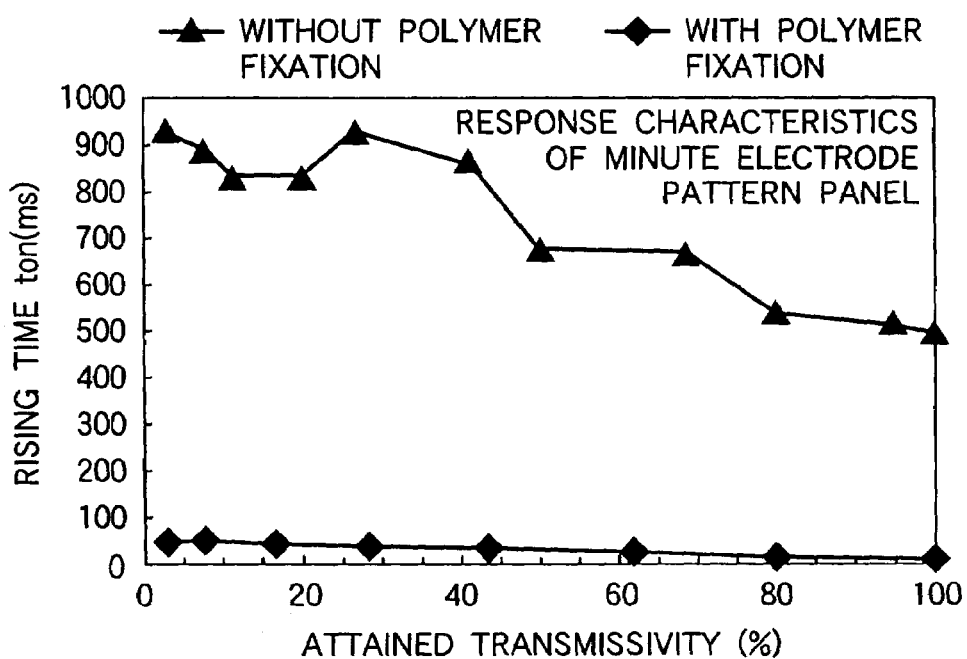
FIG. 85 is a view showing the relation of the attained transmissivity and the rising time with respect to an LCD having a liquid crystal which is not polymer fixed and an LCD having a liquid crystal which is polymer fixed in the first embodiment of the present invention.

Incidentally, at the time of the halftone display, the tendency that the rate of change becomes large when the space width S is larger than the pattern width L is common to both. Besides, as typified by the case where the minute electrode pattern as described above is used, in the mode where the alignment state at the time of driving is unstable if it remains unchanged, speeding-up by polymer fixation is further effective. FIG. 85 shows, in the mode including the stripe-like electrode as mentioned above, the relation between the attained transmissivity and the rising time in an LCD including a polymer unfixed liquid crystal and an LCD including a polymer fixed liquid crystal. As shown in FIG. 85, in the case where polymer fixation is not performed, the alignment of liquid crystal at the time of voltage application is greatly disturbed, and consequently, the response is very slow. However, since the alignment of the liquid crystal is determined by performing the polymer fixation, a great improvement of the response is realized.

EXAMPLE 1-6

Figure 15:
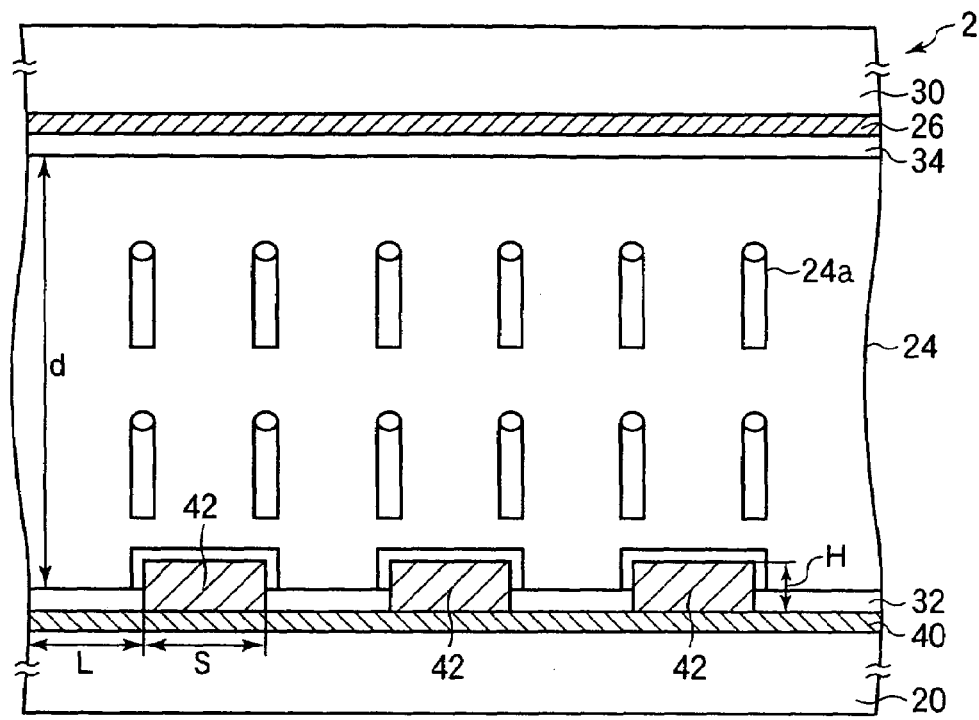
FIG. 15 is a view for explaining example 1-6 of the liquid crystal display and the method of manufacturing the same according to the first embodiment of the present invention.

This example will be described with reference to FIG. 15. This example is the same as the example 1-5 except for the following requirements. A liquid crystal panel shown in FIG. 15 includes a pixel electrode 40 having a shape different from the pixel electrode shown in FIGS. 4A, 4B and 5. In the pixel electrode 40, an electrode cut region (space 10) is not formed in a pixel region. Instead thereof, linear protrusions 42 each made of a dielectric are formed on the pixel electrode 40 correspondingly to the spaces 10 shown in FIGS. 4A and 4B. A vertical alignment film 32 is formed on the pixel electrode 40 and the linear protrusions 42.

A width S of the linear protrusion 42 is made smaller than an electrode exposure width L between the adjacent linear protrusions 42. Specifically, the widths are conventionally L=3 µm and S=3 µm, whereas the widths are L=4 µm and S=2 µm in this example. Since the space 10 shown in FIGS. 4A and 4B and the linear protrusion 42 have almost equivalent alignment regulating effects, also in this example, the rate of change of transmissivity can be made small through the same effect as the example 1-5. Incidentally, photosensitive acryl resin was used as the dielectric material, and the height H of the linear protrusion 42 was made about 0.3 µm.

EXAMPLE 1-7

Figure 16:
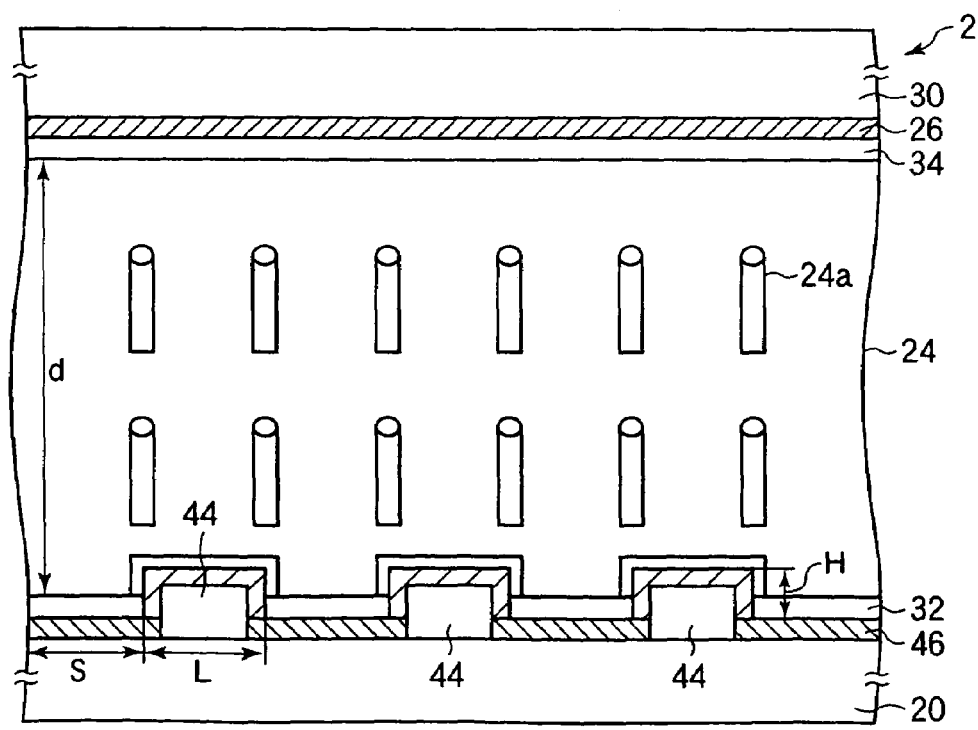
FIG. 16 is a view for explaining example 1-7 of the liquid crystal display and the method of manufacturing the same according to the first embodiment of the present invention.

This example will be described with reference to FIGS. 16 and 17. This example is the same as the example 1-5 except for the following requirements. A liquid crystal panel shown in FIG. 16 includes a pixel electrode 46 having a shape different from the pixel electrode shown in FIGS. 4A, 4B and 15. In the pixel electrode 46, an electrode cut region (space 10) is not formed in a pixel region. Instead thereof, linear protrusions 44 each made of a dielectric are formed at a lower layer of the pixel electrode 46 correspondingly to the spaces 10 shown in FIGS. 4A and 4B. Accordingly, the pixel electrode 46 has an electrode structure including a conductive protrusion. A vertical alignment film 32 is formed on the pixel electrode 46.

A width of the conductive protrusion was made L, a width of a conductive groove between the adjacent conductive protrusions was made S, and the case of L=3 μm and S=3 μm and the case of L=4 μm and S=2 μm were compared with the simulation example in the case of the combination of the stripe-like electrode 8 and the space 10 shown in FIGS. 11A and 11B of the example 1-5. FIG. 17 shows comparison results. As shown in FIG. 17, it is understood that the change of transmissivity in the electrode structure of the conductive protrusion is remarkably small, and the structure is such that roughness caused by the fluctuation of the pattern is hard to produce.

EXAMPLE 1-8

This example will be described using FIG. 6 again. This example is the same as the example 1-5 except for the following requirements. As shown in FIG. 6, the width of a drain bus line 6 was continuously changed. The width was made thin in the vicinity of an intersection of the drain bus line 6 and a gate bus line 4, and was made thick in the vicinity of the center between the gate bus lines 4. The width of the thin portion was made 3 μm, and the width of the thick portion was made 15 μm. Since the directionality of the liquid crystal alignment on the drain bus line 6 becomes stable, the luminance and the unevenness of display can be improved.

EXAMPLE 1-9

Figure 18:
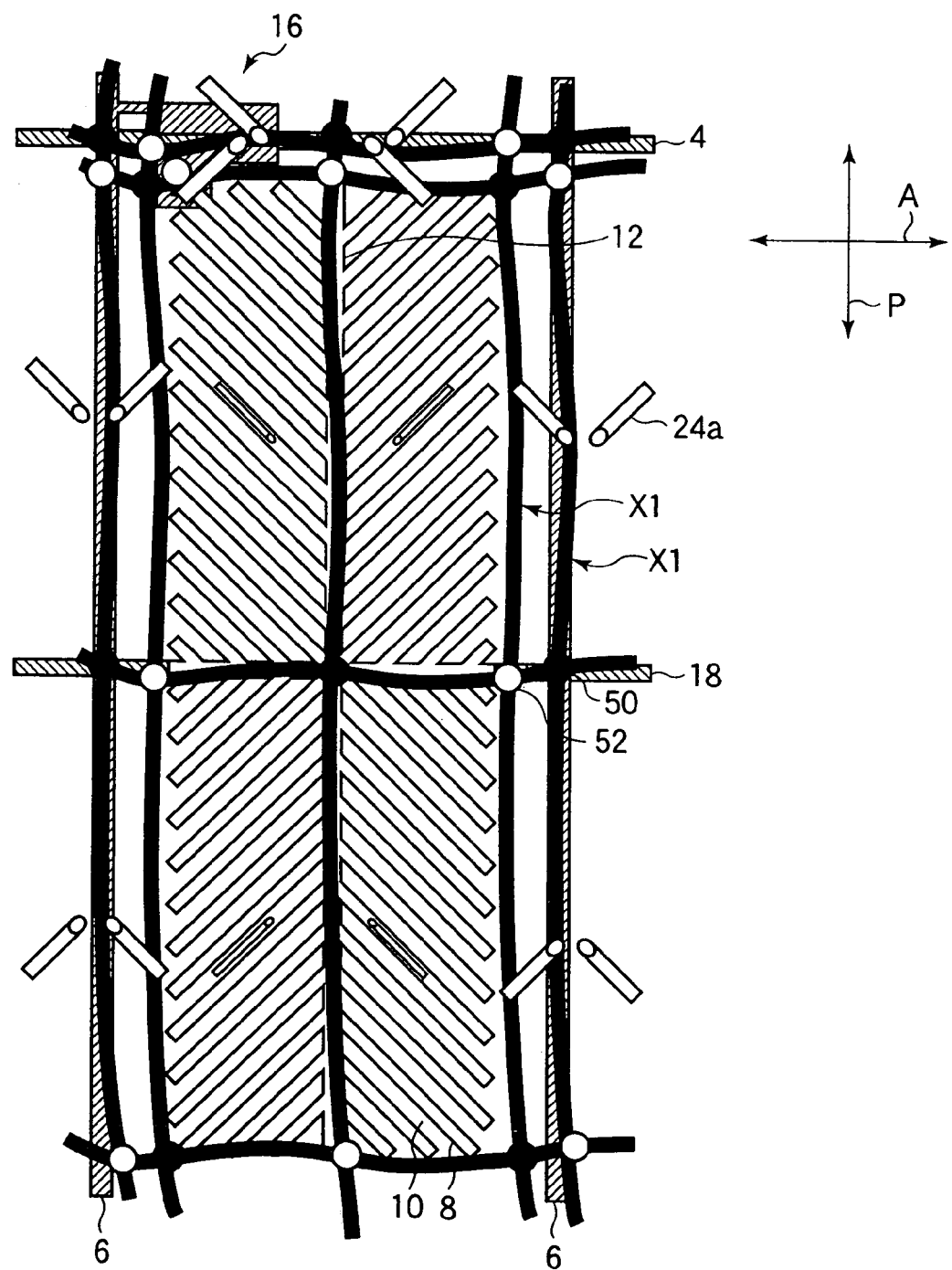
FIG. 18 is a view for explaining example 1-9 of the liquid crystal display and the method of manufacturing the same according to the first embodiment of the present invention.

This example will be described with reference to FIGS. 18 to 19B. This example is the same as the example 1-5 except for the following requirements. FIG. 18 shows a display state in the case where liquid crystal molecules 24a in a pixel are ideally aligned in the pixel including the pixel electrode of the combination of the stripe-like electrodes 8 and the spaces 10 shown in FIGS. 4A and 4B. As shown in FIG. 18, dark lines X1 appear on a gate bus line 4, a drain bus line 6, connection electrodes 12 and 14, and a storage capacitance bus line 18, and further, the dark line X1 also appears at the peripheral portion of the pixel electrode constituted by the stripe-like electrodes 8 and the spaces 10.

In FIG. 18, a "○" mark 52 denotes a singular point (−1) of an alignment vector, and a "•" mark 50 denotes a singular point (+1) of an alignment vector. Incidentally, in the state shown in the drawing, two polarizing plates bonded to both surfaces of the liquid crystal panel are arranged in crossed Nicols, the directions of the polarization axes of those are directions shown by cruciform arrows of FIG. 18, and are tiltd by 45° with respect to the main alignment orientation of the liquid crystal molecule on the display region.

On the other hand, in the construction of this example shown in FIGS. 19A and 19B, an insulating layer 56 thicker than a conventional one was formed. FIG. 19A shows a state viewed in the direction of a normal of a substrate surface, and FIG. 19B shows a section on the side of an array substrate taken along line C-C of FIG. 19A. As shown in FIGS. 19A and 19B, the stripe-like electrodes 8 are formed on the insulating layer 56, and the ends are formed to partially overlap with the drain bus line 6 when viewed in the direction of the normal of the substrate surface. Photosensitive acryl resin was used as the material of the insulating layer 56, and the film thickness was made 3 μm.

Incidentally, a color filter layer may be formed on the side of the array substrate (CF on TFT structure), and the color filter layer may be used instead of the insulating layer 56. Besides, as shown in FIG. 19B, a thick insulating layer may be naturally formed by stacking a color filter layer 54 and the insulating layer 56 (in this case, the substrate may be flattened by the insulating layer 56). By adopting the construction of this example, the influence of an oblique electric field from the drain bus line 6 to the liquid crystal layer 24 becomes weak, and the liquid crystal molecules 24a are aligned by receiving only the influence of the stripe-like electrodes 8 and the spaces 10. By this, each of the dark lines X1 on the gate bus line 4 and the drain bus line 6 unites with each of the dark lines X1 of the peripheral portion of the pixel electrode constituted by the stripe-like electrodes 8 and the spaces 10 to form only one dark line. Thus, the luminance can be improved by the decrease in the number of the dark lines X1.

As described above, according to this embodiment, the display characteristics of the liquid crystal display can be greatly improved in which monomers that are polymerized by heat or light are polymerized and the pretilt angle of the liquid crystal molecule and/or the tilt direction at the time of voltage application is regulated.

The present invention is not limited to the above-described embodiments, and various modifications may be made. For example, the above embodiments relates to the LCD having n-channel TFTs, however, the invention is obviously applicable to the LCD having p-channel TFTs.

Therefore, the above object can be achieved by a method of manufacturing a liquid crystal display having p-channel TFTs, comprising the steps of sealing a liquid crystal layer containing a polymerizable component, which is polymerized by light or heat, between substrates, and polymerizing the polymerizable component while a voltage is applied to the liquid crystal layer, to regulate a pretilt angle of a liquid crystal molecule and/or a tilt direction at a time of driving, wherein the voltage is applied to the liquid crystal layer under a voltage application condition 2 subsequently to a voltage application condition 1 mentioned below, and the polymerizable component is polymerized at a stage of the voltage application condition 2;

the voltage application condition 1: Vg<Vd (dc)=Vc,
and the voltage application condition 2: Vc<Vd (dc), where, Vg: applied voltage to a gate bus line, Vc: applied voltage to a common electrode, and Vd (dc): applied voltage (direct-current component) to a drain bus line.

Also, the above object can be achieved by a method of manufacturing a liquid crystal display having p-channel TFTs, comprising the steps of sealing a liquid crystal layer containing a polymerizable component, which is polymerized by light or heat, between substrates, and polymerizing the polymerizable component while a voltage is applied to the liquid crystal layer, to regulate a pretilt angle of a liquid crystal molecule and/or a tilt direction at a time of driving, wherein the voltage is applied to the liquid crystal layer under a voltage application condition 2 subsequently to a voltage application condition 1 mentioned below, and further, the voltage is applied to the liquid crystal layer under a voltage application condition 3, and the polymerizable component is polymerized at a stage of the voltage application condition 3;

the voltage application condition 1: Vg<Vd (dc)=Vc, Vd (ac)=0, the voltage application condition 2: Vc<Vd (dc), and the voltage application condition 3: while Vc is made to approach Vd (dc), Vd (ac) is gradually made higher than 0, where, Vg: applied voltage to a gate bus line, Vc: applied voltage to a common electrode, Vd (dc): applied voltage (direct-current component) to a drain bus line, and Vd (ac): applied voltage (alternating component) to the drain bus line.

Also, the above object can be achieved by a method of manufacturing a liquid crystal display having p-channel TFTs, comprising the steps of sealing a liquid crystal layer containing a polymerizable component, which is polymerized by light or heat, between substrates, and polymerizing the polymerizable component while a voltage is applied to the liquid crystal layer, to regulate a pretilt angle of a liquid crystal molecule and/or a tilt direction at a time of driving, wherein the voltage is applied to the liquid crystal layer under a voltage application condition 2 subsequently to a voltage application condition 1 mentioned below, and further, the voltage is applied to the liquid crystal layer under a voltage application condition 3, and the polymerizable component is polymerized at a stage of the voltage application condition 3;

the voltage application condition 1: Vg<Vd (dc)=Vc, the voltage application condition 2: Vc<Vd (dc), and the voltage application condition 3: Vg is increased and is made to approach Vd (dc), where, Vg: applied voltage to a gate bus line, Vc: applied voltage to a common electrode, and Vd (dc): applied voltage (direct-current component) to a drain bus line.

Also, the above object can be achieved by a method of manufacturing a liquid crystal display having p-channel TFTs, comprising the steps of sealing a liquid crystal layer containing a polymerizable component, which is polymerized by light or heat, between substrates, and polymerizing the polymerizable component while a voltage is applied to the liquid crystal layer, to regulate a pretilt angle of a liquid crystal molecule and/or a tilt direction at a time of driving, wherein the voltage is applied to the liquid crystal layer under a voltage application condition 2 subsequently to a voltage application condition 1 mentioned below, and next, the voltage is applied to the liquid crystal layer under a voltage application condition 3, and further, the voltage is applied to the liquid crystal layer under a voltage application condition 4, and the polymerizable component is polymerized at a stage of the voltage application condition 4;

the voltage application condition 1: Vg<Vd (dc)=Vc, Vd (ac)=0, the voltage application condition 2: Vc<Vd (dc), the voltage application condition 3: while Vc is made to approach Vd (dc), Vd (ac) is gradually made higher than 0, and the voltage application condition 4: Vg is increased and is made to approach Vd (dc), where, Vg: applied voltage to a gate bus line, Vc: applied voltage to a common electrode, Vd (dc): applied voltage (direct-current component) to a drain bus line, and Vd (ac): applied voltage (alternating component) to the drain bus line.

In the method of manufacturing a liquid crystal display having p-channel TFTs described above, when the applied voltage Vg to the gate bus line is decreased and is made to approach the applied voltage (direct current component) Vd (dc) to the drain bus line, the applied voltage Vg is made equal to the applied voltage Vd (dc).

In the method of manufacturing a liquid crystal display having p-channel TFTs described above, at a time of voltage application of Vc<Vd (dc), a value of Vc−Vd(dc) is once made lower than a desired voltage, and then, the voltage is uppered to the desired voltage.

In the method of manufacturing a liquid crystal display having p-channel TFTs described above, the applied voltage Vg to the gate bus line is a direct-current voltage.

Second Embodiment

Next, a liquid crystal display according to a second embodiment of the present invention and a method of manufacturing the same will be described with reference to FIGS. 22A to 45. The TN mode which was conventionally the main current of an active matrix type LCD has a defect that an angle of view is narrow. Then, at present, techniques called an MVA mode and an IPS mode (In-Plane-Switching mode) are adopted for an LCD of a wide angle of view.

In the IPS mode, a liquid crystal molecule is switched by a comb electrode in a horizontal plane, however, since the comb electrode remarkably lowers the opening ratio of a pixel, a backlight of high optical intensity becomes necessary. In the MVA mode, liquid crystal is aligned vertically to the substrate, and the alignment of a liquid crystal molecule is regulated by a protrusion or a slit provided in a transparent electrode (ITO).

Although a drop in the substantial opening ratio of a pixel by the protrusion or the slit in the MVA mode is not more than that by the comb electrode, as compared with the TN mode, the light transmissivity of a liquid crystal panel is low. Thus, in the present circumstances, the MVA-LCD is not adopted for a book-size personal computer which requires a low power consumption.

In the present MVA-LCD, for realizing a wide angle of view, the linear protrusions or the slits obtained by linearly cutting away part of a pixel electrode are complicatedly arranged in a pixel so that the liquid crystal molecules fall down in four directions at the time of voltage application. Thus, the light transmissivity of the pixel becomes low. A description will be given of a case where in order to improve this, as shown in FIGS. 22A and 22B, straight linear protrusions are simply arranged at wide intervals in parallel with each other.

FIGS. 22A and 22B show an MVA-LCD including half divided alignment regions. FIG. 22A shows a state in which one pixel 2 of the MVA-LCD is viewed in the direction of a normal of a substrate surface. FIG. 22B shows a section taken along a line parallel with a drain bus line 6 of the MVA-LCD shown in FIG. 22A. Incidentally, in the subsequent description of the embodiment, a structural element having the same operation and function as a structural element explained before is designated by the same symbol and its explanation is omitted. FIG. 22A shows three pixels 2 continuously connected to one gate bus line 4. As shown in FIGS. 22A and 22B, two linear protrusions 68 extending in parallel with the gate bus line 4 are formed in the vicinity of both end portions of a pixel electrode 3 on the side of the gate bus line 4. Besides, on a common electrode on the side of an opposite substrate, a linear protrusion 66 extending in parallel with the gate bus line 4 is formed at a position including the center of the pixel. Incidentally, on the side of the array substrate, an insulating film (gate insulating film) 23 is formed on a glass substrate 20 and the gate bus line 4, and an insulating film 22 is formed thereon.

By this construction, when a voltage is applied between a pixel electrode 3 and a common electrode 26 and an electric field distribution in a liquid crystal layer 24 is changed, liquid crystal molecules 24a having a negative dielectric anisotropy are tilted in two directions. That is, the liquid crystal molecules 24a are tilted toward the linear protrusion 66 on the side of the opposite substrate from the linear protrusions 68 of both ends of the pixel 2 on the side of the gate bus line 4. By this, an upper and lower half divided multiple domain is formed. In the MVA mode, the tilt direction is regulated in order from the liquid crystal molecules 24a in the vicinity of the linear protrusions 66 and 68 (or in the vicinity of the slit) by the electric field generated by the linear protrusions (or slits). Accordingly, as shown in FIGS. 22A and 22B, if the interval between the linear protrusions (or slits) is very wide, it takes a time to propagate the tilt of the liquid crystal molecule 24a, so that the response of the panel when voltage is applied becomes very slow.

Then, the polymer fixation system has been adopted which uses the liquid crystal layer 24 containing a polymerizable monomer instead of a conventional liquid crystal material. In the polymer fixation system, monomers are polymerized into polymers in the state where a voltage is applied to the liquid crystal layer 24, so that the direction of the tilt of the liquid crystal molecule 24a is memorized in the polymer.

However, even if the voltage is applied to the liquid crystal layer 24 in the construction of FIGS. 22A and 22B, the liquid crystal molecule 24a in the vicinity of the drain bus line 6 falls down in the direction different from an intended tilt direction by 90° by the electric field generated at the end portion of the pixel electrode 3 in the vicinity of the drain bus line 6. Thus, even if the polymer fixation system is used, as in a microscopic observation view of FIG. 23, a large dark portion X1 is seen along the drain bus line 6 in each of the display pixels 2.

Figure 24:
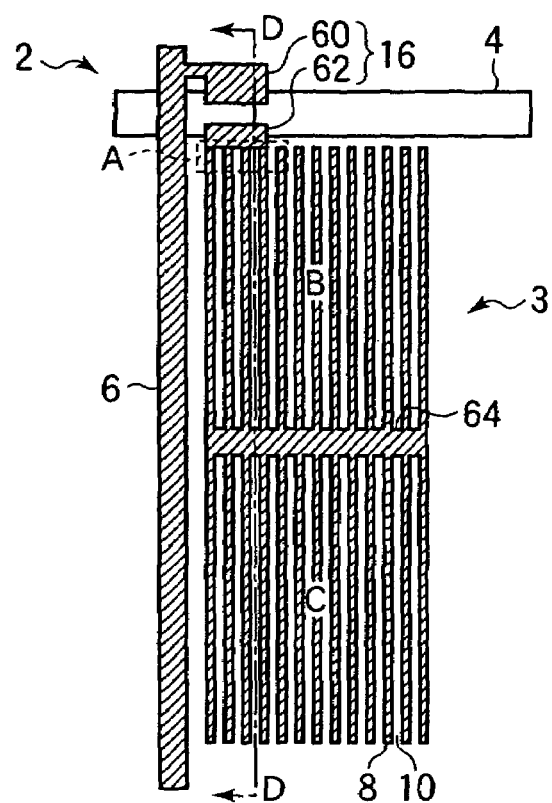
FIG. 24 is a view in which one pixel 2 of an MVA-LCD of example 2-1 according to a second embodiment of the present invention is viewed in the direction of a normal of a substrate surface.

Then, in this embodiment, a pixel electrode 3 on the side of an array substrate in which a TFT 16 is provided is made a stripe-like electrode of a line and space pattern. As an example, FIG. 24 shows an example in which the one pixel 2 of the MVA-LCD according to this embodiment is viewed in the direction of the normal of the substrate surface. As shown in FIG. 24, the pixel electrode 3 includes the stripe-like electrodes 8 and the spaces 10 in which the line and space pattern is formed in parallel with the drain bus line 6.

In general, an alignment regulating force by an alignment film is exerted on only the liquid crystal molecule 24a in contact with the alignment film, and is not exerted on the liquid crystal molecule at the center portion in the cell gap direction. Thus, the liquid crystal molecule 24a of the center portion in the cell gap direction greatly receives the influence of the electric field generated at the end portion of the pixel and the alignment orientation is disturbed. When the pixel electrode 3 including the stripe-like electrodes 8 and the spaces 10 parallel with the drain bus line 6 is adopted, the liquid crystal molecules 24a fall down in parallel with the stripe-like electrodes 8 and the spaces 10. Besides, since the tilt directions of all the liquid crystal molecules 24a are determined by the stripe-like electrodes 8 and the spaces 10, the influence of the electric field generated at the end portion of the pixel can be suppressed to a minimum.

A liquid crystal display according to this embodiment and a method of manufacturing the same will be specifically described below using examples. First, conditions common to all examples are listed below;

orientation film: vertical orientation film;

liquid crystal: having a negative dielectric anisotropy;

polarizing plate: arranged at both sides of a liquid crystal panel in crossed Nicols and realizing a normally-black mode;

polarization axis of polarizing plate: direction of 45° with respect to a bus line;

liquid crystal panel: 15 inches in diagonal; and resolution: XGA.

EXAMPLE 2-1

Figure 25:
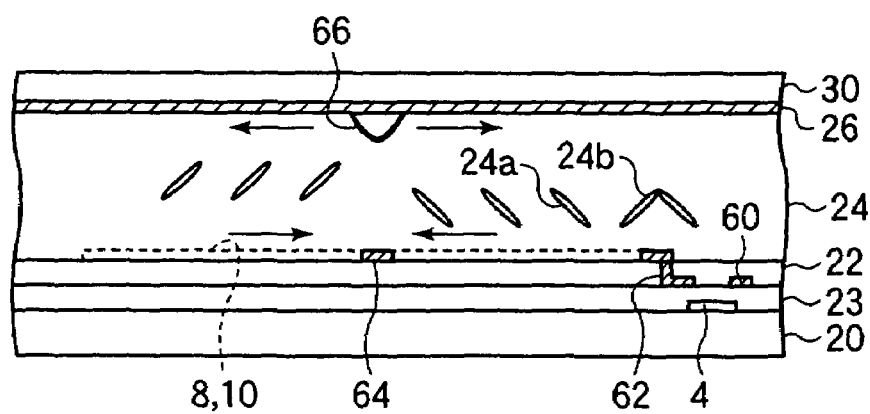
FIG. 25 is a view showing a sectional shape taken along line D-D of FIG. 24.

This example will be described with reference to FIGS. 24 to 27. FIG. 24 shows a state in which one pixel 2 of an MVA-LCD according to this example is viewed in the direction of a normal of a substrate surface, and FIG. 25 shows a sectional shape taken along line D-D of FIG. 24. As shown in FIG. 24, a pixel electrode 3 includes stripe-like electrodes 8 and spaces 10 in which a line and space pattern is formed in parallel with a drain bus line 6. The respective stripe-like electrodes 8 are electrically connected to each other by a connection electrode 64 formed at the substantially center portion of the pixel 2 and in parallel with a gate bus line 4. Besides, part of the stripe-like electrodes 8 are connected to a source electrode 62 arranged opposite to a drain electrode 60 of a TFT 16.

As shown in FIG. 25, a linear protrusion 66 extending in parallel with the gate bus line 4 is formed on the side of an opposite substrate at a position opposite to the connection electrode 64 of the center portion of the pixel region. The alignment regulating direction of the liquid crystal molecule 24a can be more remarkably determined by the linear protrusion 66.

Instead of providing the linear protrusion 66 on the side of the opposite substrate, a rubbing processing may be naturally performed to the alignment film on the side of the array substrate or on the side of the opposite substrate. In this case, as indicated by arrows shown in FIG. 25, the rubbing processing on the side of the array substrate is performed toward the connection electrode 64 in both regions B and C shown in FIG. 24. The rubbing processing on the side of the opposite substrate is performed in the direction of going away from the connection electrode 64. Besides, it is also possible to use optical alignment.

Figure 26:
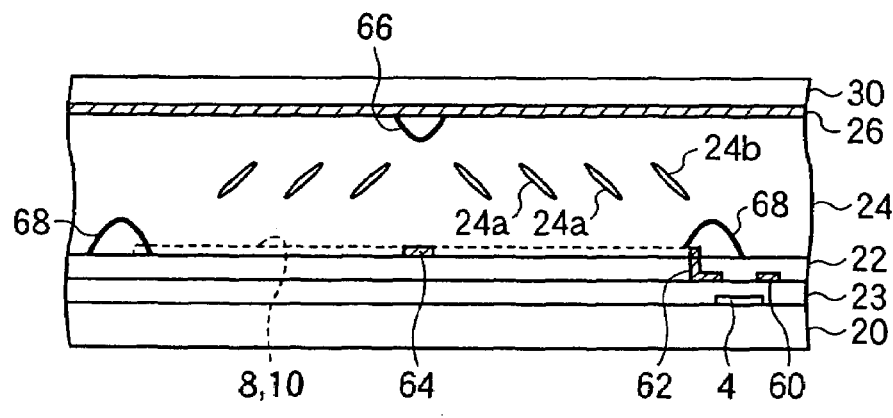
FIG. 26 is a view showing a modified example of the example 2-1 according to the second embodiment of the present invention.
Figure 27:
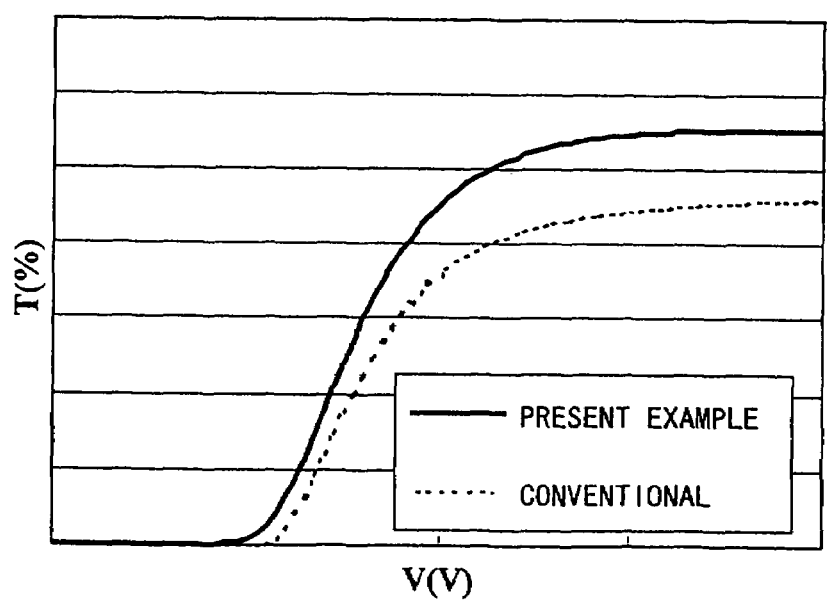
FIG. 27 is a T-V diagram showing the effect of the example 2-1 according to the second embodiment of the present invention.

Incidentally, there is a case where an alignment disturbance occurs such that the tilt direction of a liquid crystal molecule 24b in a region A surrounded by a broken line in the vicinity of a TFT 16 shown in FIG. 24 becomes reverse to that of the liquid crystal molecule 24a of a region B as shown in FIG. 25. By this alignment disturbance, a dark portion is formed in the region A at the time of voltage application to the liquid crystal layer 24. FIG. 26 shows a modified example for improving this. In this modified example, as shown in FIG. 26, two linear protrusions 68 extending in parallel with a gate bus line 4 are formed in the vicinity of both end portions of a pixel electrode 3 on the side of the gate bus line 4. When the linear protrusion 68 is provided over the gate bus line and between the gate bus line 4 and the pixel electrode 3, the direction in which the liquid crystal molecule 24b of the region A falls down can be made the same direction as the liquid crystal molecule 24a of the region B.

The construction of the modified example of FIG. 26 was used, and in the state where the liquid crystal molecule 24a in the pixel 2 was tilted in a predetermined direction by applying a voltage to the liquid crystal layer 24, light was irradiated to the liquid crystal added with a photo-polymerizable monomer to polymerize the monomer, and the fixation of the pretilt angle and/or the alignment orientation of the liquid crystal molecule 24a was realized. When a display was effected on the completed MVA-LCD and the display region was observed, light was transmitted through the whole pixel portion, and in a T-V characteristic diagram of FIG. 27, as indicated by a curved line of a solid line, the transmissivity could be improved as compared with a conventional LCD indicated by a broken line.

EXAMPLE 2-2

Figure 28:
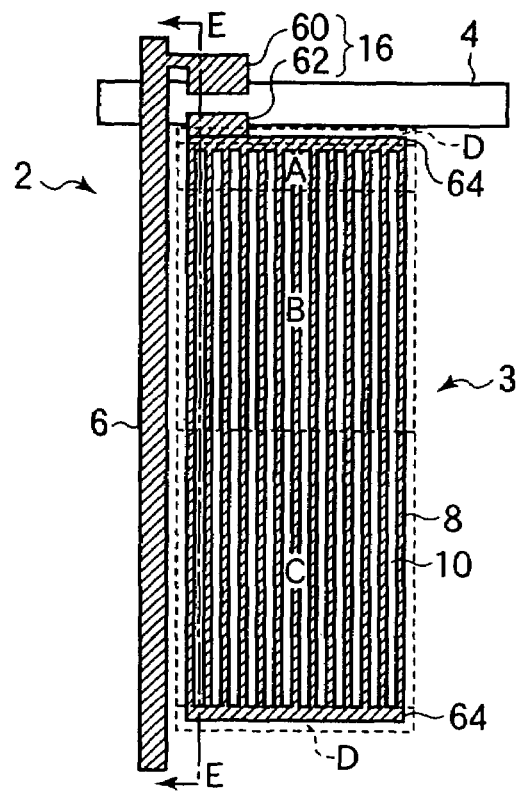
FIG. 28 is a view in which one pixel 2 of an MVA-LCD of example 2-2 according to the second embodiment of the present invention is viewed in the direction of a normal of a substrate surface.
Figure 29:
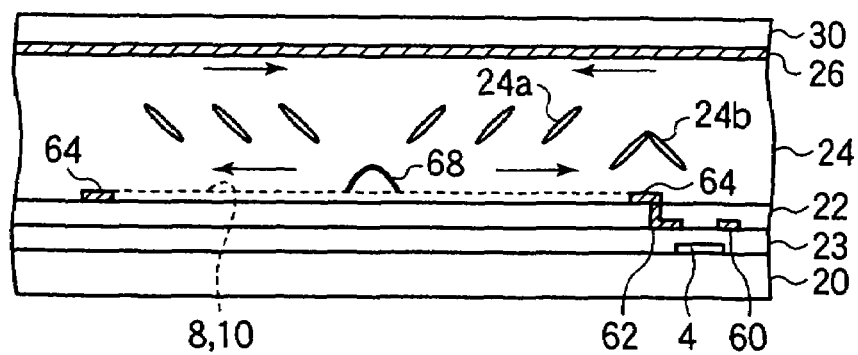
FIG. 29 is a view showing a sectional shape taken along line E-E of FIG. 28.

This example will be described with reference to FIGS. 28 to 31. FIG. 28 shows a state in which one pixel 2 of an MVA-LCD according to this example is viewed in the direction of a normal of a substrate surface, and FIG. 29 shows a sectional shape taken along line E-E of FIG. 28. As shown in FIG. 28, a pixel electrode 3 includes stripe-like electrodes 8 and spaces 10 in which a line and space pattern is formed in parallel with a drain bus line 6. The respective stripe-like electrodes 8 are electrically connected to each other by two connection electrodes 64 formed in parallel with a gate bus line 4 at upper and lower ends of a pixel 2. Besides, the connection electrode 64 at the upper portion in the drawing is connected to a source electrode 62 of a TFT 16.

As shown in FIG. 29, a linear protrusion 68 extending in parallel with the gate bus line 4 is formed on the pixel electrode 3 at the center portion of a pixel region. The alignment orientations in regions A and B are made the same by the linear protrusion 68, whereas the alignment orientation of a region C can be made opposite to that of the regions A and B. The liquid crystal alignment orientations in the regions B and C of this example become reverse to the liquid crystal alignment orientations of the regions B and C in the example 2-1.

Instead of providing the linear protrusion 68 on the pixel electrode 3, a rubbing processing may be naturally performed to an alignment film on the side of an array substrate or on the side of an opposite substrate. In this case, as indicated by arrows shown in FIG. 29, on the side of the array substrate, rubbing is performed toward the outside connection electrodes 64 in both the regions B and C shown in FIG. 28. On the side of the opposite substrate, rubbing is performed from the connection electrodes 64 to the center portion of the pixel. Besides, optical alignment can also be used.

Figure 30:
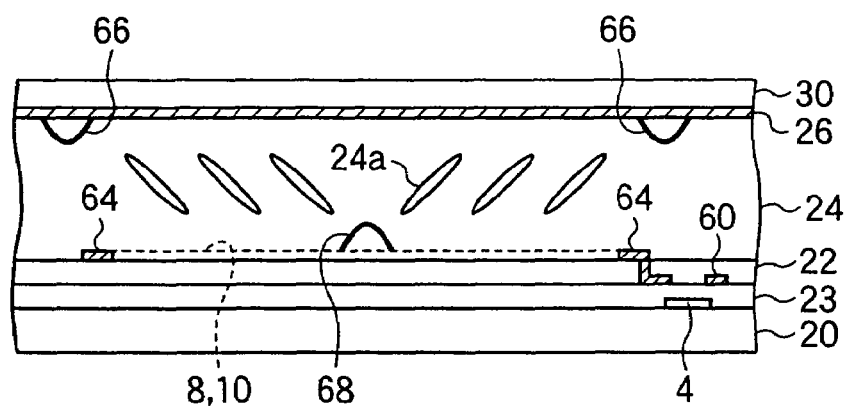
FIG. 30 is a view showing a modified example of the example 2-2 according to the second embodiment of the present invention.
Figure 31:
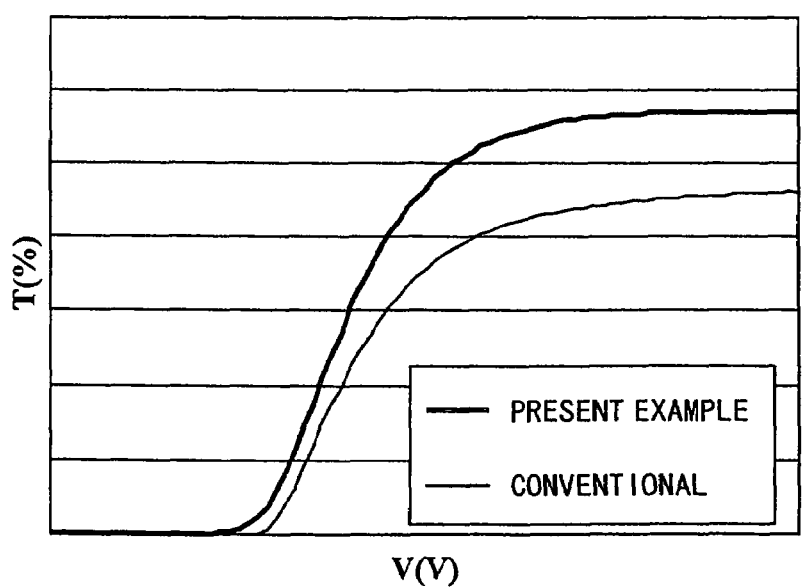
FIG. 31 is a T-V diagram showing the effect of the example 2-2 according to the second embodiment of the present invention.

Incidentally, there is a case where an alignment disturbance as shown in FIG. 29 occurs in a liquid crystal molecule 24b of regions D surrounded by broken lines in the vicinity of the two connection electrodes 64 shown in FIG. 28. By this alignment disturbance, a dark portion is formed in the region D at the time of voltage application to a liquid crystal layer 24. FIG. 30 shows a modified example for improving this. In this modified example, as shown in FIG. 30, two linear protrusions 66 extending in parallel with a gate bus line 4 are formed on the side of an opposite substrate at positions opposite to connection electrodes 64 in the vicinity of both end portions of a pixel electrode 3 on the side of the gate bus line 4. When the linear protrusion 66 is disposed between the gate bus line 4 and the pixel electrode 3 when viewed in the direction of a normal of a substrate surface, the direction in which the liquid crystal molecule 24b of the region D falls down can be made the same direction as the liquid crystal molecule 24a of the region B or the region C.

The construction of the modified example of FIG. 30 was used, and in the state where the liquid crystal molecule 24a in the pixel 2 was tilted in a predetermined direction by applying a voltage to the liquid crystal layer 24, light was irradiated to the liquid crystal added with a photo-polymerizable monomer to polymerize the monomer, and the fixation of the pretilt angle and/or the alignment orientation of the liquid crystal molecule 24a was realized. When a display was effected on the completed MVA-LCD and the display region was observed, light was transmitted through the whole pixel portion, and in a T-V characteristic diagram of FIG. 31, as indicated by a curved line of a thick solid line, the transmissivity could be improved as compared with a conventional LCD indicated by a thin solid line.

EXAMPLE 2-3

Figure 32:
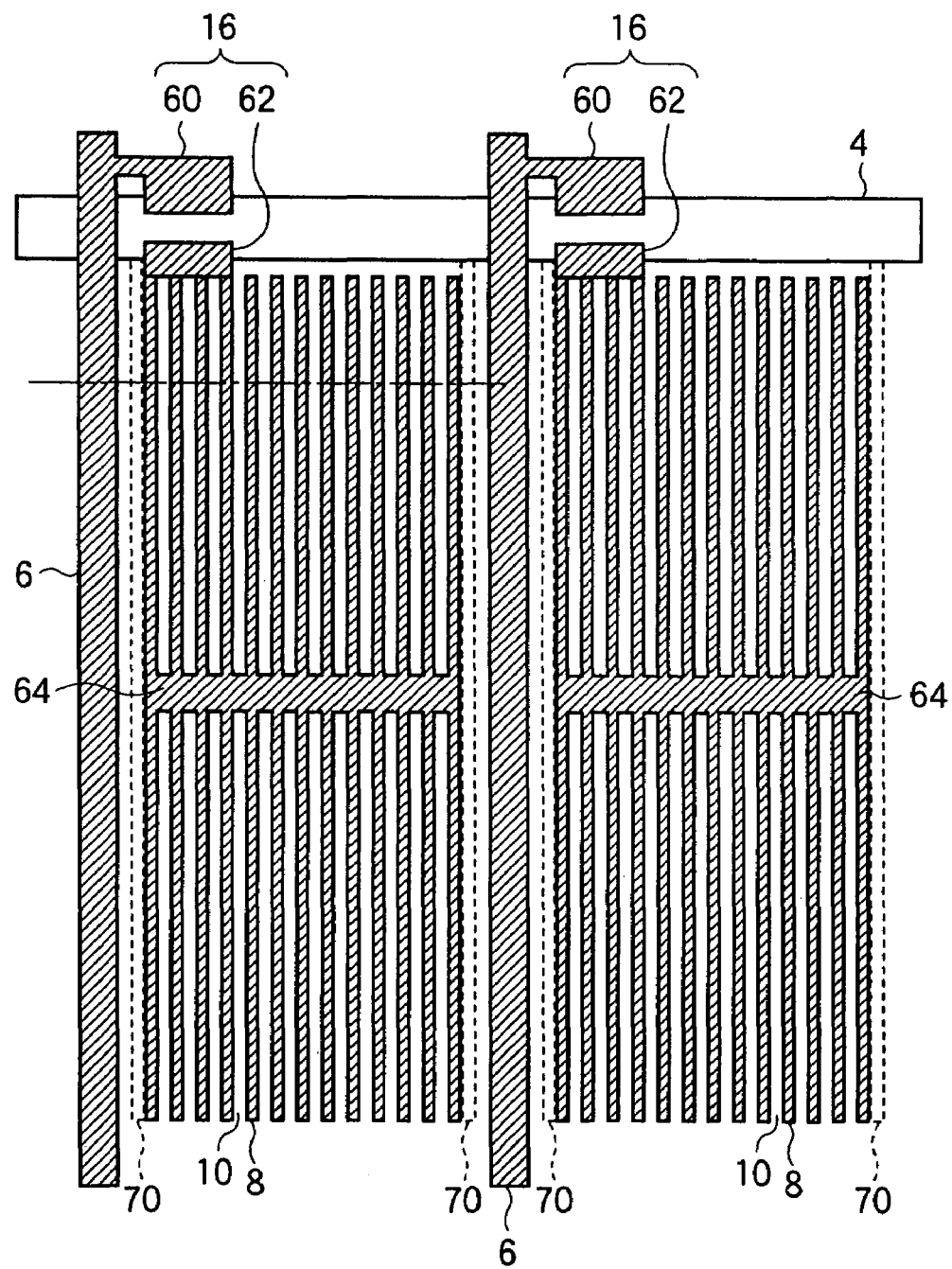
FIG. 32 is a view in which one pixel 2 of an MVA-LCD of example 2-3 according to the second embodiment of the present invention is viewed in the direction of a normal of a substrate surface.

This example will be described with reference to FIGS. 32 to 34. FIG. 32 shows a state in which two adjacent pixels 2 of an MVA-LCD according to this example are viewed in the direction of a normal of a substrate surface. The structure of a pixel electrode 3 according to this example is the same as the example 2-1. This example is characterized in that an electric field shielding electrode 70 is provided which decreases a horizontal electric field generated between a stripe-like electrode 8 on the side of a drain bus line 6 of the pixel electrode 3 and the drain bus line 6. As shown in a sectional view of FIG. 33, the electric field shielding electrode 70 is formed below a region between the stripe-like electrode 8 at the end portion of the drain bus line 6 of the pixel electrode 3 and the drain bus line 6 and by using gate formation metal at the same time as the gate bus line 4.

Figure 33:
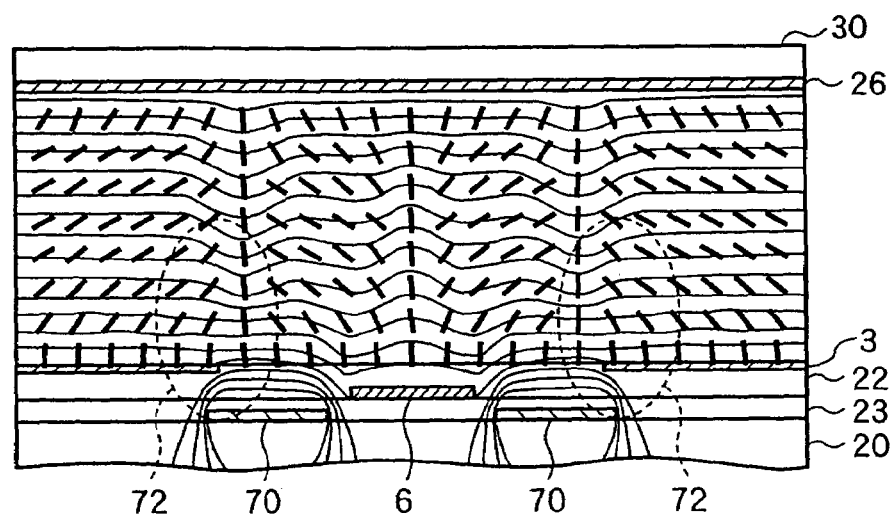
FIG. 33 is a view showing an arrangement position of an electric field shielding electrode 70 of the MVA-LCD according to the second embodiment of the present invention and its operation.
Figure 34:
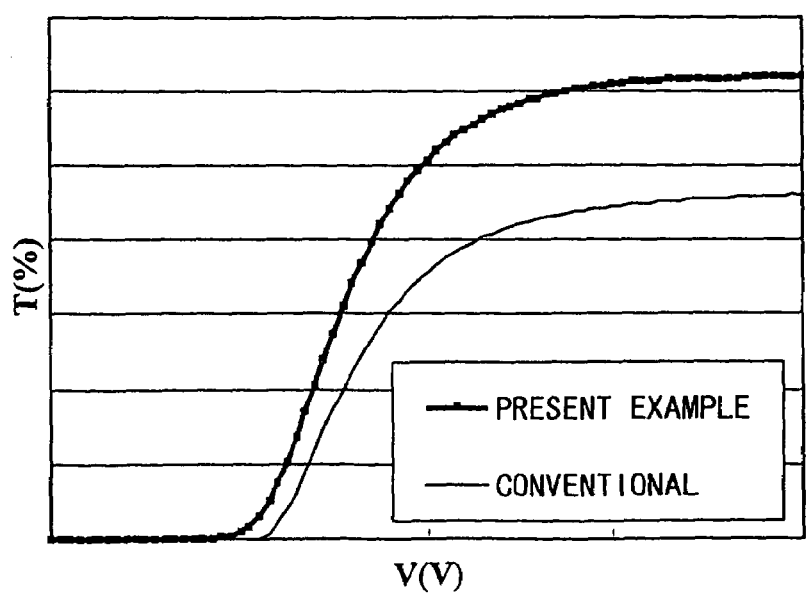
FIG. 34 is a T-V diagram showing the effect of the example 2-3 according to the second embodiment of the present invention.

FIG. 33 is a view showing the arrangement position of the electric field shielding electrode 70 and the operation. A voltage is applied to the pixel electrode 3 and the electric field shielding electrode 70, and as shown in FIG. 33, equipotential lines almost parallel with the substrate surface are generated in the array substrate. By doing so, as shown in an ellipse 72 of a broken line in FIG. 33, it is possible to prevent the generation of the horizontal electric field in the region between the stripe-like electrode 8 at the end portion of the drain bus line 6 and the drain bus line 6. The equipotential lines and liquid crystal directors are shown in FIG. 33, and it is understood that the equipotential lines are almost parallel with the substrate surface in the ellipse 72, and the directors are almost perpendicular to the substrate surface.

Monomers in the liquid crystal layer 24 are polymerized in this state. After the monomers are polymerized, the electric field shielding electrode 70 is electrically connected to a common electrode 26 and is used as a storage capacitance electrode. Since the direction in which the liquid crystal molecules 24a falls down is determined by the polymerized polymer, it hardly receives the influence of the electric field generated at the end of the pixel. When a display was effected on the completed MVA-LCD and the display region was observed, light was transmitted through the whole pixel portion, and in a T-V characteristic diagram of FIG. 34, as indicated by a curved line of a thick solid line, the transmissivity could be improved as compared with a conventional LCD indicated by a thin solid line.

EXAMPLE 2-4

Figure 35:
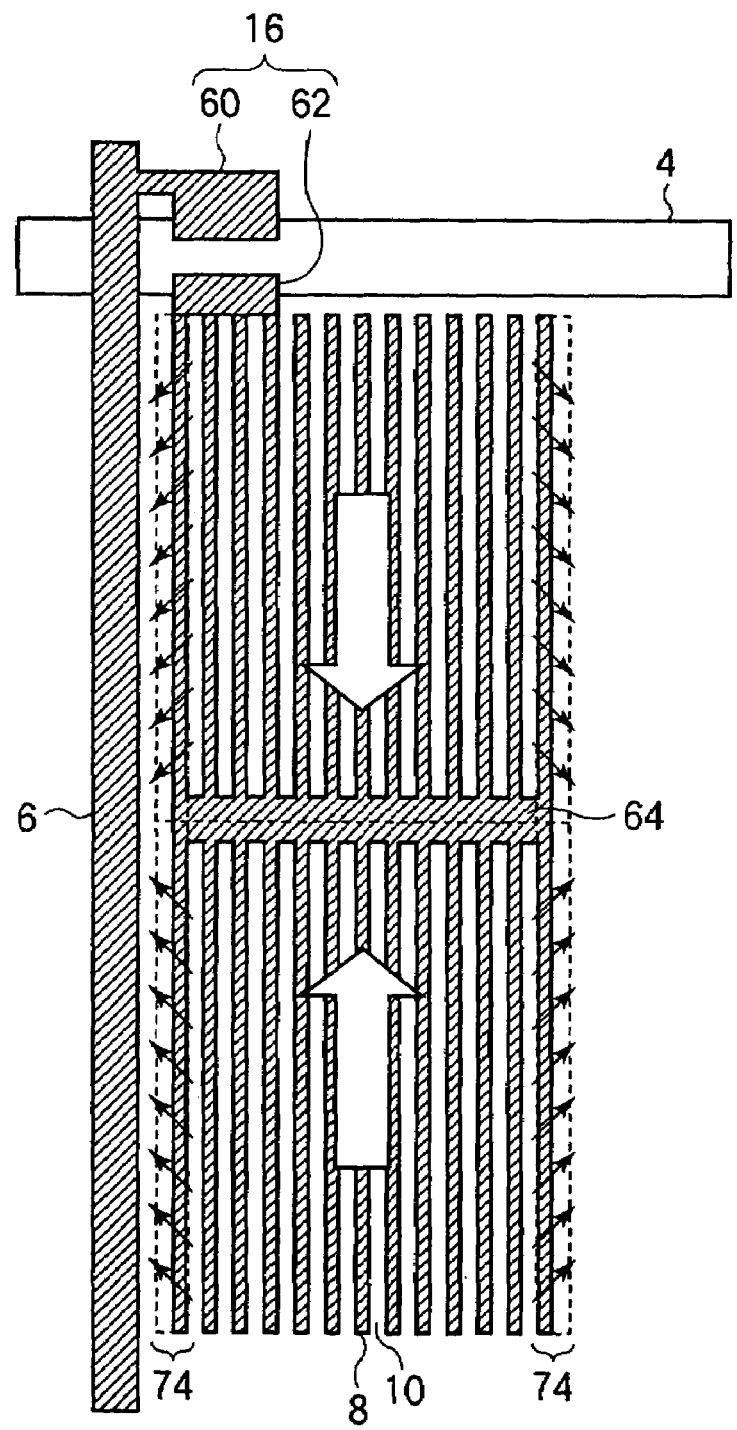
FIG. 35 is a view in which one pixel 2 of an MVA-LCD of example 2-4 according to the second embodiment of the present invention is viewed in the direction of a normal of a substrate surface.
Figure 36:
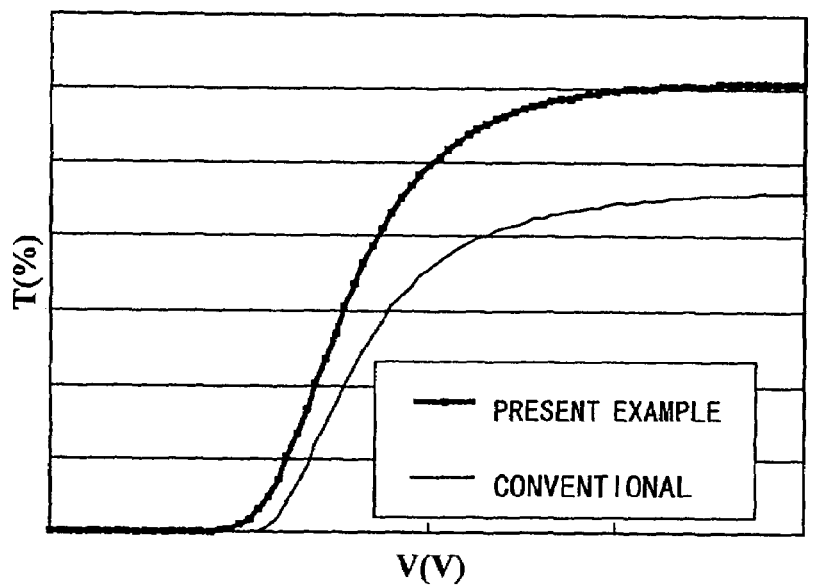
FIG. 36 is a T-V diagram showing the effect of the example 2-4 according to the second embodiment of the present invention.

This example will be described with reference to FIGS. 35 and 36. FIG. 35 shows a state in which one pixel 2 of an MVA-LCD according to this example is viewed in the direction of a normal of a substrate surface. The construction of a pixel electrode 3 according to this example is the same as the example 2-1.

This example is characterized in that an alignment orientation on an alignment film on a region 74 indicated by a broken line at an end portion of the pixel electrode 3 in the vicinity of a drain bus line 6 is made to have a direction different from that at the center portion of the pixel. As shown in FIG. 35, liquid crystal molecules 24a are tilted downward on the paper plane (downward thick arrow) in a pixel region above the center portion of the pixel in the drawing, and are tilted upward on the paper plane (upward thick arrow) in a lower pixel region. On the other hand, in the region 74, an alignment processing is performed so that an alignment orientation (thin arrow) is inclined at approximately 45° with respect to the extension direction of the adjacent drain bus line 6. In this example, ultraviolet light was irradiated to perform an alignment processing.

When a voltage is applied to a pixel, the alignment direction of a liquid crystal molecule is determined by balance of both of the alignment processing and the electric field. By this, since the liquid crystal molecule 24a of the end region 74 of the pixel electrode 3 also falls down in the direction almost parallel to the drain bus line 6, light can be transmitted through the whole pixel electrode.

In this state, monomers in the liquid crystal layer 24 are polymerized. Since the direction in which the liquid crystal molecule 24a falls down is determined by a polymerized polymer, it hardly receives the influence of an electric field generated at the end of the pixel. When a display was effected on the completed MVA-LCD and the display region was observed, light was transmitted through the whole pixel portion, and in a T-V characteristic diagram of FIG. 36, as indicated by a curved line of a thick solid line, the transmissivity could be improved as compared with a conventional LCD indicated by a thin solid line.

EXAMPLE 2-5

Figure 37:
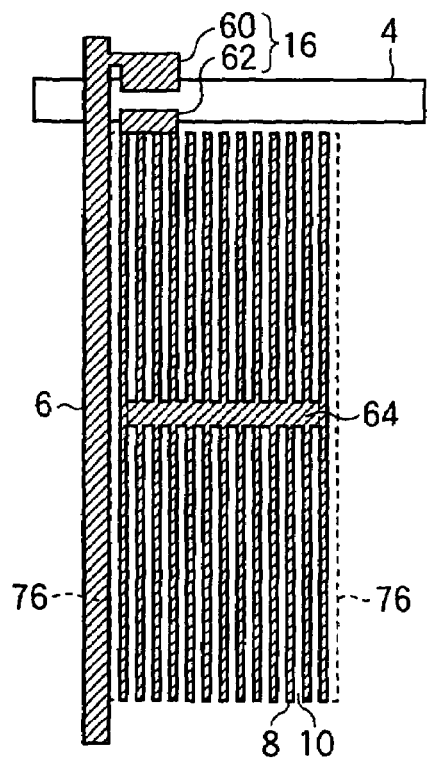
FIG. 37 is a view in which one pixel 2 of an MVA-LCD of example 2-5 according to the second embodiment of the present invention is viewed in the direction of a normal of a substrate surface.

This example will be described with reference to FIGS. 37 to 40. FIG. 37 shows a state in which one pixel 2 of an MVA-LCD according to this example is viewed in the direction of a normal of a substrate surface. Although the structure of a pixel electrode 3 of this example is the same as the example 2-1, this example is characterized in that the width of a gap 76 between a drain bus line 6 and a pixel electrode 3 is made equal to the width of a space 10 in the pixel electrode 3.

Figure 38:
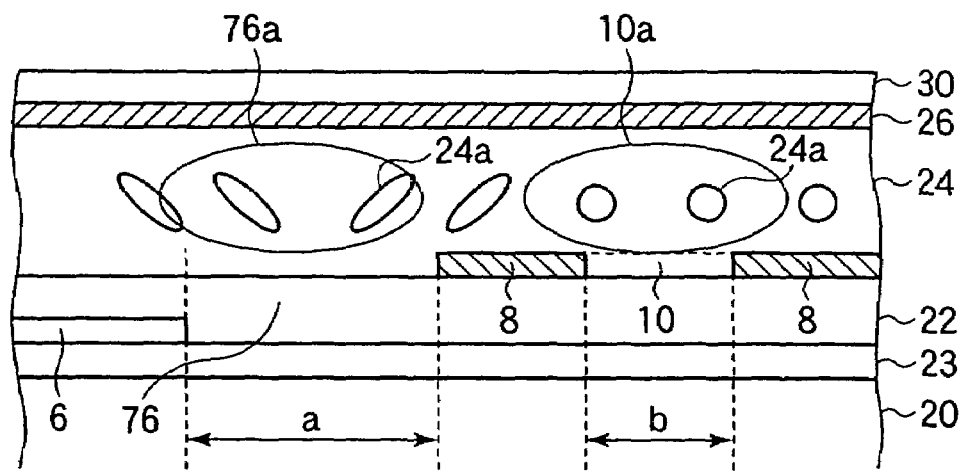
FIG. 38 shows a construction in which a gap 76 between a drain bus line 6 and a pixel electrode 3 is wide in the example 2-5 according to the second embodiment of the present invention.

FIG. 38 shows a construction in which the gap 76 between the drain bus line 6 and the pixel electrode 3 is wide. When the width of the region 76 along the substrate surface is made "a", and the width of the space 10 is made "b", a>b is satisfied. Since capacitance between the drain bus line 6 and the pixel electrode 3 becomes the cause of cross talk, the gap 76 is generally made wide. However, when a voltage is applied to the liquid crystal layer 24, a liquid crystal molecule 24a in a region 76a indicated by an ellipse over the gap 76 falls down in the direction perpendicular to the drain bus line 6, and a dark portion appears in the pixel. On the other hand, in a region 10a over the space 10 in the pixel electrode 3, a liquid crystal molecule 24a is tilted in parallel with the extension direction of the space.

Figure 39:
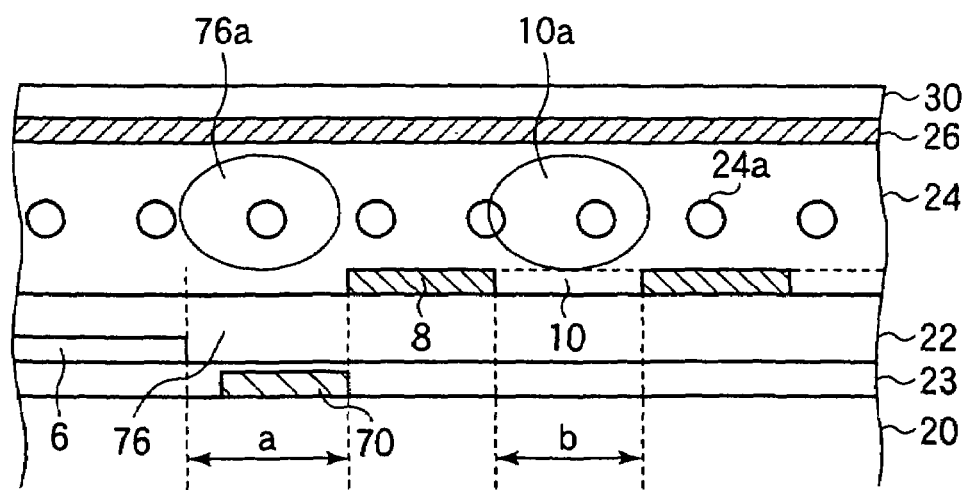
FIG. 39 is a view showing that in the example 2-5 according to the second embodiment of the present invention, the electric field shielding electrode 70 of the example 2-3 is provided in an under layer of the gap 76.
Figure 40:
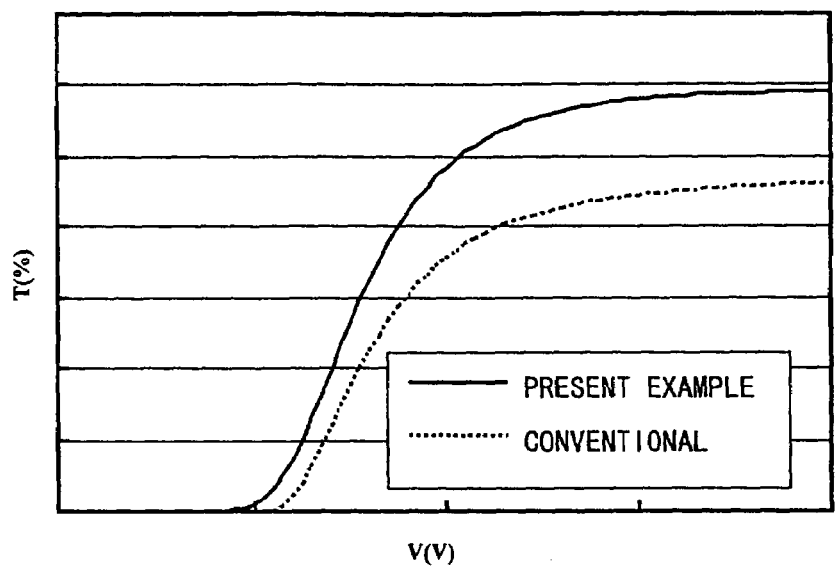
FIG. 40 is a T-V diagram showing the effect of the example 2-5 according to the second embodiment of the present invention.

Then, as shown in FIG. 39, the gap 76 is made close to the width of the space 10 to satisfy a≈b, and the liquid crystal molecule 24a in the region 76a is also made to fall down in the direction parallel with the drain bus line 6. By doing so, since the area of the pixel electrode 3 can also be widened, there is an effect that the transmissivity can be improved double as shown in FIG. 39. In order to suppress the cross talk, as shown in FIG. 39, an electric field shielding electrode 70 of the example 2-3 has only to be provided in a lower layer of the gap 76.

In this construction, a voltage is applied to the liquid crystal layer 24 and monomers in the liquid crystal layer 24 are polymerized. Since the direction in which the liquid crystal molecule 24a falls down is determined by the polymerized polymer in the completed MVA-LCD, it hardly receives the influence of an electric field generated at the end of the pixel when an image is displayed. When a display was effected on the completed MVA-LCD and the display region was observed, light was transmitted through the whole pixel portion, and in a T-V characteristic diagram of FIG. 40, as indicated by a curved line of a solid line, the transmissivity could be improved as compared with a conventional LCD indicated by a broken line.

EXAMPLE 2-6

Figure 41:
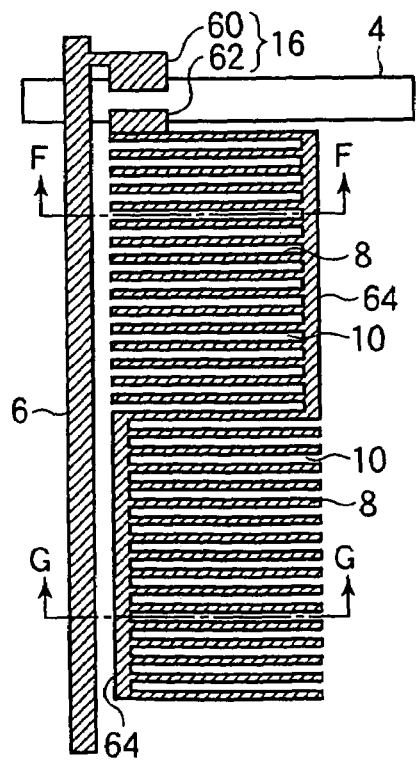
FIG. 41 is a view in which one pixel 2 of an MVA-LCD of example 2-6 according to the second embodiment of the present invention is viewed in the direction of a normal of a substrate surface.

This example will be described with reference to FIGS. 41 to 45. FIG. 41 shows a state in which one pixel 2 of an MVA-LCD according to this example is viewed in the direction of a normal of a substrate surface. The structure of a pixel electrode 3 of this example is characterized in that a line and space pattern constituted by stripe-like electrodes 8 and spaces 10 is formed in parallel with a gate bus line 4. In order to produce alignment division in two directions of right and left directions in the drawing, a connection electrode 64 is provided at the right side in the upper half of the pixel, and a connection electrode 64 is provided at the left side in the lower half of the pixel. By doing so, the alignment of a liquid crystal molecule tilted in a direction perpendicular to a drain bus line 6 by a horizontal electric field generated at the end of the pixel electrode parallel with the drain bus line 6 can be actively used. Incidentally, the connection electrodes 64 may be naturally provided at the left side in the upper half of the pixel and at the right side in the lower half of the pixel.

Figure 42:
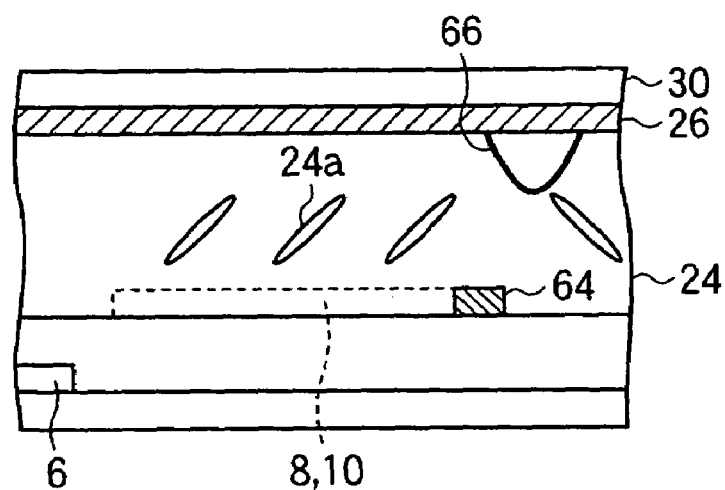
FIG. 42 is a view showing a section taken along line F-F of FIG. 41.
Figure 43:
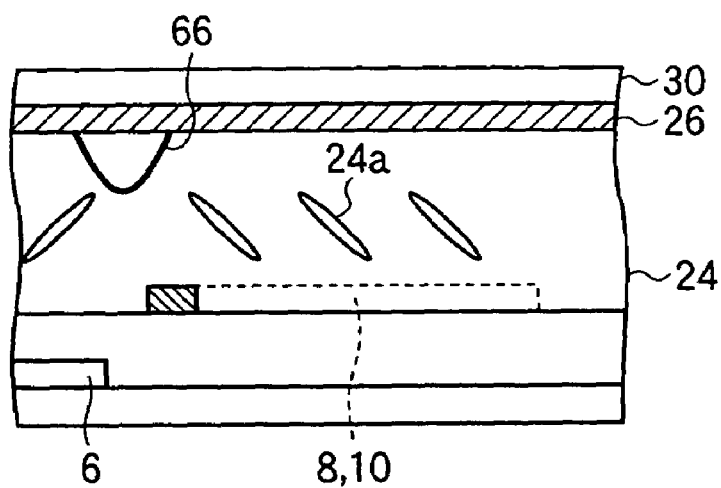
FIG. 43 is a view showing a section taken along line G-G of FIG. 41.
Figure 44:
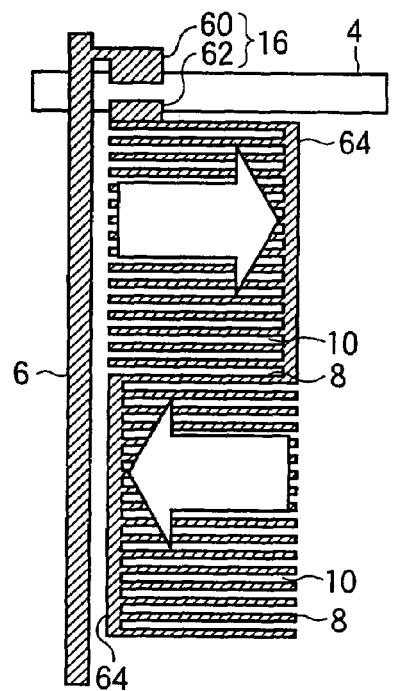
FIG. 44 is a view showing the direction of rubbing in the example 2-6 according to the second embodiment of the present invention.
Figure 45:
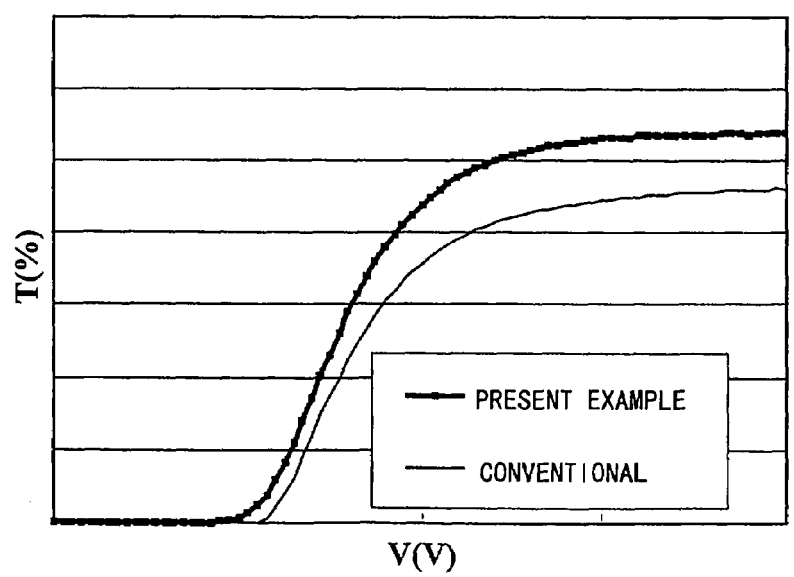
FIG. 45 is a T-V diagram showing the effect of the example 2-6 according to the second embodiment of the present invention.

FIG. 42 shows a section taken along line F-F of FIG. 41. FIG. 43 shows a section taken along line G-G of FIG. 41. As shown in FIGS. 42 and 43, a linear protrusion 66 is formed on an opposite substrate between the drain bus lines 6 adjacent to the two connection electrodes 64. By forming the linear protrusion 66, the influence of an electric field between the connection electrode 64 and the adjacent drain bus line 6 can be eliminated. Further, in order to ensure the alignment direction, as indicated by a thick outlined arrow of FIG. 44, on the side of the array substrate, rubbing may be performed from the side where the connection electrode 64 is not provided toward the side of the connection electrode 64, and on the side of the opposite substrate, rubbing may be performed in the direction opposite to the arrow. Besides, an optical alignment processing may be performed.

In this construction, a voltage is applied to the liquid crystal layer 24 to polymerize monomers in the liquid crystal layer 24. In the completed MVA-LCD, since the direction in which the liquid crystal molecule 24a falls down is determined by the polymerized polymer, it hardly receives the influence of the electric field generated at the end of the pixel when an image is displayed. When a display was effected on the completed MVA-LCD and the display region was observed, light was transmitted through the whole pixel portion, and in a T-V characteristic diagram of FIG. 45, as indicated by a curved line of a thick solid line, the transmissivity could be improved as compared with a conventional LCD indicated by a thin solid line.

Third Embodiment

Next, a liquid crystal display according to a third embodiment of the present invention and a method of manufacturing the same will be described with reference to FIGS. 46A to 48. This embodiment relates to an improvement of the MVA-LCD of the second embodiment. According to the second embodiment, a large dark portion X1 as indicated in the pixel microscopic observation view of FIG. 23 can be reduced using the stripe-like electrode pattern, however, a dark portion X1 slightly remains over the stripe-like electrode 8 closest to the drain bus line 6 and the gap 76.

Figure 46A:
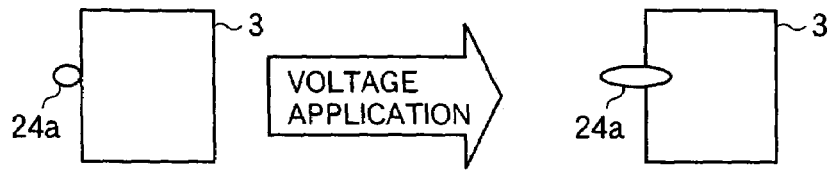
FIGS. 46A to 46E are views for explaining a tilting operation of a liquid crystal molecule 24a according to a third embodiment of the present invention.
Figure 46B:
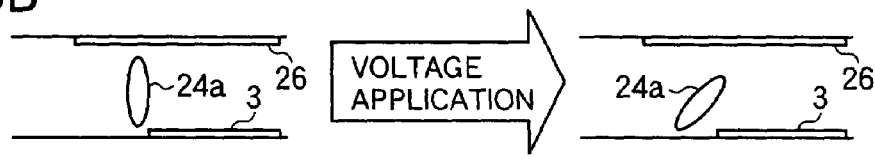

FIGS. 46A to 46E are views for explaining a tilting operation of a liquid crystal molecule 24a. FIG. 46A shows a state in which a pixel electrode 3 having no slit and the liquid crystal molecule 24a are viewed in the direction of a normal of a substrate surface, and FIG. 46B shows a state in which they are viewed in the direction of a section of the substrate. As shown in FIGS. 46A and 46B, when a voltage is applied to the liquid crystal molecule 24a, the major axis of the liquid crystal molecule 24a is tilted in the direction perpendicular to the end side of the pixel electrode 3. For example, the liquid crystal molecule 24a in the vicinity of the end side of the pixel electrode 3 parallel with the drain bus line 6 falls down in the direction perpendicular to the extension direction of the drain bus line 6.

Figure 46C:
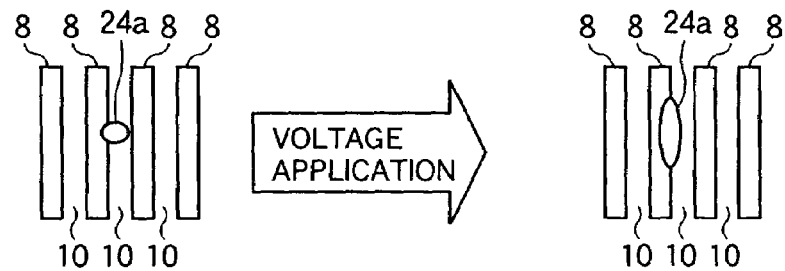
Figure 46D:
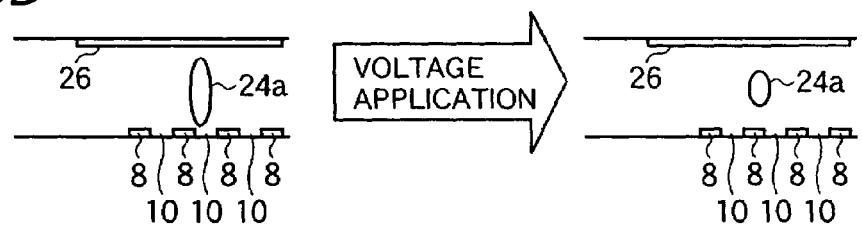

FIG. 46C shows a state in which a pixel electrode 3 formed of a line and space pattern and constituted by stripe-like electrodes 8 and spaces 10, and a liquid crystal molecule 24a are viewed in the direction of a normal of a substrate surface, and FIG. 46D shows a state in which they are viewed in the direction of a section of the substrate. As shown in FIGS. 46C and 46D, when a voltage is applied to the liquid crystal molecule 24a, the major axis of the liquid crystal molecule 24a is tilted in parallel with the longitudinal direction of the pattern of the stripe-like electrodes 8 and the spaces 10.

Figure 46E:
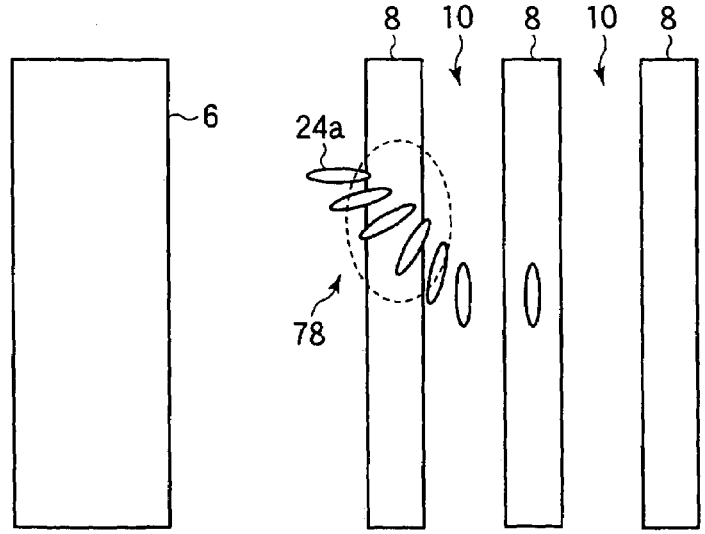

Accordingly, as shown in FIG. 46E, when the stripe-like electrode 8 is provided in parallel with a drain bus line 6, the direction of tilting of the major axis of the liquid crystal molecule 24a on the stripe-like electrode 8 and that in the vicinity of the drain bus line 6 are different from each other by 90°. Thus, a liquid crystal molecule 24a pointing to the direction of 45° with respect to the drain bus line 6 is produced as shown in an elliptical region 78 of FIG. 46E, and becomes parallel with the polarization axis of a polarizing plate, so that a dark portion is observed.

Then, in this embodiment, in order to basically eliminate the influence of the electric field generated at the end of the pixel and to suppress the region of the dark portion to a minimum, an electrode width a' of the stripe-like electrode 8 closest to the drain bus line 6 is made thinner than an electrode width b' of the stripe-like electrode 8 at the center portion of the pixel.

Incidentally, if the electrode width a' of the stripe-like electrode 8 is excessively thin, there is a possibility that the stripe-like electrode 8 is broken or is short-circuited to the adjacent stripe-like electrode 8. Then, the width of the stripe-like electrode 8 and the space 10 are set to be from 0.5 μm to 5 μm.

The liquid crystal display according to this embodiment and the method of manufacturing the same will be specifically described below using examples. First, conditions of the following examples are the same as the conditions of the examples in the second embodiment.

EXAMPLE 3-1

Figure 47:
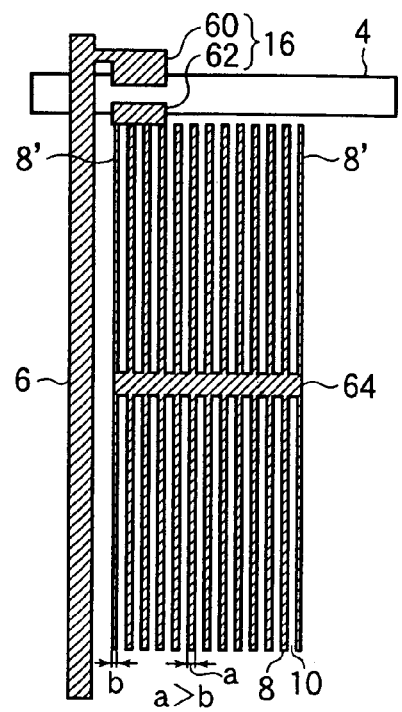
FIG. 47 is a view showing an example in which a connection electrode 64 is provided at the center of a pixel in example 3-1 of the third embodiment of the present invention.
Figure 48:
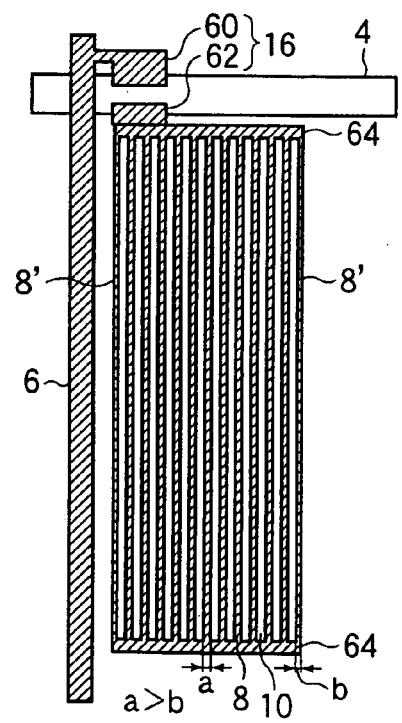
FIG. 48 is a view showing an example in which the connection electrode 64 is provided on the side of a gate bus line 4 in the example 3-1 of the third embodiment of the present invention.

When the distance between the stripe-like electrode 8 and the drain bus line 6 is short as in the example 2-5 of the second embodiment, there is a case where capacitance between the pixel electrode 3 and the drain bus line 6 becomes large, and cross talk is generated. In this case, since the distance between the stripe-like electrode 8 and the drain bus line 6 can not be shortened, the region of the dark portion X1 can be made a minimum by narrowing the width of stripe-like electrode 8' closest to the drain bus line 6. FIG. 47 exemplifies a case where a connection electrode 64 is provided at the center of a pixel. FIG. 48 exemplifies a case where a connection electrode 64 is provided on the side of a gate bus line 4.

EXAMPLE 3-2

In the example 3-1, in order to prevent the cross talk, the electric field shielding electrode 70 described in the example 2-3 or the example 2-5 of the second embodiment can be used.

Fourth Embodiment

Next, a liquid crystal display according to a fourth embodiment of the present invention and a method of manufacturing the same will be described with reference to FIGS. 49 to 62. This embodiment relates to an improvement in characteristics of a high display quality MVA-LCD. As an information equipment becomes popular in recent years, a display panel is required to have high performance. Thus, an MVA-LCD excellent in display quality is often used. However, the MVA-LCD has a problem that a response from the time of no voltage application (at the time of black display of a normally-black mode) to the time of low voltage application (halftone) is slow.

Figure 49:
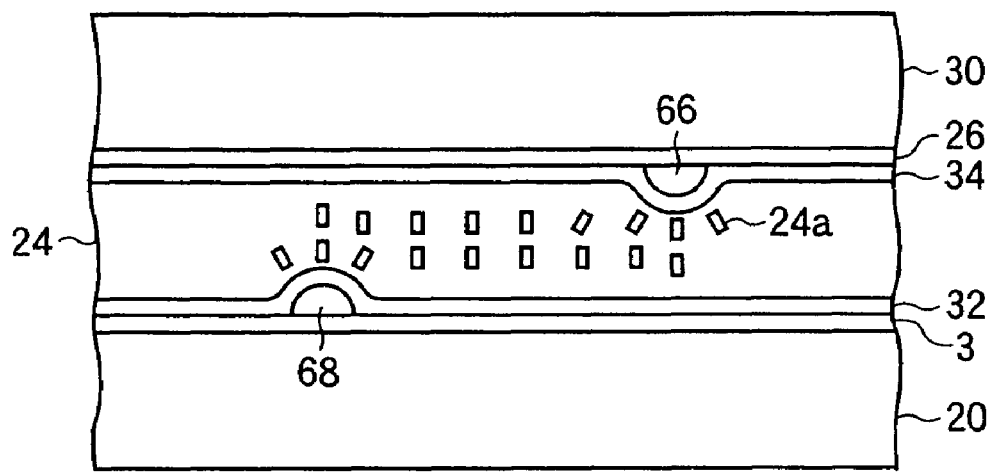
FIG. 49 is a view showing a conventional MVA-LCD.
Figure 50:
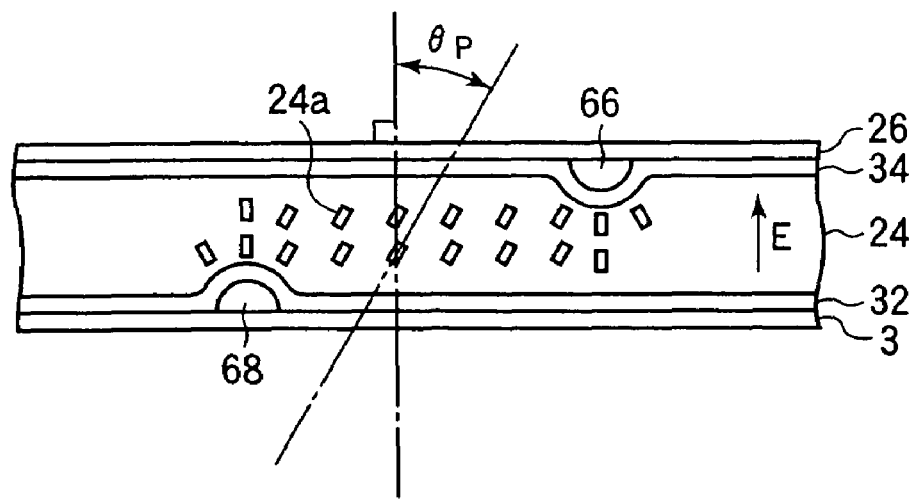

As shown in FIG. 49, in a conventional MVA-LCD, alignment regulating structural members (for example, linear protrusions 66 and 68) for regulating the tilt directions of liquid crystal molecules 24a are locally distributed (unevenly distributed). Since the alignment regulating structural members are locally distributed, in a region where there is not a structure for regulating a tilt direction and a tilt angle θp of the liquid crystal molecule 24a as shown in FIG. 50, it takes a time to propagate the tilt of a liquid crystal alignment. Further, if a boundary of alignment is formed on the structural member for regulating the tilt direction, a dark line is formed around the structural member, and the transmissivity is lowered. As stated above, in the construction in which means for regulating the tilt direction is arranged dispersedly, there is a problem that the liquid crystal alignment at the time of low voltage application is unstable.

Figure 86:
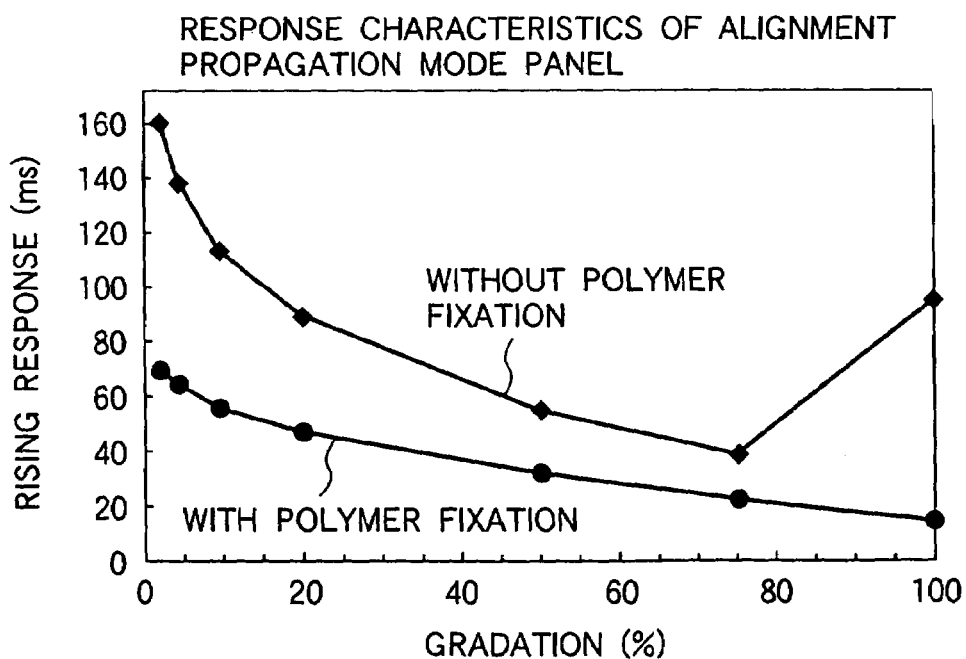
FIG. 86 is a view showing the relation of the gradation and the rising time with respect to an LCD having a liquid crystal which is not polymer fixed and an LCD having a liquid crystal which is polymer fixed in the fourth embodiment of the present invention.

Accordingly, since it takes a time for the liquid crystal of the whole pixel to make a response, there arises a problem that it takes a long time to change a black display (vertical alignment state) to a halftone display (tilt alignment state). Especially, in the case where the halftone display has a low gradation, since the propagation of the liquid crystal alignment tilt becomes slow, the response time becomes three or more times as long as a normal time. However, in the alignment of the case where polymer fixation has been made, the tilt directions of all portions in the pixel are previously determined. Accordingly, in any modes in which the alignment is changed while the tilt direction of the liquid crystal is propagated and the response becomes slow under normal conditions, the polymer fixation realizes a great improvement in the response. FIG. 86 shows the relation between the gradation and the rising time in an LCD including a polymer unfixed liquid crystal and an LCD including a polymer fixed liquid crystal. It is understood that the response speed higher by a factor of two to three times can be obtained by applying the polymer fixation to the normal MVA-LCD. Besides, as another problem, since the transmissivity is lowered, the display becomes dark. As stated above, in the construction in which tilt alignment is dispersed, there is a problem that the response property is deteriorated and the luminance is lowered because the liquid crystal alignment at the time of low voltage application is unstable.

This embodiment provides the MVA-LCD in which the response time is shortened without lowering the transmissivity, and the liquid crystal alignment at the time of low voltage application is fixed. Especially, in the polymer fixed alignment as the basic construction of this embodiment, since the tilt directions of all portions concerning display are previously determined, in any pixel structures in which the tilt direction of the liquid crystal must be propagated under normal conditions, remarkable speeding-up can be achieved.

Figure 51:
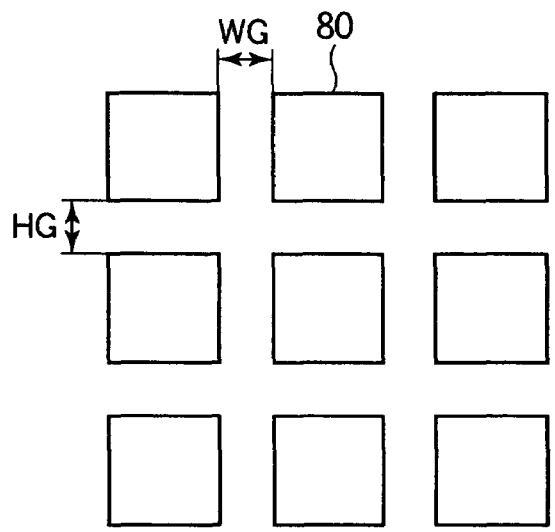
FIG. 51 is a view showing the arrangement relation of arrangement regions 80 according to a fourth embodiment of the present invention.

FIG. 51 is a structural view of this embodiment. In the drawing, 3×3=9 arrangement regions 80 arranged in a matrix form are exemplified. In the respective arrangement regions 80, structural members having directionality in the direction of a substrate surface or slits obtained by cutting an electrode (hereinafter referred to as directional structural members) are arranged. If a directional structure similar to the directional structural members is formed, as a single body or an aggregate, in a surface reformed region two-dimensionally in the same direction, the liquid crystal alignment can be tilted in one direction. By this, since a liquid crystal molecule can be tilted in a predetermined direction at the time of voltage application to a liquid crystal layer 24 when monomer, which is polymerized by light or heat, is polymerized, the optimum pretilt angle and/or tilt angle at the time of driving can be obtained.

In this embodiment, as shown in FIG. 51, the liquid crystal alignment is tilted in one direction by the directional structural members provided in the arrangement regions 80 arranged two-dimensionally on the substrate surface or by the surface reformed region in which a configuration equivalent to these is formed. That is, since the liquid crystal alignment is tilted at short intervals in one direction, a time in which the tilt of the liquid crystal alignment is propagated becomes short, and the response time can be shortened. Further, since a domain is not formed on the directional structural member or the surface reformed region, the transmissivity is not lowered. Further, since the polymer aligned in the tilt orientation of the liquid crystal is formed, the liquid crystal is stably tilted at the time of low voltage application.

The plurality of arrangement regions 80 shown in FIG. 51 are adjacent to each other to have a horizontal direction gap width WG and a vertical direction gap width HG. As a formation material of the structural member arranged in the arrangement region 80, for example, S1800 positive photoresist of Shipley Corporation is used. The height of the structural member is made about 0.3 µm.

Figure 52:
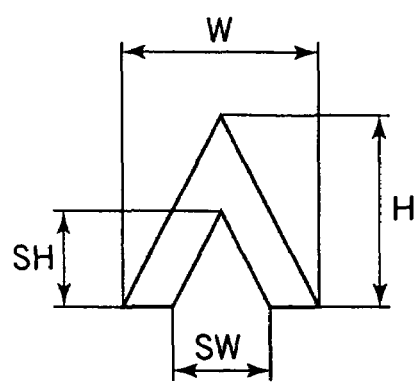
FIG. 52 is a view showing a directional structural member or a surface reformed region according to the fourth embodiment of the present invention.

FIG. 52 shows an example of the directional structural member or the surface reformed region in which a triangular recess being one size smaller is formed from a triangular outer shape when viewed in the direction of a normal of a substrate surface. An energy beam such as an ultraviolet ray is selectively irradiated for reforming the surface. The thickness of the liquid crystal layer is made about 4 µm. A vertical alignment film is used as an alignment film, and a liquid crystal having a negative dielectric anisotropy is used as a liquid crystal. By providing the triangular recess, there is produced an effect that a liquid crystal molecule is hard to tilt in the direction of the recess. As shown in FIG. 52, the pattern size can take various sizes of patterns D1 to D4.

At the time of no voltage application, the liquid crystal molecule is aligned substantially perpendicularly to the substrate surface. At the time of voltage application, the liquid crystal molecule is tilted in one direction by the directional structural member or the surface reformed region formed to have the same shape as the former. In the case where a liquid crystal cell is sandwiched between polarizing plates arranged in crossed Nicols, a black display is obtained at the time of no voltage application, and a white display is obtained at the time of voltage application.

Figure 53:
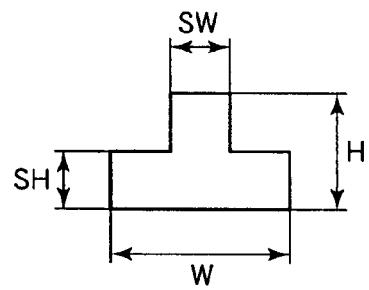
FIG. 53 is a view showing another example of the directional structural member or the surface reformed region according to the fourth embodiment of the present invention.
Figure 54A:
FIGS. 54A to 54F are views each showing still another example of the directional structural member or the surface reformed region according to the fourth embodiment of the present invention.
Figure 54B:
Figure 54C:
Figure 54D:
Figure 54E:
Figure 54F:

In the case of a structural member of a flat shape having no directionality, it is possible to produce directionality by combination. FIG. 53 shows an example in which a rectangular plane shape having two axial symmetry axes and a rectangular plane shape having two axial symmetry axes are combined to make one axial symmetry axis. As shown in FIG. 53, the pattern size can take various sizes of patterns F1 to F4.

A triangle, an almost halved ellipse, or a semicircle can be used as another example of the plane shape of the directional structural member or the surface reformed region. In the case of an equilateral triangle, the number of axial symmetry axes becomes three. However, if it is arranged in a lattice shape, the number of axial symmetry axes of an aggregate becomes one.

FIGS. 54A to 54F show examples of the combination of plural structural members. The plane shape of the directional structural member or the surface reformed region is substantially triangular, rectangular, square, substantially halved elliptical, semicircular, elliptical or circular, and one of a protrusion and a recess formed on a side opposite to the protrusion, or both may be provided in a portion. The shape of the protrusion or the recess may be substantially triangular, rectangular, square, halved elliptical, or semicircular.

Figure 55:
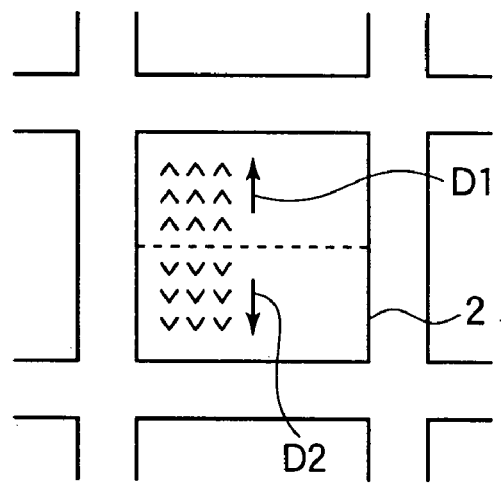
FIG. 55 is a view showing a construction for improving a visual angle property of an LCD according to the fourth embodiment of the present invention.

FIGS. 55 to 58 show constructions for improving a visual angle property of an LCD. Directions D of plane shapes of directional structural members or surface reformed regions in a pixel 2 are different. In FIG. 55, the inside of the pixel 2 is divided at the center into two regions. For example, the structural members each having the triangular outer shape with the recess shown in FIG. 52 are aligned in a matrix form in one direction D1 while the apexes point upward in the drawing. On the other hand, the structural members each having the triangular outer shape with the recess shown in FIG. 52 are aligned in a matrix form in a reverse direction D2 different from the direction D1 by 180° while the apexes point downward in the drawing. By adopting the construction as stated above, liquid crystal molecules are alignment regulated in a wide range in the pixel at the time of polymerization, and an excellent liquid crystal alignment by polymers can be obtained.

Figure 56:
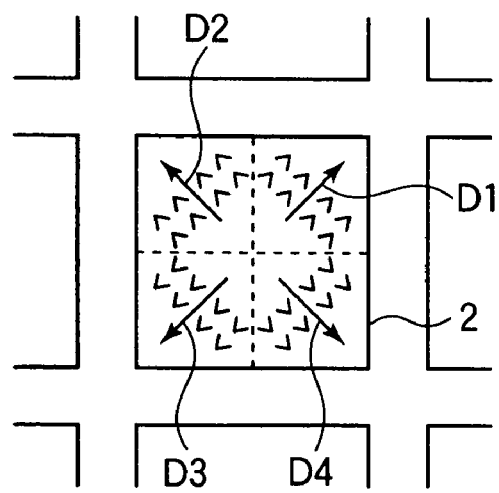
FIG. 56 is a view showing an arrangement example of a structural member according to the fourth embodiment of the present invention.
Figure 57:
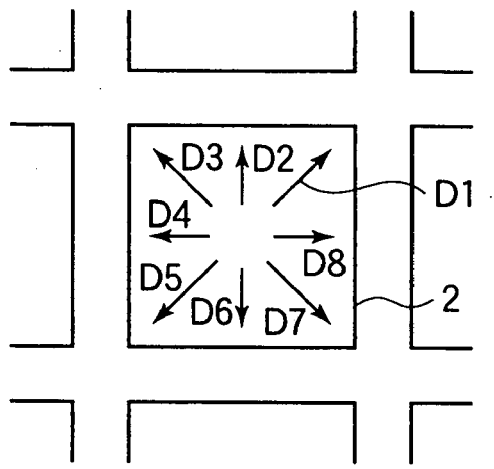
FIG. 57 is a view showing another example of the arrangement example of the structural member according to the fourth embodiment of the present invention.
Figure 58:
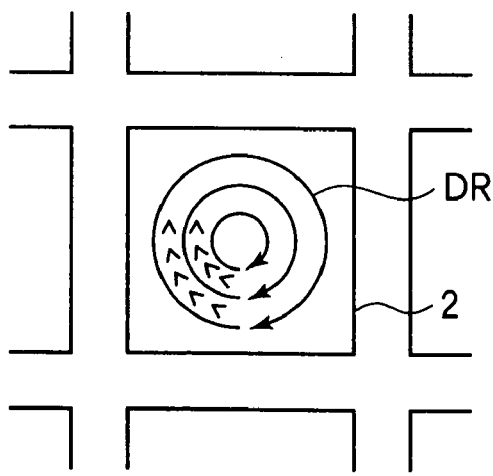
FIG. 58 is a view showing still another example of the arrangement example of the structural member according to the fourth embodiment of the present invention.

Similarly, in FIG. 56, structural members each having the triangular outer shape with the recess shown in FIG. 52 are aligned in four directions D1 to D4 while the directions of the apexes are changed for respective regions by 90°. Incidentally, the direction of the plane shape may be continuously changed. For example, in FIG. 57, the structural members are extended radially from the center portion of the pixel 2 and are aligned. In FIG. 58, structural members are aligned such that the apexes are concentrically arranged. By adopting the alignment constructions as stated above, the directions in which the liquid crystal molecules are tilted can be finely controlled in the pixel 2, so that the visual angle property can be improved. Further, a shift of the liquid crystal alignment in the orientation angle direction at the time of display voltage application can be decreased by previously applying a low voltage to the pixel electrode to slightly tilt the liquid crystal alignment.

What was obtained by adding liquid crystal monoacrylate UCL-001-K1 of 2.5% of Dainippon Ink Corporation to liquid crystal MJ-961213 of Merck Japan Corporation was used as a monomer mixture liquid crystal material for polymer fixation. After the liquid crystal material is injected between substrates, monomers are cured by irradiating the liquid crystal layer with ultraviolet rays while a voltage of 5.0 V is applied to the liquid crystal layer. By doing so, it becomes possible to form polymers aligned in the tilt orientation of the liquid crystal molecules. By this, the liquid crystal alignment at the time of low voltage application can be fixed.

Figure 59:
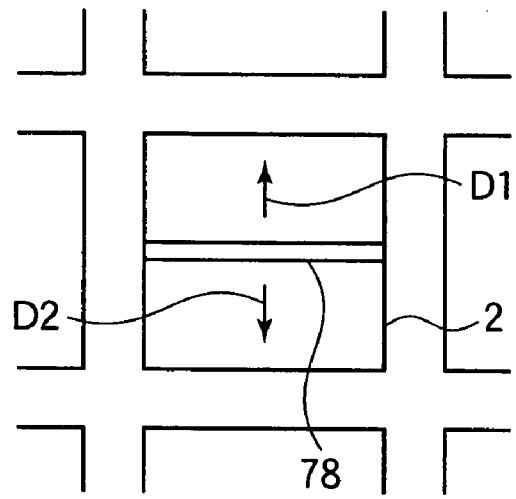
FIG. 59 is a view showing a boundary structural member according to the fourth embodiment of the present invention.
Figure 60:
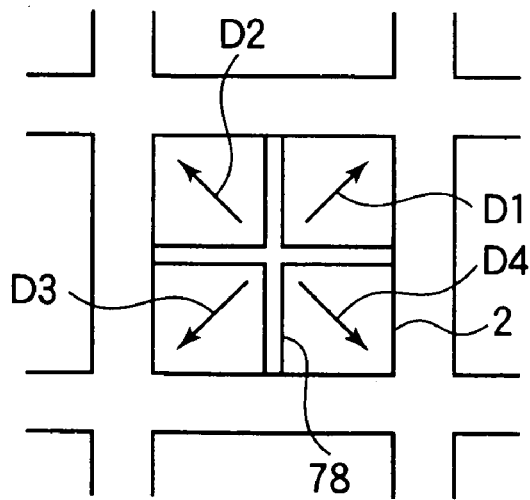
FIG. 60 is a view showing another example of the boundary structural member according to the fourth embodiment of the present invention.

Further, a construction for improving the visual angle property of an LCD is shown in FIGS. 59 and 60. The constructions shown in FIGS. 59 and 60 are characterized in that a boundary structural member 78 of a directional structural member or a surface reformed region is provided at a boundary of respective regions in a pixel 2. The boundary structural member 78 is formed into a band shape having a width of 5 µm and a height of about 0.3 µm. The height may be about 1.5 µm. FIG. 59 shows a state in which the inside of the pixel 2 is divided into two regions by the band-like boundary structural member 78, and FIG. 60 shows a state in which the inside of the pixel 2 is divided into four regions by combining the band-like boundary structural members 78 into a cruciform shape.

Figure 61:
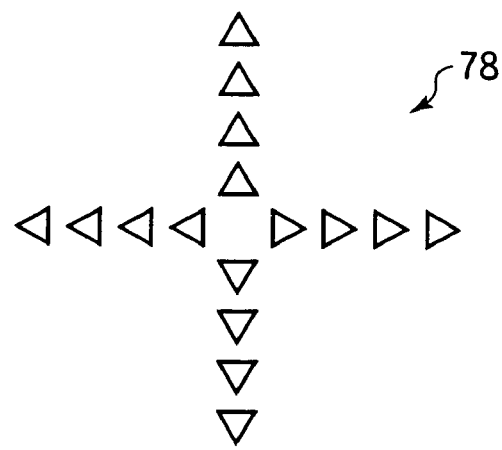
FIG. 61 is a view showing a specific shape of the boundary structural member according to the fourth embodiment of the present invention.
Figure 62:
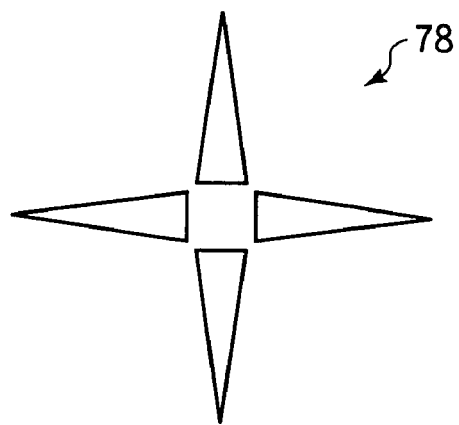
FIG. 62 is a view showing another specific shape of the boundary structural member according to the fourth embodiment of the present invention.

Constructions shown in FIGS. 61 and 62 are specific examples of the boundary structural member 78 shown in FIG. 60. The structural member 78 shown in FIG. 61 is constructed by arranging a plurality of triangular structures which are radially extended in four directions while the directions of the apexes are made the same in each direction. The boundary structural member 78 shown in FIG. 62 is constructed by arranging isosceles triangle structures which are radially extended in four directions while the one structure is extended in one direction and the apex points to each direction.

As described above, according to this embodiment, the liquid crystal molecules can be tilted and aligned at short intervals, and the propagation distance of the liquid crystal alignment tilt becomes short, so that the response time can be made short. Further, since the transmissivity is not lowered, and the liquid crystal alignment at the time of low voltage application is stable, the display performance of the MVA-LCD can be improved.

Fifth Embodiment

Figure 64:
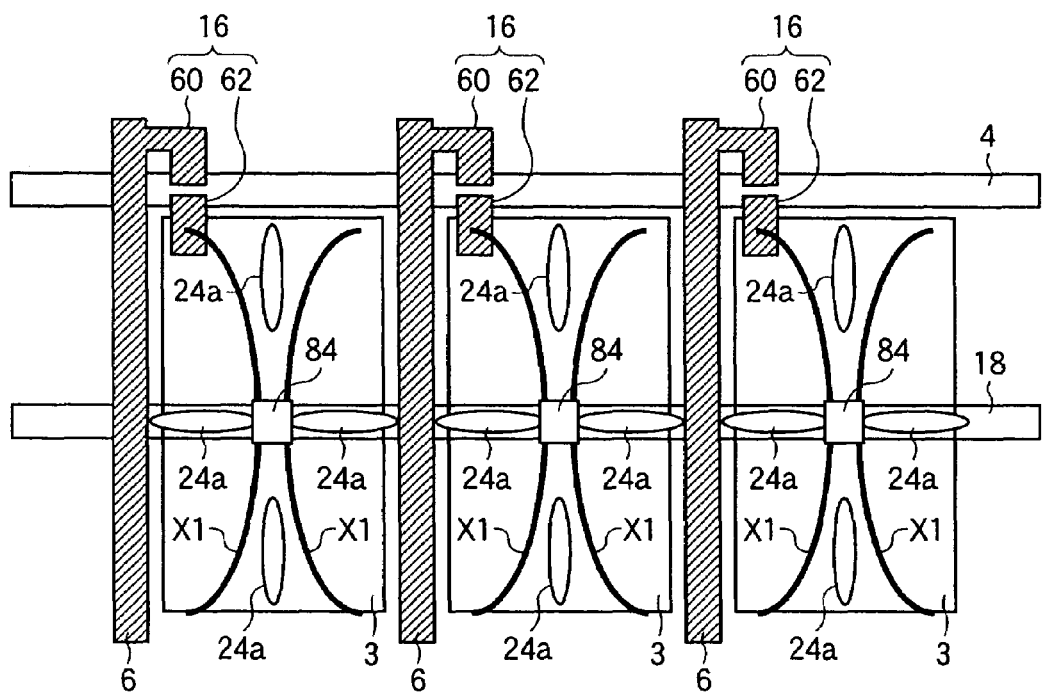
FIG. 64 is a view showing a state in which three adjacent pixels 2 of an LCD in an example according to the fifth embodiment of the present invention are viewed in the direction of a normal of a substrate surface.
Figure 65:
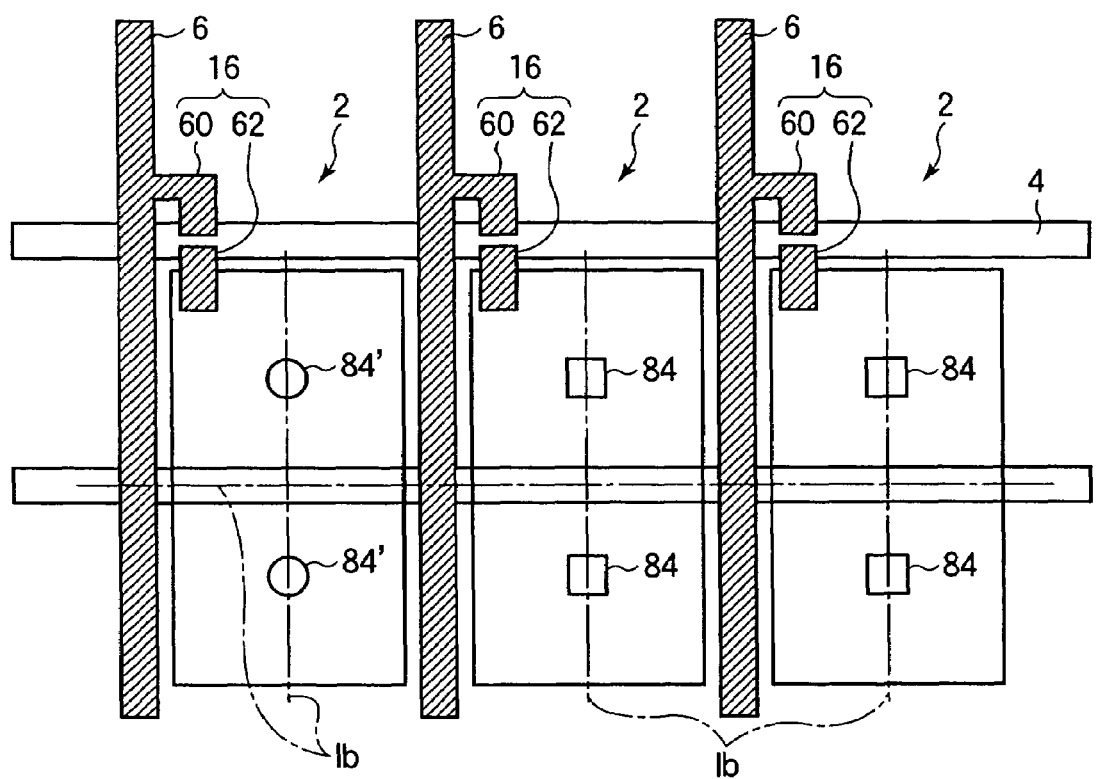
FIG. 65 is a view showing a modified example of the example according to the fifth embodiment of the present invention.

Next, a liquid crystal display according to a fifth embodiment of the present invention and a method of manufacturing the same will be described with reference to FIGS. 63 to 65. This embodiment relates to weight lightening of the liquid crystal display. The liquid crystal display is used for a portable TV, various monitors, a projection type projector, and the like, in addition to a book-size personal computer.

The existing LCD which can produce a color display is inferior to the CRT in brightness, and a rise in luminance is desired. As one of methods of improving the brightness, it is conceivable to use a circular polarization plate (circular polarization plate indicates a combination of a polarizing plate and a λ/4 plate). A drop in luminance by disclination generated in a pixel can be suppressed by using the circular polarization plate.

In general, as a method for controlling the alignment of liquid crystal, there is an alignment regulating structural member such as a protrusion or a slit obtained by cutting an electrode. Besides, there is also a polymer fixation system in which monomers are polymerized by irradiating ultraviolet (UV) light to a liquid crystal layer mixed with the monomers in a state where liquid crystal molecules are tilted by applying a voltage to the liquid crystal layer, and the liquid crystal is alignment regulated. Among these alignment regulating means, the polymer fixation system can make the opening ratio of a pixel highest.

When the monomers in the liquid crystal layer are polymerized, a voltage is applied to the liquid crystal layer to tilt the liquid crystal molecules, and at this time, there is a case where an alignment regulating structural member is provided in a pixel so that the liquid crystal molecules keep predetermined alignment directions. In the case where the monomers are polymerized without providing the alignment regulating structural member such as the protrusion or slit, a bead spacer dispersed in the pixel to maintain a predetermined cell gap becomes a base point for determining the alignment direction of the liquid crystal molecule.

Figure 63:
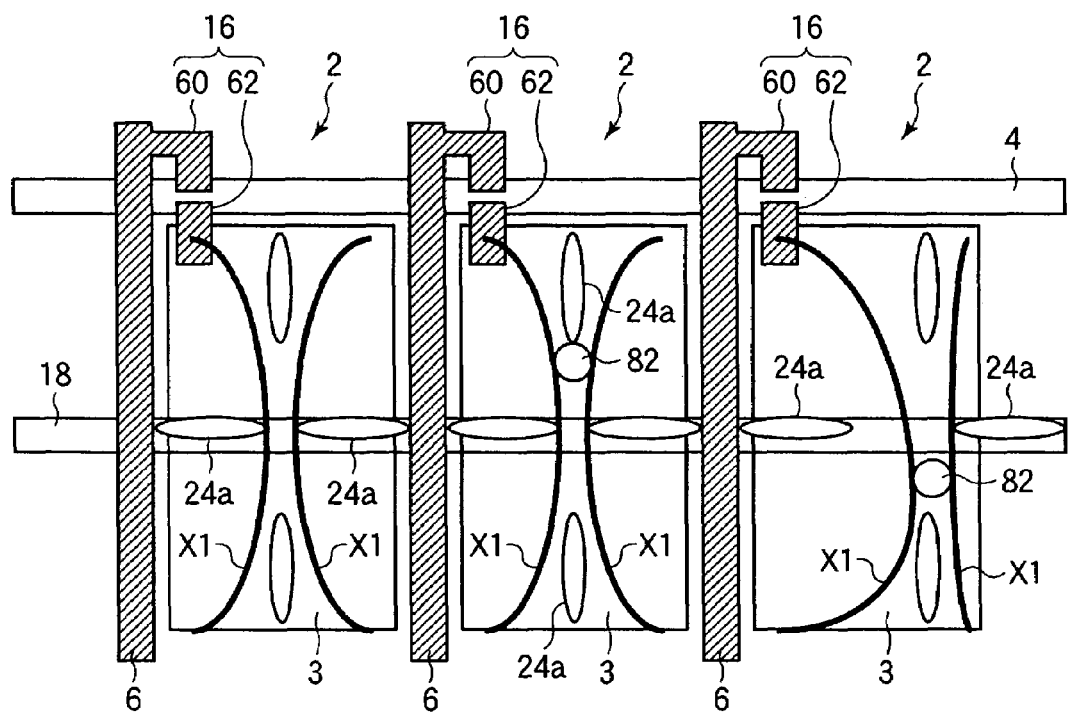
FIG. 63 is a view showing a state in which three adjacent pixels 2 of an LCD according to a fifth embodiment of the present invention are viewed in the direction of a normal of a substrate surface.

FIG. 63 shows a state in which three adjacent pixels 2 are viewed in the direction of a normal of a substrate surface. A bead spacer 82 does not exist in a pixel 2 at the left side in the drawing, but one bead spacer 82 exists in each of the pixels 2 at the center and the right in the drawing and the arrangement positions are different from each other. Since the bead spacers 82 are dispersed at random, as shown in FIG. 63, the distribution states of the bead spacers 82 are different for the respective pixels, and accordingly, the base positions for determining the alignment directions of liquid crystal molecules 24a are different between the respective pixels.

When a voltage is applied to a liquid crystal layer 24, the liquid crystal molecules 24a in the vicinity of a gate bus line 4 are tilted in the direction perpendicular to the gate bus line 4 by a horizontal electric field generated between the gate bus line 4 and the end portion of a pixel electrode 3. Similarly, the liquid crystal molecules 24a in the vicinity of a drain bus line 6 are tilted in the direction perpendicular to the drain bus line 6. The tilts of the liquid crystal molecules 24a in the vicinity of the bus lines are propagated to the inner liquid crystal molecules 24a, and four alignment division regions are formed. Dark lines X1 as shown in the drawing are formed at the boundaries of the respective alignment regions.

However, as described above, since the distribution states of the bead spacers 82 are different between the respective pixels, and the base positions for determining the alignment directions of the liquid crystal molecules 24a are different between the respective pixels, as is apparent from FIG. 63, the formation states of the dark lines X1 become different between the respective pixels in accordance with the positions of the bead spacers 82 in the pixels 2. This is caused since the alignment ratios of the respective tilt orientations are different between the respective pixels, and even in the case where the circular polarization plate is used, there arises a problem that an angle of view becomes small at a halftone, brightness becomes different between the respective pixels or unevenness of display is observed on the whole.

In order to improve the above problem, in the liquid crystal display according to this embodiment, columnar spacers are formed at the same position in all pixels instead of the bead spacers, so that the alignment ratios of liquid crystal molecules in respective alignment directions in the pixel become the same in all pixels. By doing so, since the alignment rates of the liquid crystal molecules in the respective alignment directions become the same in all the pixels, unevenness of display can be prevented.

Hereinafter, a specific example will be described with reference to FIG. 64. FIG. 64 shows a state in which three adjacent pixels 2 are viewed in the direction of a normal of a substrate surface. In FIG. 64, a storage capacitance bus line 18 is formed under pixel electrodes 3 at their center lines, and columnar spacers 84 each having a width of 10 µm square are formed of resist on the center of pixel electrodes 3.

As stated above, in the MVA-LCD of this example, instead of the bead spacers, the columnar spacers 84 are formed at the same position (in this example, at the center of the pixel) of the respective pixels. Thus, the base positions for determining the alignment directions of the liquid crystal molecules 24a can be the same for all the pixels. Accordingly, as shown in FIG. 64, the alignment ratios of the liquid crystal molecules 24a in the respective alignment directions in the pixel 2 are made the same, and the formation states of dark lines X1 in the pixels 2 can be made the same in all the pixels.

Next, a method of manufacturing the MVA-LCD according to this example will be described in brief.

First, a positive resist (made by Shipley Corporation) is spinner coated to a predetermined thickness (such a thickness that a cell gap becomes 5 μm) on an array substrate on which a TFT 16 is formed or an opposite substrate on which a color filter is formed. Thereafter, mask exposure is performed, and the columnar spacer 84 having a thickness equivalent to the thickness of a cell gap is formed at the center portion of a pixel as shown in FIG. 64.

Next, a vertical alignment film made of polyimide is formed on the array substrate and the opposite substrate.

Next, both the substrates are bonded at a predetermined position, and a liquid crystal having a negative dielectric anisotropy and a monomer, which can be polymerized by UV light, are mixed and in this state, they are injected between the substrates.

A gate voltage of DC 30 V is applied to the gate bus line 4 of the liquid crystal panel in which the injection is finished, and a drain voltage of DC 5 V is applied to the drain bus line 6. The opposite electrode is the ground voltage. At this time, the horizontal electric field is generated between the gate bus line 4 or the data bus line 6 and the pixel electrode 3, and the liquid crystal molecules 24a are slowly aligned into the stable state. UV light is irradiated to the liquid crystal layer 24 in this state, and the monomer is cured by photopolymerization.

Next, circular polarization plates (polarizing plates+λ/4 plates) are arranged on both surfaces of the liquid crystal panel in a predetermined optical axis, and the MVA-LCD is completed.

Next, a modified example of the above example will be described with reference to FIG. 65. FIG. 65 shows a state in which three adjacent pixels 2 are viewed in the direction of a normal of a substrate surface. In FIG. 65, two columnar spacers 84 each having a width of 10 μm square are formed on a horizontal or vertical center line 1b of a pixel electrode 3 at equal distances from the center of the pixel 2. Incidentally, the columnar spacer 84 may be naturally cylindrical. Cylindrical spacers 84' each having a diameter of 10 μm is exemplified in the pixel 2 at the left side of FIG. 65. It is desirable that the width and the diameter of the columnar spacers 84 and 84' are 20 μm or less.

As stated above, also in the MVA-LCD of this modified example, instead of the bead spacers, the two columnar spacers 84 are formed at the same positions (in this example, upper and lower two positions at equal distances from the center of the pixel) of each of the pixels. Even if this construction is adopted, the base positions for determining the alignment directions of the liquid crystal molecules 24a can be made the same in all the pixels.

In the above example and modified example, the columnar spacer 84 is formed using the resist, however, in addition to this, the columnar spacer 84 may be naturally formed by partially stacking two or three layers of color filter formation material. Besides, it may be formed by stacking plural layers of the color filter formation material and a thin film of organic material.

Further, in a CF-on-TFT structure in which a color filter layer is formed on an array substrate, the columnar spacer 84 may be naturally formed by partially stacking two or three layers of color filter layers.

Besides, in the above example and modified example, although the description has been given of the example in which two or three columnar spacers 84 are formed in the pixel, in addition to this, columnar spacers may be naturally formed also on the peripheral portion of the pixel regularly.

Sixth Embodiment

Next, a liquid crystal display according to a sixth embodiment of the present invention and a method of manufacturing the same will be described with reference to FIGS. 66 to 68B. This embodiment relates to a VA mode in which a liquid crystal having a negative dielectric anisotropy is vertically aligned, and particularly to an MVA-LCD in which an alignment control (tilt direction) of liquid crystal molecules is made without performing an alignment processing such as rubbing but by using an alignment protrusion or an electrode slit. Further, this embodiment relates to an MVA-LCD which has a wide interval between alignment protrusions and is bright, however, has a construction such that an alignment control is difficult.

In the MVA-LCD in which the liquid crystal having the negative dielectric anisotropy is vertically aligned, and the tilt directions of the liquid crystal molecules at the time of voltage application are divided into some directions using the alignment protrusions or the electrode slits, they are vertically aligned almost completely at the time of no voltage application, however, they are tilted in various directions at the time of voltage application. Although the directions of the tilts are regulated to form 45° with respect to a polarizer absorption axis in any cases, the liquid crystal molecule as a continuum also falls down in the intermediate direction. Besides, also by the influence of a horizontal electric field or the like at the time of driving or the roughness of the structural member, there always exists a region where the tilt direction of the liquid crystal is shifted from a predetermined direction. In the normally-black mode in which the polarizers are arranged in crossed Nicols, a blackish region appears in each pixel at the time of a white display. This lowers the luminance of the screen.

Then, the polymer fixation system is effective in which the liquid crystal molecules fall down to a certain degree by voltage application, and a monomer material is polymerized in the state where the tilt direction is determined. As the monomer material, a material which is polymerized by UV irradiation is generally used. In the polymer fixation system, a polymer is formed to memorize the information of the tilting direction of liquid crystal molecules at the time of voltage application. Accordingly, when a state in which there is no disclination in a liquid crystal layer is formed at the time of polymerization by UV irradiation, the disclination is not produced in the display pixel even if any liquid crystal driving is performed later. Further, there is a merit that the response speed at a halftone is also improved.

However, it is difficult to apply a uniform voltage to the whole liquid crystal layer at the time of polymerization. Besides, it is known that UV irradiation in the on state of a TFT deteriorates the characteristics of the TFT. Further, it is troublesome in process that UV irradiation is made while a voltage is applied to the liquid crystal layer. Moreover, if the monomer material in the liquid crystal layer is irregularly distributed, there is a case where unevenness of in-plane pre-tilt occurs after the polymerization, and unevenness of display is caused.

In order to solve the above problem, in this embodiment, UV irradiation is applied to monomers to polymerize them in a state of no voltage application or in such a low voltage application state that there does not occur a difference in pre-tilt even if there is an irregular distribution of monomer materials. In the state of no voltage application, a predetermined effect can be obtained by using a processing of optical alignment or the like together.

The UV irradiation is applied under a low voltage of such a degree that a difference does not occur in the pre-tilt even if there is fluctuation of applied voltage to the liquid crystal layer in the substrate surface or an irregular distribution of polymer materials in the substrate surface, so that a desired pretilt angle and/or alignment regulating direction can be given to the liquid crystal layer, and the occurrence of the unevenness of display at the time of an image display can be prevented. Further, in combination with a UV alignment, polymerization can be performed in the state in which alignment control is perfect even if a voltage is not applied. Besides, since the TFT can be turned off at the time of the UV irradiation, deterioration of the TFT can be prevented.

According to this embodiment, the MVA-LCD can be obtained in which tilting of the liquid crystal molecules is carried out at a high speed, the alignment is fixed, and unevenness of in-plane display does not occur.

Hereinafter, a specific example will be described with reference to FIGS. 66 to 68B.

Figure 66:
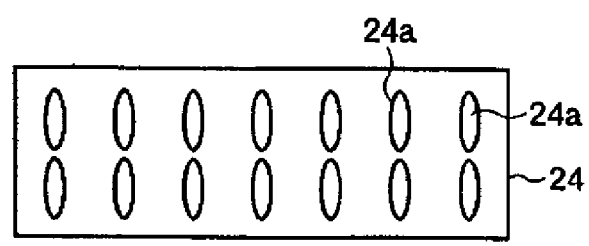
FIG. 66 is a view showing a basic construction of an LCD using a polymer fixation system.

FIG. 66 shows a basic construction of an LCD using the polymer fixation system. Liquid crystal molecules 24a are fixed at a pretilt angle by polymers, and the tilting direction at the time of voltage application is also regulated.

Figure 67A:
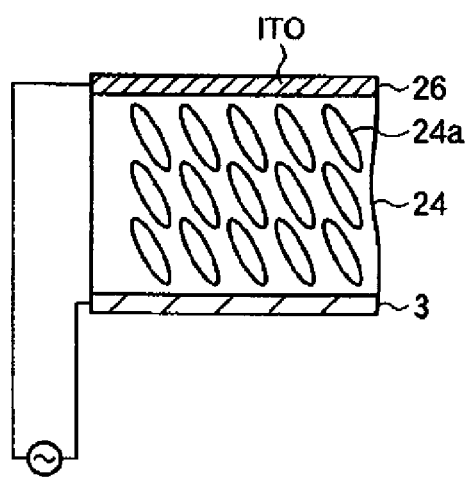
FIGS. 67A and 67B are views showing a conventional system in which voltage is applied to a liquid crystal layer 24 when monomer material is irradiated with UV and is polymerized.

FIG. 67A shows a conventional system in which a voltage is applied to a liquid crystal layer 24 when UV irradiation is applied to a monomer material to polymerize it. If polymerization is performed by this system, the liquid crystal molecules 24a are fixed at a predetermined pretilt angle. This pretilt angle is determined by the concentration of the polymer material, the voltage applied to the liquid crystal layer 24, and the amount of the UV irradiation.

Figure 67B:
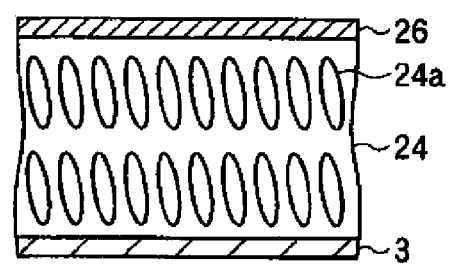

FIG. 67B shows a method of polymerization according to this example. A light (UV) alignment processing is performed to alignment films (not shown) formed on liquid crystal contact surfaces of a pixel electrode 3 and a common electrode 26. By doing so, since it becomes unnecessary to apply a voltage to the liquid crystal layer 24 at the time of UV irradiation, the obtained pretilt angle is determined only by the UV alignment processing, and polymerization is performed in this state. Instead of the UV alignment processing, a low voltage of such a degree that fluctuation does not occur in the pretilt angle may be applied to the liquid crystal layer to perform polymerization.

Figure 68A:
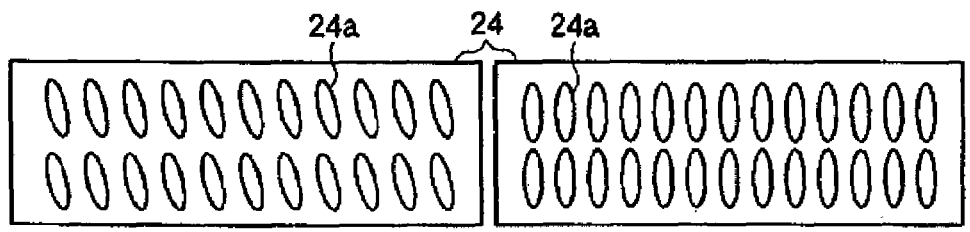
FIGS. 68A and 68B are views in which an example according to a sixth embodiment of the present invention is compared with a conventional example.

FIG. 68A shows results obtained by the conventional system. The left side and the right side of the drawing show unevenness of pretilt in the case where there is unevenness of concentration in the polymer material or there is unevenness of applied voltage to the liquid crystal layer 24. In the illustrated example, a left pretilt angle is larger than a right one. As a result, when the completed LCD is displayed, the unevenness of display is observed.

Figure 68B:
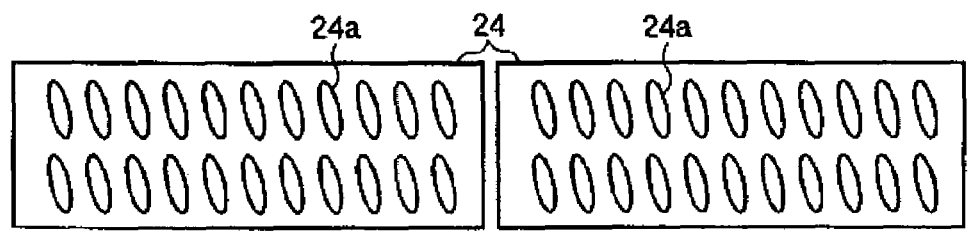

FIG. 68B shows results of this example. In the case where the pretilt angle is determined by the UV alignment processing of the alignment film, or in the case where the low voltage of such a degree that fluctuation of the pretilt angle does not occur is applied to the liquid crystal layer, even if unevenness of concentration of the polymer material exists on the substrate, since the unevenness of pretilt does not occur, the unevenness of display does not occur in the completed LCD.

The monomer material used for this embodiment is a mesomorphism or non-mesogenic monomer, and for example, bifunctional acrylate or a mixture of bifunctional acrylate and monofunctional acrylate can be used.

In this embodiment, although the MVA-LCD has been described, in addition to this, the above embodiment can be applied to LCDs of various systems, such as another VA mode, TN mode, or IPS mode.

Seventh Embodiment

Next, a liquid crystal display according to a seventh embodiment of the present invention and a method of manufacturing the same will be described with reference to FIG. 69. This embodiment relates to the liquid crystal display and the method of manufacturing the same, and particularly to the liquid crystal display in which alignment regulation of a vertical alignment type liquid crystal is stably performed by a polymer fixation (macromolecule fixation) system. In a conventional polymer fixation system, there is adopted a method in which at the time of polymerization, the alignment directions of liquid crystal molecules are controlled by performing light irradiation while a voltage is applied to the liquid crystal layer from an external power source.

However, this is not an easy process in fabricating the liquid crystal display panel. This is because UV light for polymerization must be irradiated in the state where the voltage is supplied to the liquid crystal layer from the side of the gate bus line of the liquid crystal display panel, the side of the drain bus line, and the common electrode.

Figure 69:
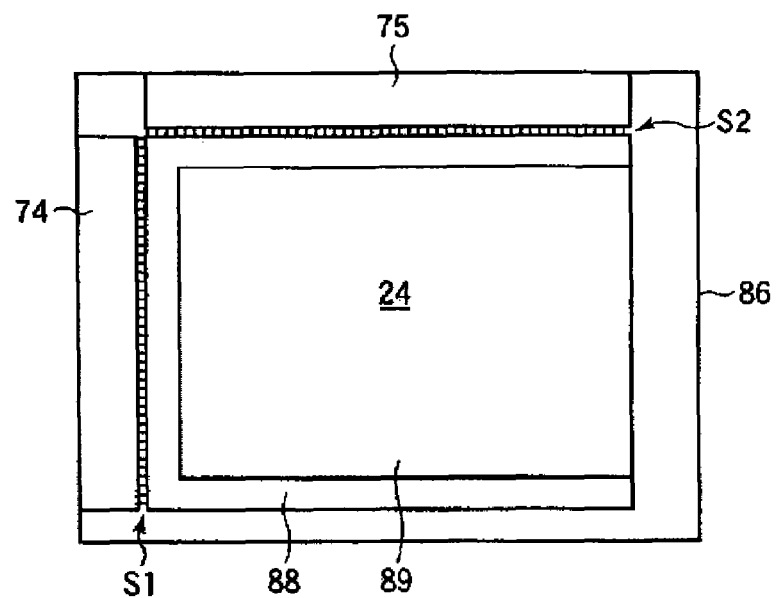
FIG. 69 is a view showing a liquid crystal display according to a seventh embodiment of the present invention and a method of manufacturing the same.
Figure 70:
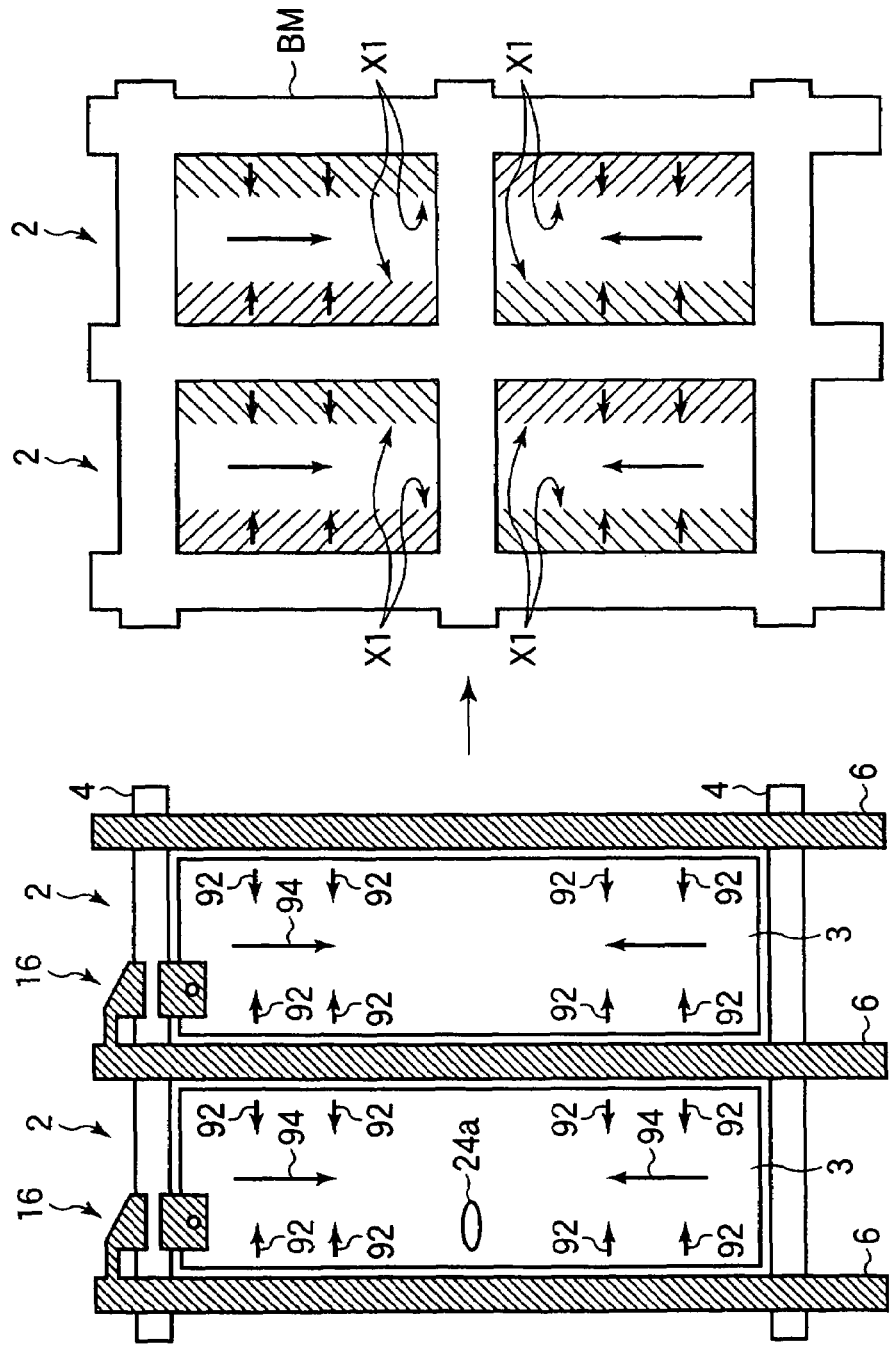
FIGS. 70A and 70B are views for explaining a problem in a case where alignment regulating force is increased by the polymer fixation system.

FIG. 69 shows a state in which an array substrate 88 including TFTs and formed on a mother glass 86 on the side of the array substrate, and an opposite substrate 89 bonded thereto across a liquid crystal layer 24 are viewed in the direction of a normal of a substrate surface. Polymers for regulating pretilt angles of liquid crystal molecules and/or tilt directions at the time of driving are mixed in the liquid crystal layer 24. Pixel electrodes are formed in a matrix form on the array substrate 88, and a common electrode is formed on the opposite substrate 89. The TFTs on the array substrate 88 are connected to a gate bus line and a drain bus line.

Solar cells (silicon photovoltaic cells) 74 and 75 are formed on the mother glass 86. Output terminals of the solar cell 74 are respectively connected to a plurality of gate bus line terminals led out to the end face of the array substrate 88. Output terminals of the solar cell 75 are respectively connected to a plurality of drain bus line terminals led out to the end face of the array substrate 88.

In a process of fabricating the liquid crystal display panel, the alignment direction of the liquid crystal layer 24 can be regulated by applying a voltage between the pixel electrode and the common electrode using the output voltage obtained by irradiating the solar cells 74 and 75 with light. That is, voltage supply from an external power source is not necessary, and it becomes possible to control the alignment orientations of the liquid crystal molecules in the process of light irradiation.

When the alignment orientations of the liquid crystal molecules have been fixed, the solar cells 74 and 75 provided on the outer peripheral portion of the mother glass 86 become unnecessary, and accordingly, the solar cells 74 and 75 are cut away from the panel at scribe lines S1 and S2 when the liquid crystal display panel is cut out from the mother glass 86.

It is desirable in process that the solar cells 74 and 75 are formed on the mother glass 86 on which the pixel TFTs and active elements included in a peripheral circuit are formed, and are simultaneously formed when the elements of the pixel portion and the peripheral circuit of the array substrate 88 are formed. When they are formed on the same substrate, manufacturing costs can be suppressed.

Besides, the solar cells 74 and 75 are formed on the peripheral portion of the display region, and after the alignment orientation of the liquid crystal is regulated by irradiation of light, they may be shaded by a light shielding material and may remain in the inside of the liquid crystal display panel. At this time, in the case where it is used as a liquid crystal display, light shielding must be carried out so that the solar cells are not operated by a backlight or peripheral light. It is desirable that the light shielding is carried out by sealing the solar cell portion with a colored resin or a black resin. Further, it is also effective to design a housing so as to shade them from a backlight portion or surrounding light.

The liquid crystal layer of the liquid crystal display of this embodiment is characterized in that it is of the vertical alignment type and is subjected to the macromolecule fixation processing. The alignment orientation of the liquid crystal is determined even at the time of no voltage application by the macromolecular fixation processing, and the liquid crystal molecules have pretilt angles with respect to the substrate surface. Such a liquid crystal display panel has a very high contrast ratio and a high speed response characteristic, and can provide a display of high performance. By adopting a multi-domain in which the directions of liquid crystal alignment molecules by the voltage application are two or more directions, a wide visual angle property can also be obtained.

The plural solar cells 74 and 75 are formed in the mother glass 86, and they can respectively output independent voltages. That is, various solar cells can be formed on the mother glass 86 according to the objects, for example, the solar cell 74 for gate voltage supplies voltage to the gate bus line at polymerization, the solar cell 75 for drain voltage supplies voltage to the drain bus line, a solar cell is for a storage capacitance bus line, and so on.

For example, the solar cell 75 may apply voltages suitable for respective pixel electrodes of R (Red), G (Green) and B (Blue) of the liquid crystal display panel. In the case where the optical characteristics of the liquid crystal display panel are controlled, when the liquid crystal alignment is controlled for each of R, G and B regions, the optical characteristics can be excellent, and at that time, it is advantageous to be capable of controlling the tilt direction between the substrate surface and the liquid crystal molecule. It is well known that a pretilt with a slight inclination of several degrees, such as a pretilt angle of about 87 degrees or 88 degrees, exhibits a higher speed response property than a tilt angle of 90 degrees as a complete vertical alignment.

Light is irradiated to perform polymerization, and a construction may be adopted such that the solar cells 74 and 75 are operated by the irradiation light at that time. That is, alignment orienting of the liquid crystal and the polymerization for recording the orienting are carried out at the same time by simultaneous exposure. When this method is adopted, a very simple polymerization process can be realized.

It is not always necessary that the light irradiation is performed simultaneously, and if a process as set forth below can be adopted, its effect becomes great. The polymerization is performed by a photoreaction of photo-curing macromolecules existing in the liquid crystal layer, and the wavelength necessary at this time is in a region of ultraviolet light. On the other hand, it is known that the solar cells 74 and 75 are operated by visible light or the like, and light used for the polymerization is not always needed. Thus, it is possible to irradiate plural light beams of second and third beams, different from the light for polymerization, to the solar cells 74 and 75, the intensities of the light beams can also be made different from each other, and an output voltage corresponding to the light irradiation can be obtained. At this time, it is also effective to apply a necessary hot wind or heat wind to the solar cells 74 and 75. By doing so, a voltage suitable for the orienting of the liquid crystal can be applied to the liquid crystal display panel, and it becomes possible to realize a multi-tilt. Of course, it is needless to say that the irradiation light used for the polymerization includes a visible light component.

The liquid crystal display panel in this embodiment is convenient also for the case where it is fabricated by a dropping injection method. A construction can be adopted such that light is irradiated to a main seal coated on the periphery of the substrate, and the solar cells 74 and 75 are operated when a pair of panels are bonded and are fixed.

Besides, a feature is such that from at least one of the liquid crystal display panels, differently from the light for operating the solar cells 74 and 75, light is irradiated so that an active element in the pixel shows photoconductivity. Since the active element of the pixel portion produces the photoconductivity, it becomes possible to reduce or cancel the applied voltage to the gate side terminal from the solar cells 74 and 75, and simplification can be made in the case where the solar cells 74 and 75 are formed in the substrate surface. It is preferable that light for giving the photoconductivity is irradiated from the side of the opposite substrate at the side opposite to the substrate including the active element and from an oblique direction of the liquid crystal display panel, and it is appropriate that the light goes round a light shielding material such as a black matrix (BM).

Eighth Embodiment

Next, a liquid crystal display according to an eighth embodiment of the present invention and a method of manufacturing the same will be described with reference to FIGS. 70A to 75. This embodiment relates to a method for regulating the alignment of liquid crystal of a VA mode LCD. A conventional TFT liquid crystal display using a TN mode has a problem that a contrast is lowered when viewed in an oblique direction, or light and darkness of a display is inverted.

In the VA mode liquid crystal display in which liquid crystal molecules are aligned in the vertical direction with respect to the alignment film surface (substrate surface) in the state of no voltage application, a contrast higher than that of the TN mode can be obtained. In the case where the VA mode is used, it is generally necessary to give a pretilt angle to the liquid crystal molecule. The pretilt angle is about 1° to 5° when measured from a normal of a substrate surface.

In the case where the liquid crystal panel is actually constructed, a cell is constructed by bonding two substrates on which the alignment films are formed, and the directions of the pretilt angles given to the alignment films of the two substrates are made opposite to each other. This alignment method is called a homeotropic alignment. When a liquid crystal having a negative dielectric anisotropy is injected into the cell and a voltage is applied from electrodes provided on the two substrates, the liquid crystal molecules are tilted in one direction in which the pretilt angle is given. By this, a white display is realized from a black display.

As a method of giving the pretilt angle to the alignment film, methods as described below are generally adopted. One is a rubbing method in which a rotating rubbing cloth is brought into contact with the surface of the alignment film to rub it, and the other is an optical alignment method in which ultraviolet rays are irradiated to the surface of the alignment film in an oblique direction.

As a method of widening an angle of view without producing inversion of an image, there is an alignment division method in which a plurality of alignment directions of liquid crystal molecules are provided in one pixel. In this method, alignment regulating forces of the plural directions must be given onto the alignment film in the minute pixel. In this case, since the rubbing method is not suitable for the alignment division, it is suitable to use a method of optical alignment or the like.

Besides, as a method of strengthening the alignment regulating force of a tilt vertical alignment, there is a polymer fixation method. This is a method in which polymerizable monomers are mixed and are polymerized in a liquid crystal layer, and the alignment regulating force is intensified by polymers formed by the polymerization of the monomers, and there are merits that the response time can be made short and high resistance is obtained against an alignment disturbance due to an external electric field or the like.

A problem of a case where alignment regulating force is increased by the polymer fixation method will be described with reference to FIGS. 70A and 70B. FIGS. 70A and 70B show a state in which two adjacent pixels 2 are viewed in the direction of a normal of a substrate surface. FIG. 70A shows the side of an array substrate in which TFTs 16 are formed. FIG. 70B shows a display state of the pixel 2 observed through a black matrix (BM) of a light shielding film provided on the side of an opposite substrate. As shown in FIG. 70A, an alignment regulating structural member such as a linear protrusion or a slit is not formed on a pixel electrode 3 in the pixel 2. Thus, when a predetermined voltage is applied to a gate bus line 4 and a drain bus line 6, liquid crystal molecules 24a at the end portion of the pixel electrode 3 as indicated an arrow 92 in the drawing are tilted toward the inside of the pixel electrode 3 in the directions perpendicular to the extension directions of the respective bus lines 4 and 6 by horizontal electric fields generated between the end portion of the pixel electrode 3 and the respective bus lines 4 and 6.

Even if an initial pretilt angle of a liquid crystal molecule is given in the direction of an arrow 94 in the drawing by the optical alignment method, since anchoring energy is low in the optical alignment method, the liquid crystal molecule falls down in a direction different from a direction of a given pretilt, for example, a direction different by 90° by the influence of the horizontal electric field between the end portion of the pixel electrode 3 and the drain bus line. Thus, when a white display is caused, as shown in FIG. 70B, dark portions X1 are generated in regions between the pixel electrodes 3 and the drain bus lines 6.

In the case where ultraviolet rays are irradiated to polymerize monomers, the alignment direction memorized in polymers after completion depends on the alignment direction of the liquid crystal molecules at the time of polymerization. If ultraviolet rays are irradiated to the liquid crystal layer in this state to perform polymerization and the alignment direction of the liquid crystal molecules is fixed, the dark portions X1 are also memorized and the polymerization is performed.

Then, in this embodiment, when ultraviolet rays are irradiated to the liquid crystal layer to polymerize the monomers, a voltage pattern set forth below is applied to the side of the array substrate on which the TFTs 16 are formed, so that the polymer for regulating an excellent pretilt angle and/or alignment direction is realized without memorizing the dark portions X1.

(1) A gate voltage Vg (on)=c at which the TFT 16 becomes in an on state is applied to the gate bus line 4 as a gate pulse of a specified frequency. At a time other than the time of application of the gate pulse, a gate voltage Vg (off) at which the TFT 16 becomes in an off state is applied.

(2) At the timing when the gate voltage Vg (on) is applied to the gate bus line 4, a drain voltage Vd (on)=a is applied to the drain bus line 6, and in the other case, a drain voltage Vd (off)=b is applied. Here, $|a|<|b|$.

(3) A direct-current voltage of a common voltage Vc=a/2 is applied to the side of the common electrode. Incidentally, the pulse width of each of the gate voltage Vg (on), the drain voltage Vd (on) and the drain voltage Vd (off) is shorter than the pulse width of a writing voltage Vp written to the pixel, and for example, it is $1/100$ or less of the pulse width of the writing voltage Vp.

In the case where a voltage is applied under the above conditions (1) to (3), the writing voltage Vp written to the pixel electrode 3 is the drain voltage Vd (on) at the time when the TFT 16 is in the on state. Accordingly, the writing voltage is Vp=a, and this voltage is held even if the TFT 16 is in the off state. The drain voltage Vd (off) applied to the drain bus line 6 while the writing voltage Vp is held is the pulse repeated at a predetermined frequency and having the maximum amplitude of b V. A time in which the TFT 16 is in the on state is very short, and a time in which the TFT 16 is in the off state other than that occupies the most part, and further, since the drain voltage Vd (off) applied to the drain bus line 6 is higher than the writing voltage Vp applied to the pixel electrode 3, the influence of horizontal electric field generated at the end portion of the pixel electrode 3 can be made small. By this, the width of the dark portion X1 generated at the end portion of the pixel electrode 3 and memorized at the polymerization can be made small.

Hereinafter, the liquid crystal display according to this embodiment and the method of manufacturing the same will be specifically described using examples.

EXAMPLE 8-1

Figure 71:
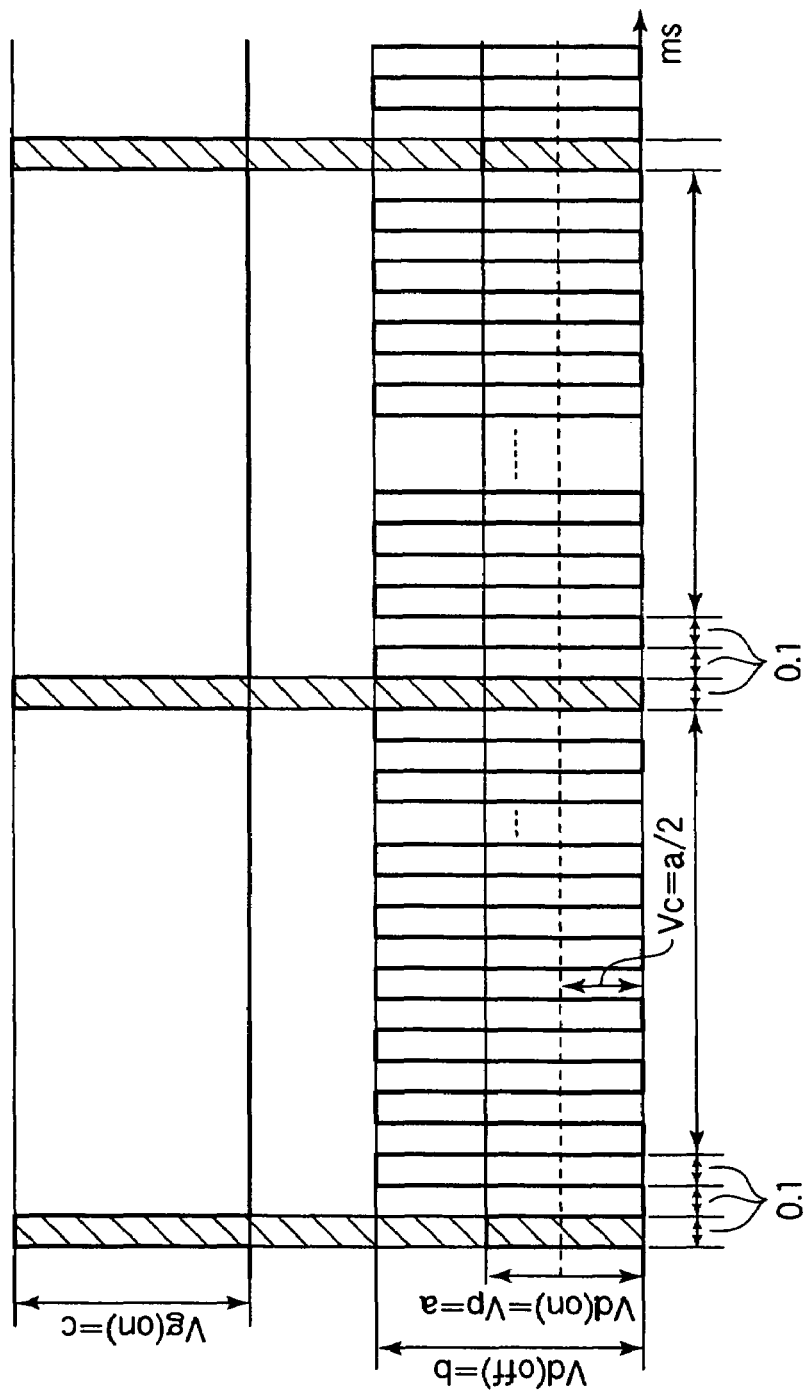
FIG. 71 is a view showing a driving waveform of a liquid crystal display of example 8-1 according to an eighth embodiment of the present invention.

FIG. 71 shows a driving wave form of a liquid crystal display according to this example. A pixel pitch (in the longitudinal direction of a pixel) in the extension direction of a drain bus line 6 having a width of 5 μm is 200 μm. On the other hand, a pixel pitch in the extension direction of a gate bus line 4 having a width of 5 μm is 70 μm. The end portion of a pixel electrode 3 is located at a position 3 μm away from the end portion of the drain bus line 6 or the end portion of the gate bus line 4. The pixel electrode 3 is made of ITO (Indium Tin Oxide) and is connected to a source electrode of a TFT.

A black matrix (BM) having a width of 11 μm is provided on the side of an opposite substrate at a pitch of 200 μm in a vertical direction and 70 μm in a horizontal direction. On the BM, a common electrode made of ITO is provided on almost the whole surface of the substrate. Alignment films are formed on the array substrate and the opposite substrate. This alignment film has a vertical alignment property, and a tilt vertical alignment property is given by rubbing the surface of the alignment film.

The array substrate and the opposite substrate are bonded to each other so that a liquid crystal panel is fabricated. A liquid crystal mixed with monomers for polymer fixation is injected into this liquid crystal panel and is sealed.

Under the following procedures, voltage is applied to the liquid crystal panel in which the liquid crystal has been injected.

(1) A gate voltage Vg (on) of a frequency of 60 Hz is applied to the gate bus line 4 as a pulse so that the TFT 16 becomes in the on state. The gate voltage is Vg (on)=c=18 V. An application time of the gate voltage Vg (on) is 0.1 ms, and only one pulse is applied in one frame. A frame frequency is made 16.7 ms, and the gate voltage is made Vg (off)=−5V in 16.7−0.1=16.6 ms. Incidentally, setting is made such that the gate voltages Vg (on) and (off) are applied to all the gate bus lines 4 at the same time.

(2) A drain voltage Vd (on)=±5 V is applied to the drain bus line 6 at the timing when the gate voltage Vg (on)=18 V is applied to the gate bus line 4, and at timing other than that, a drain voltage Vd (off)=±8 V is applied.

A time in which the drain voltage Vd (on) is applied to the drain bus line 6 is made equal to or rather longer than the time in which the gate voltage Vg (on) at which the TFT 16 becomes in the on state is applied. In this example, the drain voltage Vd (on) has a pulse width of at least 0.1 ms.

(3) A direct-current voltage corresponding to the center of the amplitude of the drain voltage Vd (on) is applied to the common voltage Vc. In this example, the common voltage Vc=0 V.

An applied waveform becomes a waveform as shown in FIG. 71. A writing voltage Vp=±5 V is applied to the pixel electrode 3 at a frequency of 30 Hz and is held until a next writing voltage is applied. On the other hand, at a time other than the time in which the TFT 16 is in the on state, the drain voltage Vd (off)=±8 V is applied to the drain bus line 6.

By this, it is possible to form such a situation that the voltage applied to the drain bus line 6 is always higher than the voltage applied to the pixel electrode 3. In the state where the voltages are applied to the respective electrodes under the above voltage application conditions, ultraviolet rays are irradiated to the liquid crystal layer to polymerize the photo-polymerizable component in the liquid crystal. After the photo-polymerizable component is polymerized, the pretilt angle of the liquid crystal molecule in the liquid crystal layer and/or the alignment direction is regulated even at the time of no voltage application. Thus, the dark portion X1 is not extended even by the driving voltage at an image display, and the MVA-LCD having high luminance can be realized.

FIGS. 72A and 72B show a state in which two adjacent pixels 2 according to this example are viewed in the direction of a normal of a substrate surface. FIG. 72A shows the side of the array substrate on which the TFT 16 according to this example is formed. FIG. 72B shows a display state of the pixel 2 observed through the black matrix (BM) of a light shielding film provided on the side of the opposite substrate. As shown in FIG. 72A, the predetermined voltages are applied to the gate bus line 4 and the drain bus line 6 and even if the horizontal electric fields are generated between the end portion of the pixel electrode 3 and the respective bus lines 4 and 6, the liquid crystal molecules 24a at the end portion of the pixel electrode 3 do not tilt in the direction perpendicular to the extension directions of the respective bus lines 4 and 6 by alignment regulation of polymers. Thus, as shown in FIG. 72B, the width of the dark portion X1 generated at the end portion of the pixel electrode 3 along the drain bus line 6 can be reduced.

EXAMPLE 8-2

Figure 73:
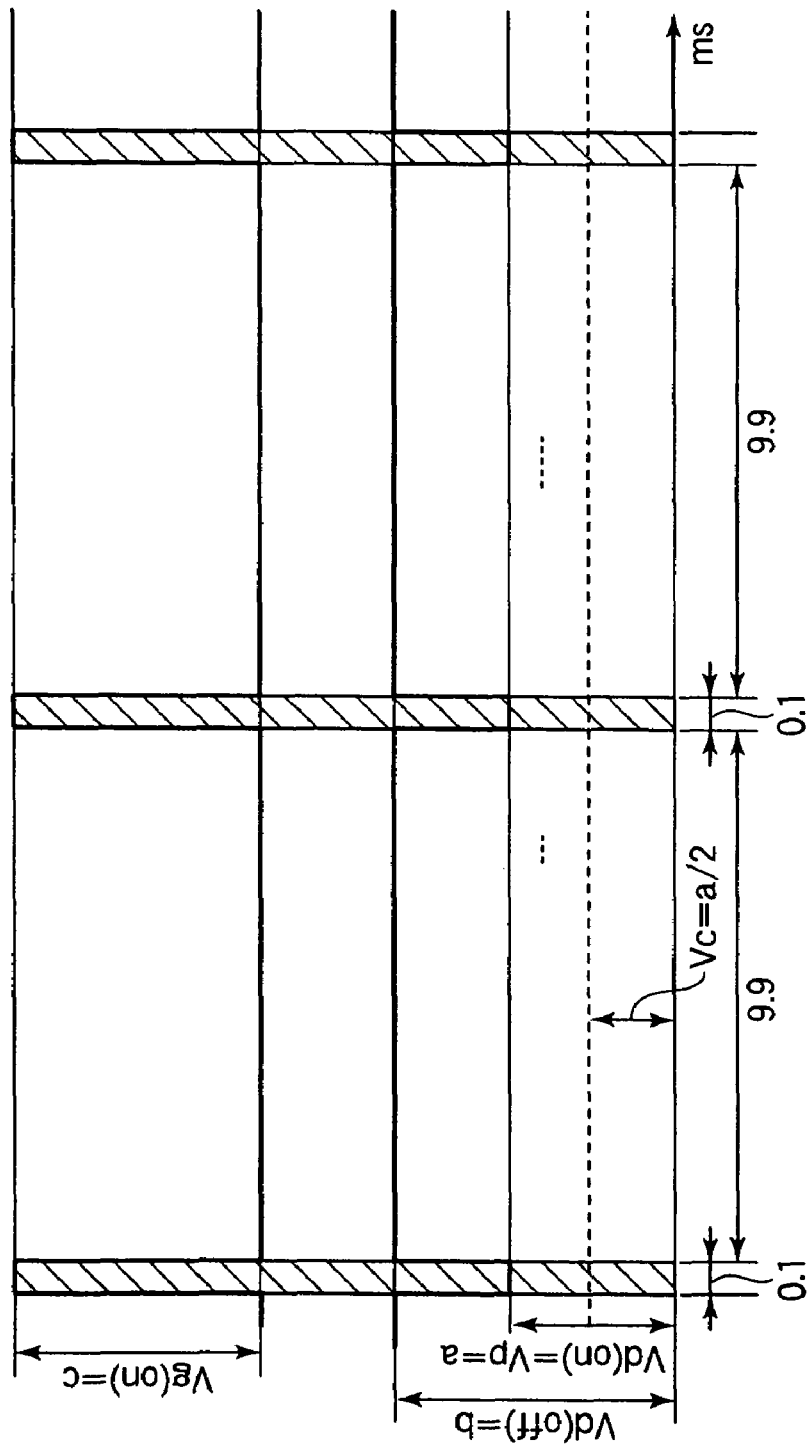
FIG. 73 is a view showing a driving waveform of a liquid crystal display of example 8-2 according to the eighth embodiment of the present invention.

This example will be described with reference to FIG. 73. This example is characterized in that a drain voltage Vd (off) applied to the drain bus line 6 is made a direct-current voltage instead of an alternating rectangular voltage as in the example 8-1. As shown in FIG. 73, a pulse voltage of a drain voltage Vd (on)=+5 V is applied at the timing of a gate voltage Vg (on) at which the TFT 16 is in the on state, and at timing other than that, the drain voltage Vd (off)=+8 V is applied.

Ultraviolet rays are irradiated to the liquid crystal layer under the conditions while the voltage is applied, so that the photo-polymerizable component in the liquid crystal is polymerized. Also by this example, since the photo-polymerizable component in the liquid crystal can be polymerized in the state where the dark portion X1 at the end portion of the pixel electrode 3 along the drain bus line 6 is made small, it becomes possible to fabricate the liquid crystal panel having high luminance in which the dark portion X1 is not generated even at the time of driving in a normal display mode.

COMPARATIVE EXAMPLE 8-1

Figure 74:
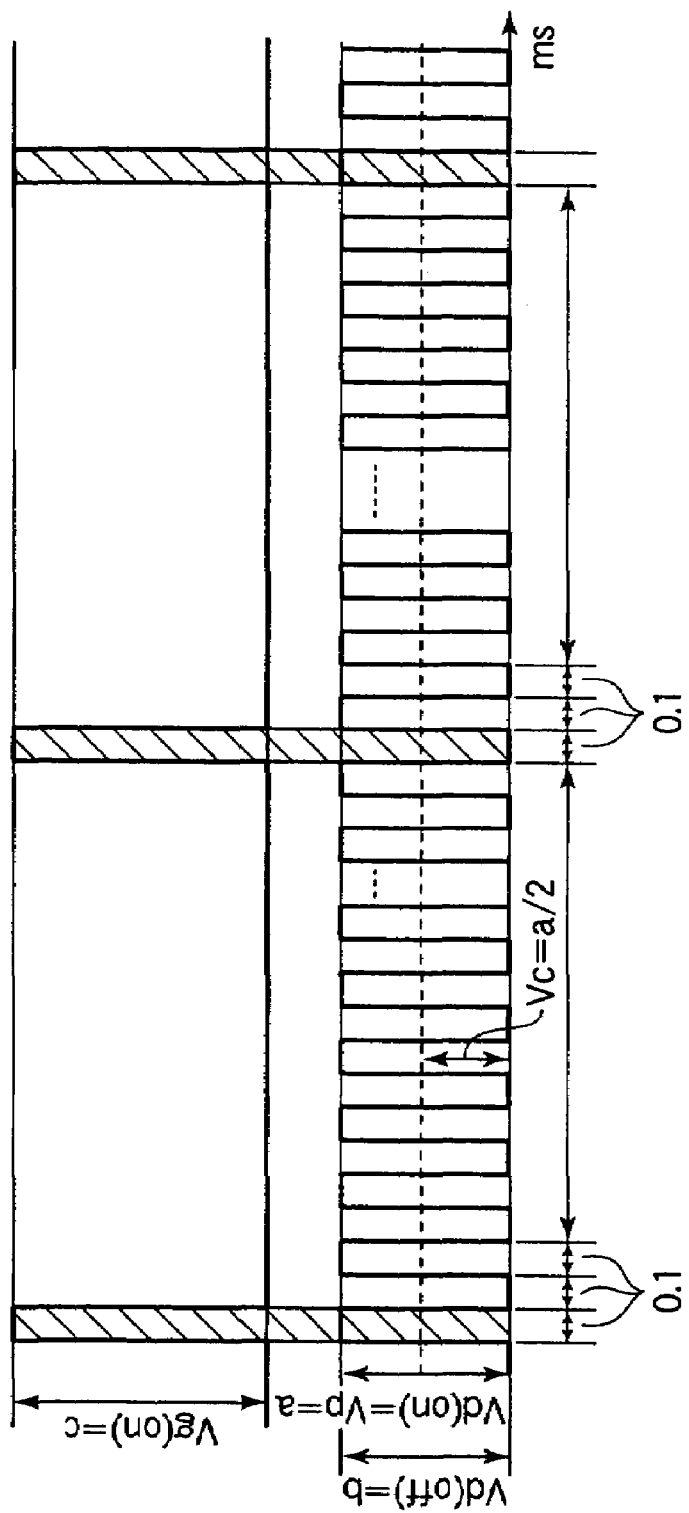
FIG. 74 is a view showing a driving waveform of a conventional liquid crystal display as a comparative example.

FIG. 74 shows a conventional voltage driving waveform as a comparative example. As shown in FIG. 74, since the relation of voltages is conventionally drain voltage Vd (on)=drain voltage Vd (off)=writing voltage Vp, the dark portion X1 is generated by the influence of the horizontal electric field generated between the drain bus line 6 and the end portion of the pixel electrode 3.

Figure 75:
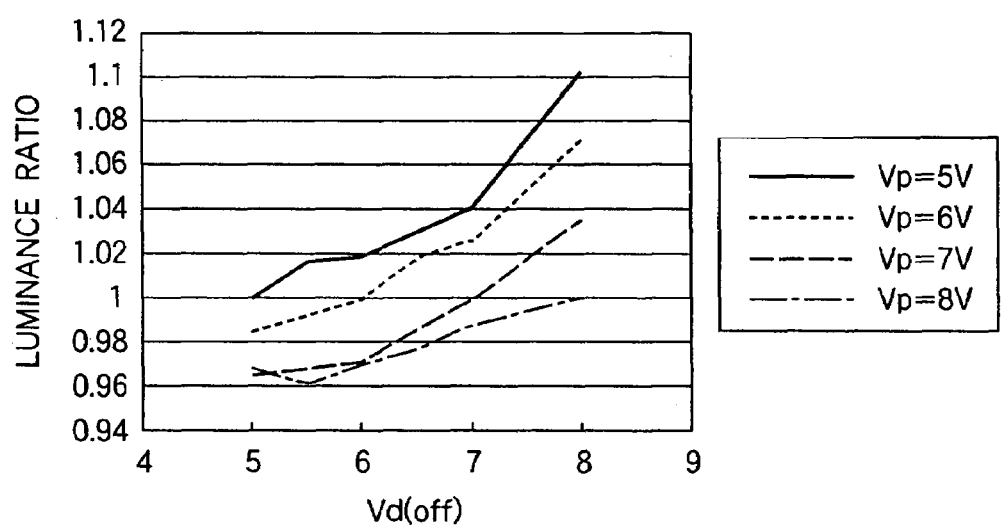
FIG. 75 is a view for explaining an effect of the eighth embodiment of the present invention.

FIG. 75 is a graph in which the drain voltage Vd (off) is taken for the horizontal axis, and the luminance ratio is taken for the vertical axis. Here, the luminance ratio is made 1 in the case where the drain voltage Vd (off) and the writing voltage Vp have the same potential.

As is apparent from FIG. 75, when the drain voltage is Vd (off)=±8 V and the writing voltage Vp=±5 V of the above example, the luminance ratio exceeding 1.1 is obtained, and the dark portion X1 is sufficiently decreased.

Besides, it is understood that when the gate voltage Vd (on)=writing voltage Vp is 5 V or higher, a remarkable effect is obtained. Besides, when the intensity of the voltage of the writing voltage Vp and the drain voltage Vd (off) is 2 V or higher, a remarkable effect is obtained.

Ninth Embodiment

Next, a liquid crystal display according to a ninth embodiment of the present invention and a method of manufacturing the same will be described with reference to FIGS. 76 to 83. This embodiment relates to the liquid crystal display in which a liquid crystal composite containing a photo-polymerizable component is sandwiched between substrates, the photo-polymerizable component is photo-polymerized while a voltage is applied to the liquid crystal composite, and the liquid crystal alignment is fixed by this.

In a conventional liquid crystal display device, a TN mode in which liquid crystals of horizontal alignment are twisted between upper and lower substrates is the main current, however, since the tilt angle of the liquid crystal is different according to an observation orientation, that is, an angle of view, gradation inversion occurs at a specific angle of view and at a halftone. Then, a technique called an MVA mode is realized in which liquid crystal of vertical alignment is tilted in symmetrical orientations to perform compensation of a visual angle. In the MVA mode, by forming an alignment regulating structural member made of dielectric or insulator on an electrode, an oblique electric field is formed in the liquid crystal layer at the time of voltage application, and the liquid crystal is tilted in the predetermined tilt orientation by this oblique electric field.

However, since the voltage applied to the liquid crystal on the alignment regulating structural member is attenuated or becomes zero, the transmissivity per pixel becomes low. In order to ensure the transmissivity, an occupied ratio of the alignment regulating structural member has only to be made low, and for example, a gap between adjacent alignment regulating structural members has only to be made wide. However, if the gap between the alignment regulating structural members is made wide, there arises a problem that it takes a time to tilt the liquid crystal at the center portion of the gap, and a response time when a halftone is display becomes long.

Then, a liquid crystal alignment fixation technique has been proposed in which a liquid crystal composite containing a photo-polymerizable component is sandwiched between substrates, the photo-polymerizable component is photo-polymerized to form a cross-linking structure corresponding to the alignment of liquid crystal while a voltage is applied, and the liquid crystal alignment is fixed. By this, the response time can be shortened while the transmissivity is ensured.

Figure 76:
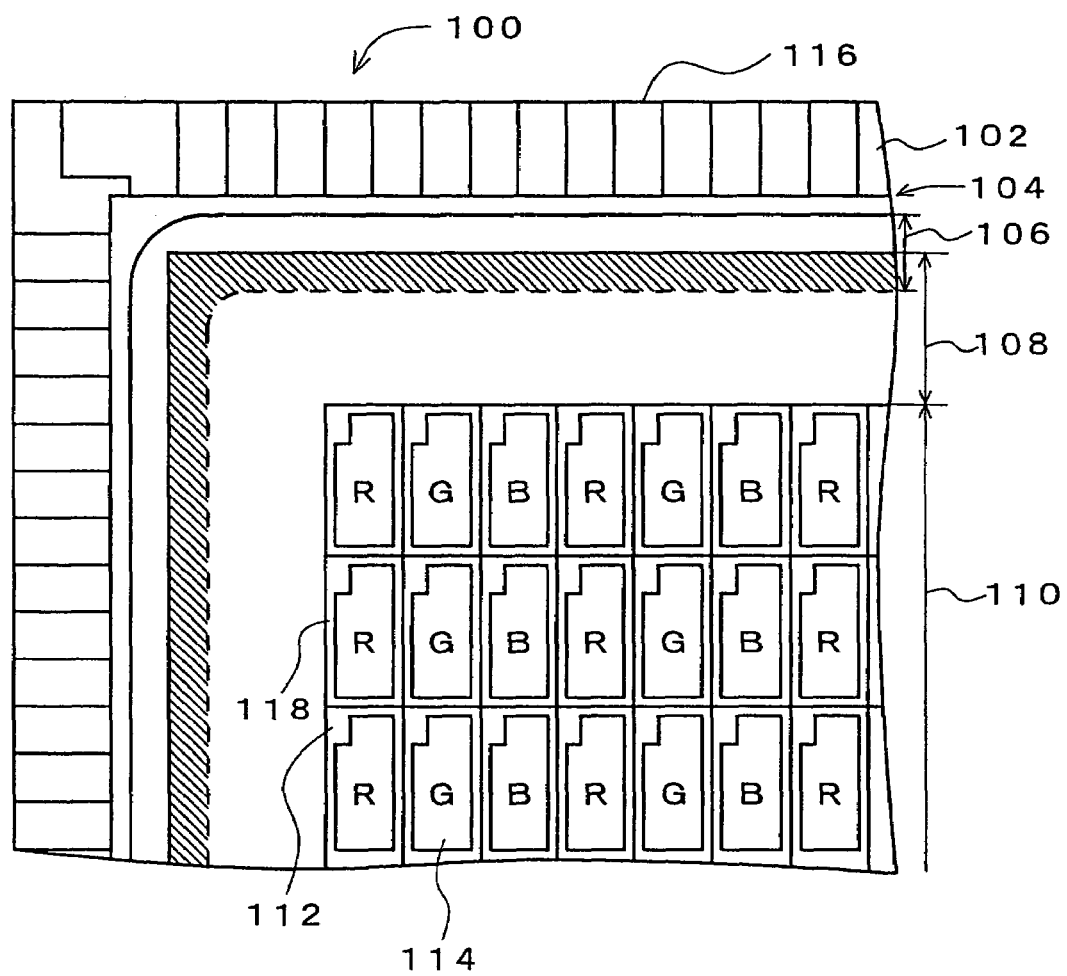
FIG. 76 is a view showing a schematic construction of a liquid crystal display using an alignment fixing technique.

FIG. 76 shows a schematic construction of a liquid crystal display using the above alignment fixation technique. FIG. 76 shows a part of an upper surface of an active matrix type liquid crystal display panel using TFTs as switching elements, viewed from the side of a color filter substrate. As shown in FIG. 76, in a liquid crystal panel 100, a plurality of pixel regions 114 arranged in a matrix form are formed on the side of an array substrate 116, and a TFT 112 is formed in each of pixel regions 114. A display region 110 of an image is constituted by the plurality of pixel regions 114. Incidentally, although detailed illustration is omitted, a gate electrode of the TFT 112 of each of the pixel regions 114 is connected to a gate bus line, and a drain electrode is connected to a drain bus line (data line). A source electrode of the TFT 112 is connected to a pixel electrode formed in the pixel region 114. The plurality of drain bus lines and gate bus lines are connected to a terminal portion 102 formed at the outer periphery of the array substrate 116 and are connected to a driving circuit (not shown) provided at the outside.

A color filter (CF) substrate 104 formed to be smaller than the array substrate 116 by a rough size of a region of the terminal portion 102 seals liquid crystal to have a predetermined cell thickness (cell gap) and is provided opposite to the array substrate 116. Together with a common electrode (common electrode; not shown), color filters (indicated by characters of R (Red), G (Green), and B (Blue) in the drawing), BM (black Matrix; light shielding film) 108 and 118 using Cr (chromium film) films etc., and the like are formed on the CF substrate 104. The BM 118 is used for attaining a contrast by defining the plurality of pixel regions 114 in the display region 110 and for preventing the generation of photoelectric leak current by shading the TFTs 112. Besides, the BM frame portion 108 is provided to shade the unnecessary light from the outside of the display region 110. The array substrate 116 and the CF substrate 104 are bonded to each other through a main seal (sealing agent) 106 made of photo-curing resin.

Incidentally, a manufacturing process of a liquid crystal display roughly includes an array process for forming a wiring pattern, switching elements (in the case of an active matrix type), and the like on a glass substrate, a cell process for an alignment processing, an arrangement of a spacer, and sealing of liquid crystal between opposite glass substrates, and a module process for attachment of a driver IC, mounting of a backlight, and the like. Among them, in the liquid crystal injection process performed in the cell process, for example, a dip injection method is used in which after the array substrate 116 including the TFTs 112, and the color filter substrate 104 opposite to that are bonded to each other through the main seal 106, liquid crystal and the substrates are put in a vacuum vessel, and an injection port (not shown) formed in the main seal 106 is immersed in the liquid crystal, and then, the inside pressure of the vessel is returned to the atmospheric pressure to thereby seal the liquid crystal between the substrates.

On the other hand, in recent years, attention has been paid to a dropping injection method in which for example, a prescribed amount of liquid crystal is dropped onto a substrate surface in a frame of the main seal 106 formed into a frame shape around the array substrate 116, and the array substrate 116 and the CF substrate 104 are bonded to each other in vacuum to seal the liquid crystal. According to the dropping injection method, since the display panel 100 of the liquid crystal display can be manufactured easily and at low cost, various technical investigations and improvements have been carried out.

In the liquid crystal display using such a liquid crystal alignment fixation technique, there is a problem concerning unevenness of display in the vicinity of the injection port formed in the main seal 106 in the case of using the dip injection method. Also in the case where a similar liquid crystal display is manufactured using the dropping injection method, unevenness of display occurs in the vicinity of the main seal 106.

Figure 77:
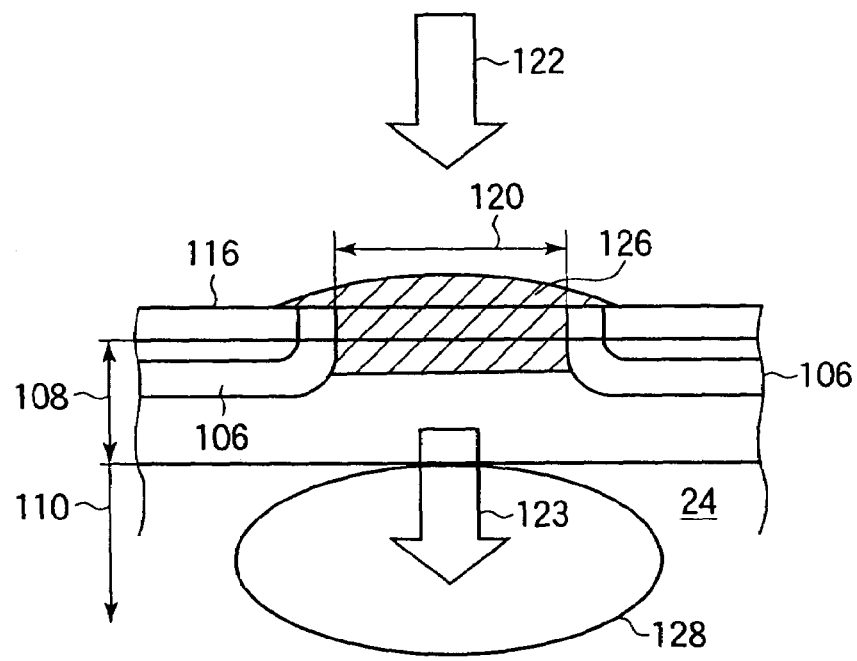
FIG. 77 is a view for explaining a problem in a case where a sealing agent made of a photo-curing resin is used for a liquid crystal injection port, which is used in a conventional dip injection method.

FIG. 77 is a view for explaining a problem in the case where a sealing agent made of photo-curing resin is used for a liquid crystal injection portion, which is used in the conventional dip injection method. As shown in FIG. 77, when a light 122 having a wavelength range from an ultraviolet range to a visible light range is irradiated to a sealing agent 126 of an injection port 120, a light 123 transmitted through the sealing agent 126 enters a liquid crystal layer 24. Photo-polymerizable components dispersed in the liquid crystal layer 24 are photo-polymerized by the light 123 transmitted through the sealing agent 126 and an uneven display region 128 is produced near the injection port 120.

Figure 78:
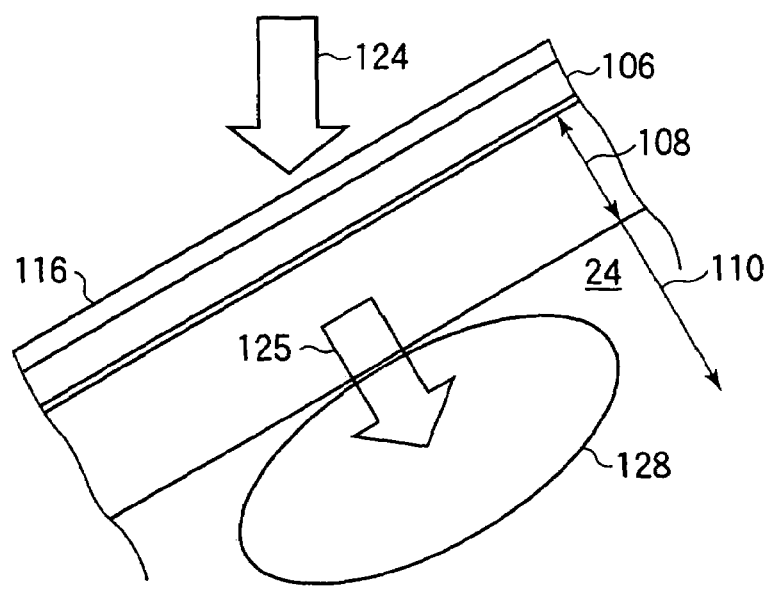
FIG. 78 is a view for explaining a problem in a case of using a main seal made of a photo-curing resin used in a conventional dropping injection method.

FIG. 78 is a view for explaining a problem in the case where a main seal made of photo-curing resin used in the conventional dropping injection method is used. Even if a light 124 having a wavelength range from an ultraviolet ray range to visible light range is incident from the direction of a normal of a substrate surface, a partial light 125 is reflected by an array substrate 116 and enters a display region 110 to photo-polymerize photo-polymerizable components in the vicinity of the main seal 106, and an uneven display region 128 is produced.

As shown in FIGS. 77 and 78, the light irradiated to the sealing agent 126 for sealing the injection port 120 or to the main seal 106 enters the display region 110, so that the photo-polymerizable components are photo-polymerized before voltage application.

That is, although the photo-polymerizable components dispersed in the liquid crystal layer 24 form a cross-linking structure corresponding to the liquid crystal alignment by photopolymerization, since the photo-polymerizable components in the vicinity of the injection port 120 or in the vicinity of the main seal 106 form a cross-linking structure in the vertical direction, even if a voltage is applied, the liquid crystal molecules become hard to incline. There is no problem if the sealing agent 126 or the main seal 106 can be photo-cured in the state where the voltage is applied to the liquid crystal layer 24, however, since a manufacturing apparatus and a manufacturing process become complicated, it is not realistic.

In order to solve this, in this embodiment, the above problem is solved by means described below.

(1) A resin which can be photo-cured by a light in a range other than the photopolymerization wavelength range of the photo-polymerizable component is used for the sealing agent 126 or the main seal 106. If the sealing agent 126 or the main seal 106 can be cured by the light in the range other than the wavelength range in which the photo-polymerizable component is photo-polymerized, the above disadvantage does not occur.

Japanese Patent Unexamined Publication No. Hei. 11-2825 discloses such a manufacturing method that a sealing agent is irradiated with light in which a specified wavelength exerting a bad influence on liquid crystal is removed. However, this embodiment has an object not to photo-polymerize the photo-polymerizable components dispersed in the liquid crystal at the process for curing the sealing agent 126 or the main seal 106, and is different from the well-known technique in that if the specified wavelength exerting a bad influence on the liquid crystal is such a wavelength that the photo-polymerizable components dispersed in the liquid crystal are not photo-polymerized, and the sealing agent 126 or the main seal 106 is photo-cured, the light of the specified wavelength is also irradiated.

(2) A resin which can be photo-cured by a light having an intensity peak in a range other than the photopolymerization wavelength range of the photo-polymerizable component is used for the sealing agent 126 or the main seal 106. Even in the resin partially requiring the light in the photopolymerization wavelength range of the photo-polymerizable component for photopolymerization, if the photo-curing wavelength range other than that is sufficiently wide, only the sealing agent 126 or the main seal 106 can be cured using the light having the intensity peak in the range other than the photopolymerization wavelength range of the photo-polymerizable component. That is, even if the photopolymerization wavelength range of the photo-polymerizable component is partially included in the irradiation light, if the accumulation amount of light in terms of the photopolymerization wavelength range of the photo-polymerizable component is lowered than the accumulation amount of light necessary for photopolymerization, the photo-polymerizable component is not photo-polymerized. Thus, it becomes possible to cure only the sealing agent 126 or the main seal 106 by the light having the intensity peak in the range other than the wavelength range in which the photo-polymerizable component is photo-polymerized.

(3) The photo-curing resin used for the sealing agent 126 or the main seal 106 is made to have a wavelength range of photo-curing longer than at least the photo-polymerizable component. The photo-curing wavelength range depends on the light absorption characteristics of a photoinitiator. Thus, if the absorption wavelength of the photoinitiator contained in the photo-curing resin is on the side of a longer wavelength than at least that of the photoinitiator contained in the photo-polymerizable component, the light on the side of the longer wavelength than the wavelength range in which the photo-polymerizable component is photo-polymerized is irradiated through a filter for blocking (cutting) a short wavelength side, and only the sealing agent or the main seal can be cured.

The reason why the long wavelength side, not the short wavelength side, is selected is that since many photoinitiators have light absorption ranges on the short wavelength side, if the short wavelength side is selected, it becomes difficult to distinguish between the photo-curing resin and the photo-polymerizable component, and if the light of the short wavelength side is irradiated, a bad influence on the liquid crystal becomes high.

(4) A light shielding structural member which hardly allows light to pass through is arranged in a region near the injection port and outside the display region. By this, even if light is irradiated to the injection port from the direction parallel to the substrate surface, the light entering the display region is blocked by the light shielding structural member, so that only the sealing agent can be cured irrespective of the wavelength range of irradiation or the used resin.

(5) A light attenuation structural member for attenuating light to a level not higher than a light amount at which the photo-polymerizable component is photo-polymerized is arranged in a region near the injection port and outside the display region. Even if the shielding structural member hardly transmitting light is not used, if the light attenuation structural member is used which attenuates light to the value not higher than the light amount in which the photo-polymerizable component is photo-polymerized, even if the light is irradiated to the injection port from the direction parallel to the substrate surface, the light entering the display region is attenuated by the light attenuation structural member to the value not higher than the light amount in which the photo-polymerizable component is polymerized. Thus, only the sealing agent can be cured irrespective of the wavelength range of irradiation or the used resin.

(6) The above light shielding structural member or the light attenuation structural member is made an aggregation made of plural structural members each having a plane shape of a line or an almost circular form, and the structural members are alternately formed so that the liquid crystal composite of the display region is not exposed when viewed in the direction parallel to the substrate surface. If the structural member is separately formed, it obstructs the injection of liquid crystal, however, by adopting the foregoing construction, the effect equivalent to the case where the structural member is separately formed can be expected while the flow path of the liquid crystal is ensured.

By using the foregoing construction, in the liquid crystal display in which the liquid crystal alignment is fixed by photo-polymerizing the photo-polymerizable components dispersed in the liquid crystal while the voltage is applied, the occurrence of the unevenness of display in the vicinity of the injection port or in the vicinity of the main seal is prevented, and the high display quality can be obtained.

Hereinafter, the liquid crystal display according to this embodiment and the method of manufacturing the same will be specifically described using examples and comparative examples.

EXAMPLE 9-1

Figure 79:
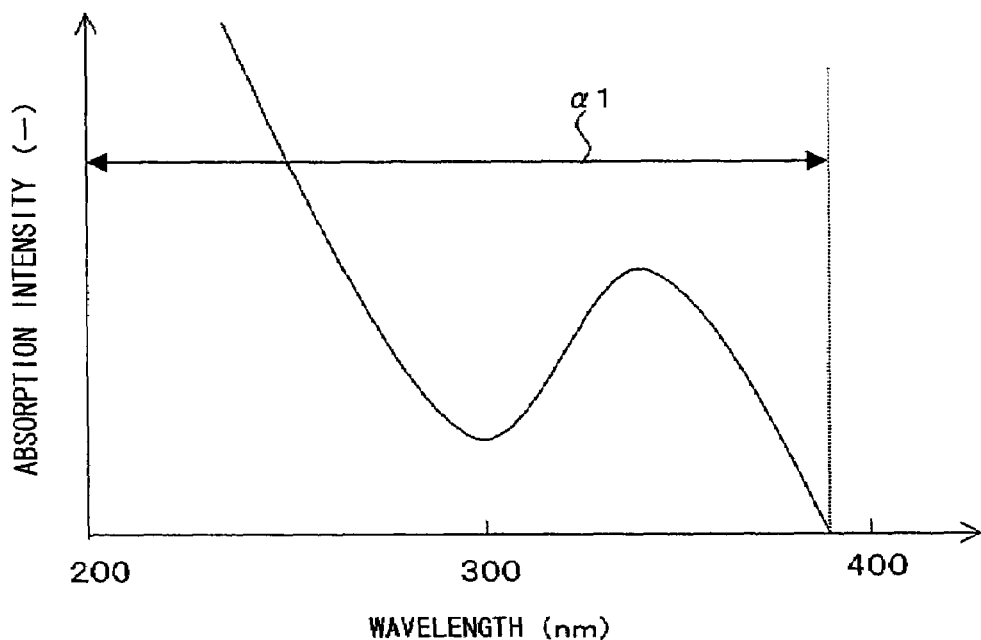
FIG. 79 is a view showing results of measurement of a light absorption spectrum of a liquid crystal composite in example 9-1 of a ninth embodiment of the present invention.

An acrylic photo-polymerizable component (made by Merck Japan Corporation) of 0.3 wt % exhibiting a nematic liquid crystal property was mixed into a negative liquid crystal (made by Merck Japan Corporation), so that a liquid crystal composite containing the photo-polymerizable component was obtained. When a light absorption spectrum of this liquid crystal composite was measured, it was found that as shown in FIG. 79, there was a wavelength range of approximately 200 to 380 nm (range indicated by a bilateral arrow α1 of FIG. 79) in which photopolymerization occurred. Incidentally, although the light absorption spectrum of the liquid crystal single body was also measured, absorption by the liquid crystal was roughly 300 nm or less, and it was understood that absorption at 300 nm or higher was caused by the photo-polymerizable component.

Figure 80:
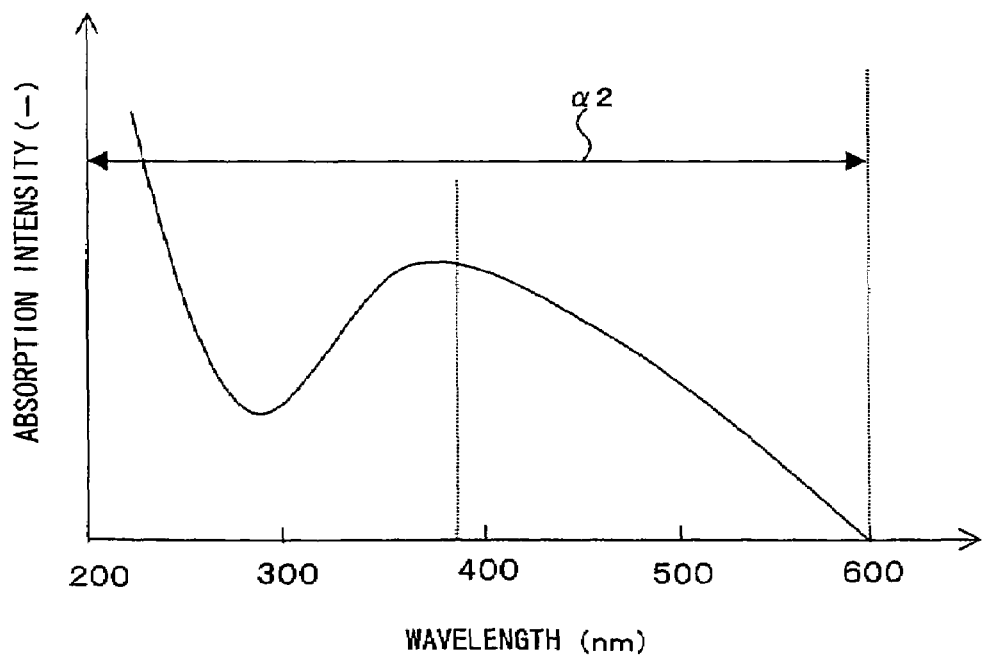
FIG. 80 is a view showing results of measurement of an absorption spectrum of a resin used for a sealing agent 126.
Figure 81:
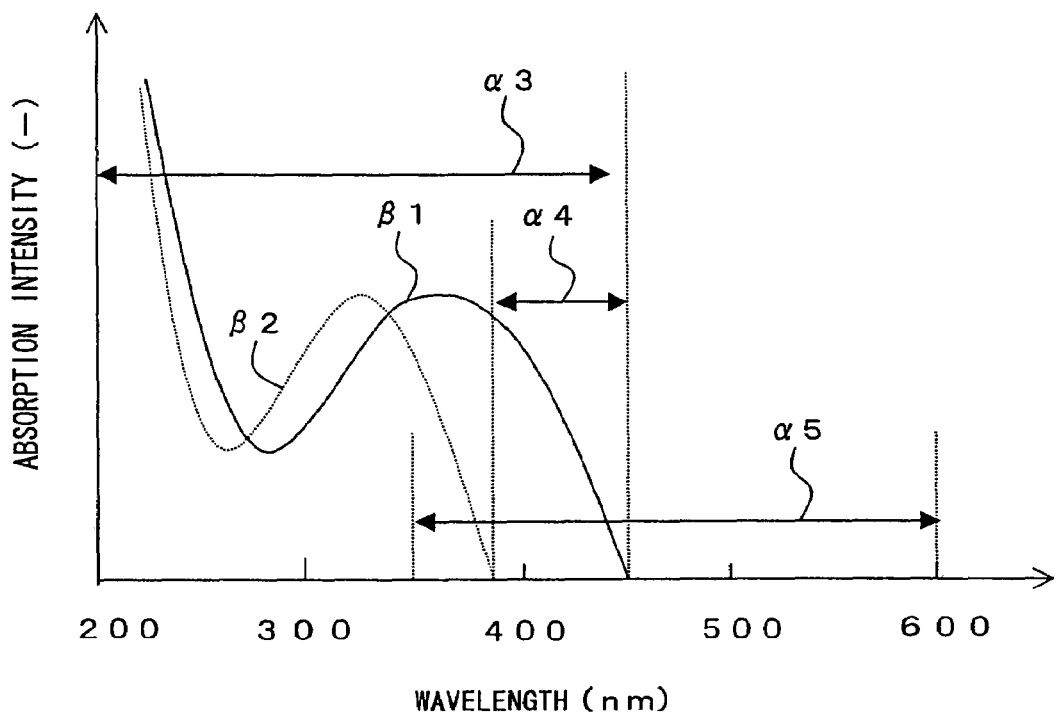
FIG. 81 is a view showing results of measurement of a light absorption spectrum of a sealing agent in example 9-3 of the ninth embodiment of the present invention.

Then, an acrylic resin (made by Toua Gosei Corporation) containing a photoinitiator activated by light of a wide wavelength range including a visible light range was selected as a resin having a photo-curing wavelength range at the side of a longer wavelength than at least 380 nm, and was used for the sealing agent 126. When the absorption spectrum of this resin was measured, as shown in FIG. 80, a wavelength range (range indicated by a bilateral arrows α2 of FIG. 80) existed in a range of approximately 200 to 600 nm, and since the wavelength range of 380 nm or longer was sufficiently wide, it was found that photo-curing can be made by the light of 380 nm or longer.

The liquid crystal composite was injected into an empty panel of the MVA mode, and pressure extrusion was performed to make the cell thickness uniform. Subsequently, the sealing agent 126 was coated on the injection port, and after the pressurization was removed, light of a wavelength range of 380 to 600 nm was irradiated from the direction parallel to the substrate and the sealing agent 126 was cured. Incidentally, the selection of the wavelength range was performed with a metal halide optical source and a filter (made by Asahi Bunko Corporation) for cutting a wavelength of 380 nm or less.

After the panel was formed, while a voltage not lower than the saturation voltage at which the tilt orientation of the liquid crystal was fixed was applied, ultraviolet rays were irradiated to the photo-polymerizable component from the direction of a normal of a substrate, and a cross-linking structure corresponding to the liquid crystal alignment was formed. The obtained liquid crystal display was set in a prober tester and a display test was performed.

EXAMPLE 9-2

A liquid crystal composite containing a photo-polymerizable component was obtained by a similar method to the example 9-1. As a resin including a photo-curing wavelength range at the side of a longer wavelength than at least 380 nm, one similar to the example 9-1 was used for a main seal.

A frame pattern (main seal 106) closed by a sealing agent was formed on a substrate on which an alignment regulating structural member for the MVA was formed, a necessary amount of liquid crystal was dropped by a dropping injection method, and bonding of substrates was performed under a reduced pressure. Subsequently, the substrates were exposed to the atmospheric pressure and the liquid crystal composite was diffused in the main seal 106, so that a predetermined cell gap was obtained. Then, the light of the wavelength range of 380 to 600 nm was irradiated through a color filter substrate in the direction of a normal of a substrate surface to cure the main seal 106. Incidentally, the selection of the wavelength range was performed with a metal halide light source and a filter (made by Asahi Bunko Corporation) for cutting the wavelength of 380 nm or less.

After the panel was formed, while a voltage not lower than the saturation voltage at which the tilt orientation of the liquid crystal was fixed was applied, ultraviolet rays were irradiated to the photo-polymerizable component in the direction of a normal of a substrate surface, and a cross-linking structure corresponding to the liquid crystal alignment was formed. The obtained liquid crystal display was set in a prober tester and a display test was carried out.

EXAMPLE 9-3

A liquid crystal composite containing a photo-polymerizable component was obtained by a similar method to the example 9-1. An acrylic resin (made by Three Bond Corporation) containing a photoinitiator activated by light of a wavelength range including a part of a visible light range was selected as a resin having a wavelength range of photopolymerization on the side of a longer wavelength than at least 380 nm, and was used for a sealing agent. When the absorption spectrum of this resin was measured, as shown by a curved line β1 of FIG. 81, a wavelength range (range indicated by a bilateral arrow α3 of FIG. 81) of photopolymerization existed at approximately 200 to 450 nm, and since the wavelength range of 380 nm or longer was not very wide (range indicated by a bilateral arrow α4 of FIG. 81), it was found that a part of light of a wavelength range not longer than 380 nm was also necessary. Incidentally, as indicated by a curved line β2, a general photo-curing resin has a wavelength range of photopolymerization from approximately 200 to 380 nm, and contains a photoinitiator activated by only light of an ultraviolet ray region.

The liquid crystal composite was injected into an empty panel of the MVA mode, and pressure extrusion was carried out to make the cell thickness uniform. Subsequently, a sealing agent was coated on an injection port, and after the pressurization was removed, light of a wavelength range (range indicated by a bilateral arrow α5 of FIG. 81) of 350 to 600 nm was irradiated from the direction parallel to the substrate and the sealing agent was cured. Since the photo-polymerizable components dispersed in the liquid crystal are photo-polymerized when an accumulation amount of light in the vicinity of the i line (330 to 380 nm) becomes 1000 mJ/cm$^2$ or higher, the amount of irradiation light was set such that the accumulation amount of light in the wavelength range of 350 to 380 nm became this value or less. The selection of the wavelength range was carried out with a high pressure mercury light source and a filter (made by Asahi Bunko Corporation) for cutting a wavelength of 350 nm or less. A wavelength at which the intensity has a peak becomes 436 nm from 365 nm by this filter, and the accumulation amount of light in the vicinity of the i line is attenuated to approximately ⅓. Although the amount of light by which the photo-curing resin is photo-cured is 2000 mJ/cm$^2$ in the accumulation amount of light of the wavelength range of 350 to 600 nm, since the accumulation amount of light in the vicinity of the i line becomes 1000 mJ/cm$^2$ or less by the filter, it has been found that only the sealing agent can be cured.

After the panel was formed, while a voltage not lower than the saturation voltage at which the tilt orientation of the liquid crystal was fixed was applied, ultraviolet rays were irradiated to the photo-polymerizable component from the direction of a normal of a substrate surface, and a cross-linking structure was formed. The obtained liquid crystal display was set in a prober tester and a display test was carried out.

EXAMPLE 9-4

Figure 82A:
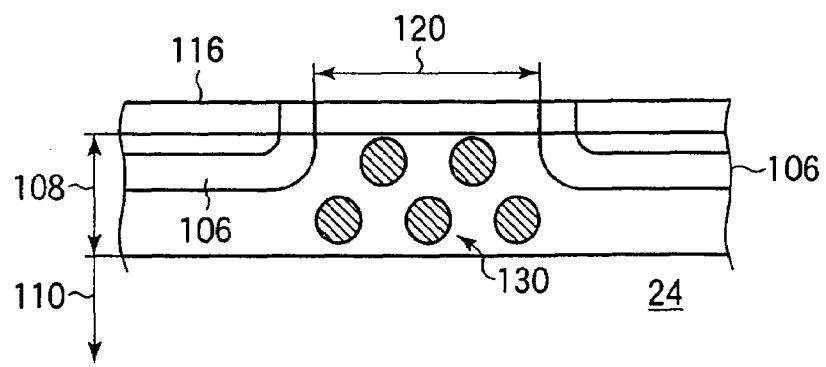
FIGS. 82A and 82B are views showing a light shielding structural member 130 in example 9-4 of the ninth embodiment of the present invention.
Figure 82B:
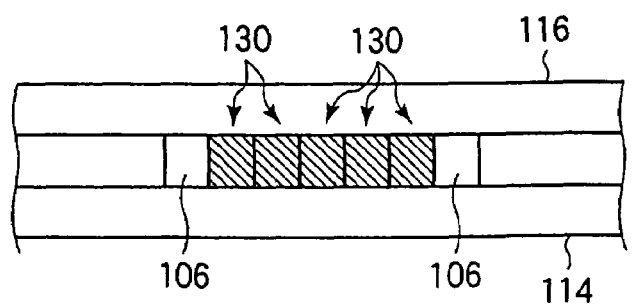

A liquid crystal composite containing a photo-polymerizable component was obtained by a similar method to the example 9-1. As a sealing agent, the foregoing general photo-curing resin (made by Three Bond Corporation) was used in which an accumulation amount of light necessary for curing was 2000 mJ in terms of the i line. In an empty panel of an MVA-LCD prior to sealing of liquid crystal, as shown in FIGS. 82A and 82B (FIG. 82A shows a state viewed in the direction of a normal of a substrate surface, and FIG. 82B shows a state viewed in the direction of the substrate surface), a light shielding structural member 130 which was almost opaque to light was formed in the vicinity of an injection port and a region outside a display region. The light shielding structural member 130 was made an aggregate constituted by plural structural members each having a plane shape of a substantially circular form, and they were alternately arranged so that the liquid crystal composite of a display region 110 was not exposed when viewed in the direction parallel to the substrate surface. The structural members were formed by dotting a seal agent (made by Kyoritsu Chemical Corporation) mixed with a black spacer (Sekisui Fine Chemical Corporation) by a seal dispenser.

The liquid crystal composite was injected into this empty panel, and pressure extrusion was carried out to make the cell gap uniform. Subsequently, the sealing agent was coated on the injection port, and after the pressurization was removed, light of a wavelength range of 200 to 600 nm was irradiated from the direction parallel to the substrate to cure the sealing agent. In this example 9-4, the light from a high pressure mercury light source was irradiated as it was.

After the panel was formed, while the voltage not lower than the saturation voltage at which the tilt orientation of liquid crystal was fixed was applied, ultraviolet rays were irradiated to the photo-polymerizable component in the direction of a normal of a substrate, and a cross-linking structure corresponding to the liquid crystal alignment was formed. The obtained liquid crystal display was set in a prober tester, and a display test was carried out.

EXAMPLE 9-5

Figure 83:
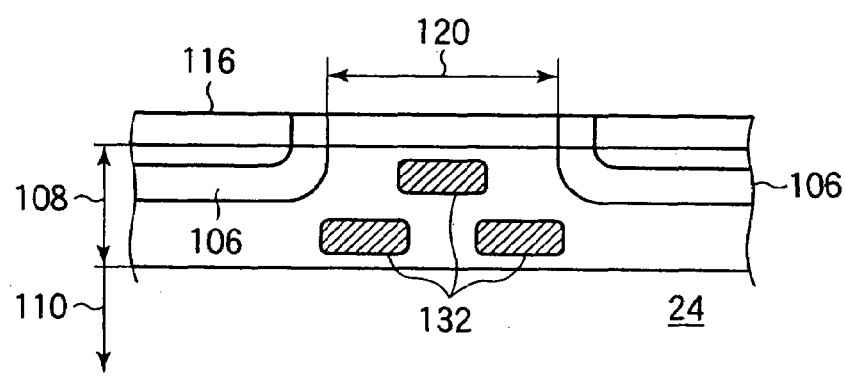
FIG. 83 is a view showing a light attenuation structural member 132 in example 9-5 of the ninth embodiment of the present invention.

A liquid crystal composite containing a photo-polymerizable component was obtained by a method similar to the example 9-1. The foregoing general photo-curing resin was used as a sealing agent. In an empty panel of the MVA mode, as shown in FIG. 83, a light attenuation structural member 132 for attenuating light to a level not higher than an amount of light at which the photo-polymerizable component was photo-polymerized was formed in the vicinity of an injection port 120 and in a region outside a display region. The light attenuation structural member 132 was made an aggregate constituted by plural structural members each having a plane shape of a line, and they were alternately arranged so that the liquid crystal composite of a display region 110 was not exposed when viewed in the direction parallel to the substrate surface. The light attenuation structural member 132 was formed by bundling a main seal and a sealing agent mixed with a fiber spacer (made by Nippon Electric Glass Corporation/spacer mixed as a gap agent of a main seal) by a seal dispenser. Since the width of the structural member is about 1 mm, the above seal agent of a thickness of 1 mm was coated on the glass, light of a wavelength range of 200 to 600 nm was irradiated, and the level of attenuation of the accumulation amount of light in the vicinity of the i line was measured. As a result, since the accumulation amount of light in the vicinity of the i line is attenuated to ⅓ by the above seal agent, it has been found that even if the light of the wavelength range of 200 to 600 nm is irradiated, only the sealing agent can be cured if irradiation is performed through the seal agent.

The liquid crystal composite was injected into this empty panel and pressure extrusion was carried out to make the cell thickness uniform. Subsequently, the sealing agent (not shown) was coated on an injection port 120, and after pressurization was removed, light of a wavelength range of 200 to 600 nm was irradiated from the direction parallel to the substrate to cure the sealing agent. In the example 4, the light from a high pressure mercury light source was irradiated as it was.

After the panel was formed, while a voltage not lower than the saturation voltage at which the tilt orientation of liquid crystal was fixed was applied, ultraviolet rays were irradiated to the component from the direction of a normal of a substrate, and a cross-linking structure corresponding to the liquid crystal alignment was formed. The obtained liquid crystal display was set in a prober tester and a display test was carried out.

CONVENTIONAL EXAMPLE 9-1

A liquid crystal composite containing a photo-polymerizable component was obtained by a method similar to the example 9-1. The foregoing general photo-curing resin was used as a sealing agent. In an empty panel of an MVA mode, anything was not formed in the vicinity of an injection port. The liquid crystal composite was injected into this empty panel, and pressure extrusion was carried out to make the cell thickness uniform. Subsequently, the sealing agent was coated on the injection port, and after pressurization was removed, light of a wavelength range of 200 to 600 nm was irradiated from the direction parallel to the substrate to cure the sealing agent. In this conventional example 9-1, the light from a high pressure mercury light source was irradiated as it was.

After the panel was formed, while a voltage not lower than the saturation voltage at which the tilt orientation of the liquid crystal was fixed was applied, ultraviolet rays were irradiated to the component from the direction of a normal of the substrate, and a cross-linking structure corresponding to the liquid crystal alignment was formed. The obtained liquid crystal display was set in a prober tester and a display test was carried out.

CONVENTIONAL EXAMPLE 9-2

A liquid crystal composite containing a photo-polymerizable component was obtained by a method similar to the example 9-1. An epoxy resin (made by Kyoritsu Chemical Corporation) containing a photoinitiator activated by only light of an ultraviolet ray region was used for a main seal.

A frame pattern closed by the main seal was formed on a substrate in which an alignment control member for the MVA was formed, a necessary amount of liquid crystal was dropped, and bonding of substrates was carried out under a reduced pressure. Subsequently, a gap was ensured by the opening to the atmosphere, and the liquid crystal composite was diffused in the frame pattern. Then, light of a wavelength range of 200 to 600 nm was irradiated through a CF substrate from the direction vertical to the substrate and the main seal was cured. In this conventional example 9-2, the light from a high pressure mercury light source was irradiated as it was.

After the panel was formed, while a voltage not lower than the saturation voltage at which the tilt orientation of the liquid crystal was fixed was applied, ultraviolet rays were irradiated to the photo-polymerizable component from the direction of a normal of the substrate, and a cross-linking structure corresponding to a liquid crystal alignment was formed. The obtained liquid crystal display was set in a prober tester and a display test was carried out.

[Results of Display Test]

In the liquid crystal displays of the examples 9-1 to 9-5, unevenness of display did not occur at a halftone display, whereas in the conventional examples 9-1 and 9-2, unevenness of display occurred in the vicinity of the injection port or the main seal.

As described above, according to this embodiment, in the liquid crystal display adopting the alignment fixation system in which the liquid crystal composite containing the photo-polymerizable component is sandwiched between the substrates, and the photo-polymerizable component is photo-polymerized while a voltage is applied to the liquid crystal composite, it can be manufactured at a high yield while display quality is improved.

As described above, according to the present invention, the alignment orientation of the liquid crystal is regulated by using the polymer fixing method, and a wide angle of view is obtained, and further, a response time at a halftone can be shortened, so that excellent display quality can be obtained.

What is claimed is:

1. A method of manufacturing a liquid crystal display, comprising the steps of:

sealing a liquid crystal layer containing a polymerizable component, which is polymerized by light or heat, between substrates; and polymerizing the polymerizable component without applying a voltage to the liquid crystal layer to regulate a pretilt angle of a liquid crystal molecule and/or a tilt direction at a time of driving of the liquid crystal molecule, wherein an alignment film is formed on the substrate using an optical alignment process.

2. A method of manufacturing a liquid crystal display according to claim 1, wherein an alignment regulating structural member is formed on the substrate.

3. A method of manufacturing a liquid crystal display according to claim 1, wherein the polymerizable component is a mesomorphism or non-mesogenic monomer.

4. A method of manufacturing a liquid crystal display according to claim 3, wherein the mesomorphism or non-mesogenic monomer is bifunctional acrylate or a mixture of bifunctional acrylate and monofunctional acrylate.

* * * * *

UNITED STATES PATENT AND TRADEMARK OFFICE
CERTIFICATE OF CORRECTION

| | | |
|---|---|---|
| PATENT NO. | : 7,586,561 B2 | Page 1 of 1 |
| APPLICATION NO. | : 11/471831 | |
| DATED | : September 8, 2009 | |
| INVENTOR(S) | : Kazutaka Hanaoka | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 168 days.

Signed and Sealed this

Fourteenth Day of September, 2010

David J. Kappos
*Director of the United States Patent and Trademark Office*